United States Patent
Becker-Willinger et al.

(10) Patent No.: US 12,269,951 B2
(45) Date of Patent: Apr. 8, 2025

(54) NANOSTRUCTURED COMPOSITE MATERIALS WITH SELF-HEALING PROPERTIES

(71) Applicant: Leibniz-Institut für Neue Materialien gemeinnützige GmbH, Saarbrücken (DE)

(72) Inventors: Carsten Becker-Willinger, Saarbrücken (DE); Budiman Ali, Saarbrücken (DE); Jessica Brunke, St. Gallen (CH); Gerhard Wenz, St. Ingbert (DE); Devid Hero, Losheim am See (DE)

(73) Assignee: Leibniz-Institut für Neue Materialien gemeinnützige GmbH, Saarbrücken (DE)

( * ) Notice: Subject to any disclaimer, the term of this patent is extended or adjusted under 35 U.S.C. 154(b) by 1023 days.

(21) Appl. No.: 16/979,205

(22) PCT Filed: Mar. 21, 2019

(86) PCT No.: PCT/EP2019/057062
§ 371 (c)(1),
(2) Date: Sep. 9, 2020

(87) PCT Pub. No.: WO2019/185441
PCT Pub. Date: Oct. 3, 2019

(65) Prior Publication Data
US 2021/0071001 A1  Mar. 11, 2021

(30) Foreign Application Priority Data
Mar. 29, 2018  (DE) .................... 10 2018 107 702.5

(51) Int. Cl.
| | | |
|---|---|---|
| C08L 87/00 | (2006.01) | |
| C08B 37/16 | (2006.01) | |
| C08G 83/00 | (2006.01) | |
| C08K 3/013 | (2018.01) | |
| C08K 9/04 | (2006.01) | |
| C08K 9/06 | (2006.01) | |
| C08L 5/16 | (2006.01) | |
| C08L 83/04 | (2006.01) | |

(52) U.S. Cl.
CPC .......... *C08L 87/00* (2013.01); *C08B 37/0015* (2013.01); *C08G 83/007* (2013.01); *C08K 3/013* (2018.01); *C08K 9/04* (2013.01); *C08K 9/06* (2013.01); *C08L 5/16* (2013.01); *C08L 83/04* (2013.01); *C08L 2312/00* (2013.01)

(58) Field of Classification Search
CPC .... C08B 37/0015; C08G 83/007; C08K 9/06; C08K 3/013; C08K 9/04; C08L 87/00; C08L 5/16; C08L 83/04; C08L 2312/00
See application file for complete search history.

(56) References Cited

U.S. PATENT DOCUMENTS

| | | | | |
|---|---|---|---|---|
| 4,480,072 A * | 10/1984 | Mallon | .............. | H04N 21/8547 525/61 |
| 2011/0319527 A1 | 12/2011 | Suzuki et al. | | |
| 2016/0032137 A1 | 2/2016 | Kang et al. | | |

FOREIGN PATENT DOCUMENTS

| | | |
|---|---|---|
| EP | 2397527 A1 | 12/2011 |
| EP | 2123681 B1 | 1/2013 |
| EP | 2787010 A1 | 10/2014 |
| EP | 2857440 A1 | 4/2015 |
| EP | 2949709 A1 | 12/2015 |
| JP | 2016088878 A | 5/2016 |
| JP | 2016516846 A | 6/2016 |
| WO | 97/09354 A1 | 3/1997 |
| WO | 01/38408 A2 | 5/2001 |
| WO | 2010092948 A1 | 8/2010 |
| WO | 2016/202906 A1 | 12/2016 |
| WO | 2018052008 A1 | 3/2018 |

OTHER PUBLICATIONS

Amamoto et al., "Repeatable Photoinduced Self-Healing of Covalently Cross-Linked Polymers through Reshuffling of Trithiocarbonate Units," Angew. Chem. Int. Ed., 2011, 50, 1660-63.

Araki et al. "Preparation of a "sliding graft copolymer", an organic solvent-soluble polyrotaxane containing mobile side chains, and its application for a crosslinked elastomeric supramolecular film," Soft Matter, 2008, 4, 245-49.

Jiang et al. "One-Pot Synthesis and Characterization of Polyrotaxane-Silica Hybrid Aerogel," ACS Macro Lett., 2017, 281-86.

Kato et al. "Synthesis, structure, and mechanical properties of silica nanocomposite polyrotaxane gels," Beilstein Journal of Organic Chemistry, 11, 2194-2201, Nov. 2015.

Goto et al. "Thermally conductive tough flexible elastomers as composite of slide-ring materials and surface modified boron nitride particles via plasma in solution," Appl. Phys. Lett., 112, 101901-1 to 101901-5, 2018.

Goto et al. "Development of High Thermally Conductive Flexible Elastomer as a Composite Material of Slide-Ring Material and Plasma-Surface-Modified Boron Nitride Particles: Effect of Plasma-Surface Modification of Boron Nitride Particles," J. Japan Inst. Met. Mater., vol. 82, No. 10, (2018), 403-407.

Soleimani et al. "Preparation of New Go-Based Slide Ring Hydrogel Through a Convenient One-Pot Approach as Methylene Blue Absorbent," Carbohydrate Polymers, 187, (2018), 94-101.

(Continued)

Primary Examiner — Patrick D Niland
(74) Attorney, Agent, or Firm — CAHN & SAMUELS, LLP

(57) ABSTRACT

A self-healing composite material includes at least one cross-linked polyrotaxane and at least one organically modified inorganic hybrid material which comprises functional groups (B) or at least one type of surface-modified inorganic particles which have functional groups (B) on their surface. The polyrotaxane is a cross-linked polyrotaxane and at least two of the threaded ring-shaped molecules are cross-linked by linking of the functional groups (A) and (B).

15 Claims, 30 Drawing Sheets

(56) References Cited

OTHER PUBLICATIONS

Kali et al. "One Pot Synthesis of a Polyisoprene Polyrotaxane and Conversion to a Slide-Ring Gel," Macromolecular Rapid Comm., 2016, 37, 67-72.
Kato et al. "Peculiar elasticity and strain hardening attributable to counteracting entropy of chain and ring in slide-ring gels," Polymer, 55, (2014), 2614-19.
Kato et al. "Polyrotaxane Glass: Peculiar Mechanics Attributable to the Isolated Dynamics of Different Components," J. Phys. Chem. Lett., 2015, 6, 4043-48.
Kato et al. "Dynamic transition between rubber and sliding states attributed to slidable cross-links," Soft Matter, 2011, 7, 8737-40.
Li et al. "Miscibility, Intramolecular Specific Interactions and Mechanical Properties of a DGEBA Based Epoxy Resin Toughened with a Sliding Graft Copolymer," Chinese Journal of Polymer Science, vol. 33, No. 3, (2015), 433-43.
Martin et al. "The processability of a poly(urea-urethane) elastomer reversibly crosslinked with aromatic disulfide bridges," J. Mater. Chem. A, 2014, 2, 5710-15.
Rekondo et al. "Catalyst-free room-temperature self-healing elastomers based on aromatic disulfide metathesis," Mater. Horiz., 2014, 1, 237-40.
Susa et al. "Effect of the Dianhydride/Branched Diamine Ratio on the Architecture and Room Temperature Healing Behavior of Polyetherimides," ACS Appl. Mater. Interfaces, 2016, 8, 34068-79.
Williams et al. "Mechanically Robust and Self-Healable Superlattice Nanocomposites by Self-Assembly of Single-Component "Sticky" Polymer-Grafted Nanoparticles," Adv. Mater., 2015, 27, 3934-41.
International Search Report for Application No. PCT/EP2019/057062, Aug. 2019.
English Abstract of WO 97/09354, Mar. 13, 1997.
English Abstract of WO 01/38408, May 31, 2001.
WIPO International Preliminary Report on Patentability for Application No. PCT/EP2019/057062, Oct. 2020.

\* cited by examiner

| System / Time in Suntest | MOx 0 % | MOx 1 % | MOx 5 % | MOx 10 % | MOx 20 % | MOx 30 % |
|---|---|---|---|---|---|---|
| MPS 0h | ● | ● | ● | | | |
| MPS 48h | | | ● | | | |
| CeO$_2$-MPS 0h | ● | ● | ● | ● | ● | ● |
| CeO$_2$-MPS 48h | | | | | | |
| SiO$_2$-GPTES 0h | ● | ● | ● | ● | ● | ● |
| SiO$_2$-GPTES 48h | ● | | ● | | | |

FIG. 12

NANOSTRUCTURED COMPOSITE MATERIALS WITH SELF-HEALING PROPERTIES

This patent application is a U.S. national stage application of PCT international application PCT/EP2019/057062 filed on 21 Mar. 2019 and claims priority of German patent document 10 2018 107 702.5 filed on 29 Mar. 2018, the entireties of which are incorporated herein by reference.

FIELD OF THE INVENTION

The invention relates to a composition for a self-healing composite material based on crosslinked polyrotaxanes, and to a self-healing composite material and use thereof.

BACKGROUND OF THE INVENTION

Self-healing materials possess a broad application potential, for example, for finishes in the automobile industry, for coatings on smartphones, and so on. In this connection there is particular interest in using materials whose self-healing takes place at temperatures not much above the uppermost service temperature. At the same time, however, the stability of materials must be such that they permit the normal, unrestricted use of the article or component in question, meaning that the materials must not, for example, begin to flow in the service temperature range without intention. Also required of the materials is a sufficient stability toward weathering.

Known approaches to generating self-healing materials are oftentimes based on chemical bonds which can be formed reversibly.

[A. Rekondo, R. Martin, A. R. de Luzuriaga, G. Cabanero, H. J. Grande, and I. Odriozola, "Catalyst-free room-temperature self-healing elastomers based on aromatic disulfide metathesis", Mater. Horiz., vol. 1, No. 2, pp. 237-240, February 2014.] employ elastomers crosslinked via aromatic disulfide bridges. Bridging links of this kind are able to perform reversible metathesis reactions at room temperature and enable the reconnection of previously severed component pieces by simple joining. The key compounds, however, are not weathering-stable. There are no nanoparticles in the systems. The same is true of the polyurethane systems in [R. Martin, A. Rekondo, A. R. de Luzuriaga, G. Cabanero, H. J. Grande, and I. Odriozola, "The processability of a poly(urea-urethane) elastomer reversibly crosslinked with aromatic disulfide bridges", J. Mater. Chem. A, vol. 2, No. 16, pp. 5710-5715, March 2014.].

In [A. Susa, R. K. Bose, A. M. Grande, S. van der Zwaag, and S. J. Garcia, "Effect of the Dianhydride/Branched Diamine Ratio on the Architecture and Room Temperature Healing Behavior of Polyetherimides", ACS Appl. Mater. Interfaces, vol. 8, No. 49, pp. 34068-34079, December 2016.] describe polyimide materials in which the diamine components carry fatty acid side groups. When previously severed component pieces are joined, these molecular building blocks have the effect of a new compound forming by interdiffusion at the interface between two pieces. This approach operates without reversible chemical bonds and at room temperature. The resulting materials are comparatively soft, to enable the interdiffusion, and are not weathering-stable.

[Y. Amamoto, J. Kamada, H. Otsuka, A. Takahara, and K. Matyjaszewski, "Repeatable Photoinduced Self-Healing of Covalently Cross-Linked Polymers through Reshuffling of Trithiocarbonate Units", Angew. Chem. Int. Ed., vol. 50, No. 7, pp. 1660-1663, February 2011.] describe materials which comprise the class of compound of the trithiocarbonates. Under UV light, these compounds can be excited to rearrangement reactions and so bring about a self-healing behavior. Because of the UV sensitivity of the trithiocarbonate group, the materials are not weathering-stable and their mechanical stability is not good.

The approach of [G. A. Williams, R. Ishige, O. R. Cromwell, J. Chung, A. Takahara, and Z. Guan, "Mechanically Robust and Self-Healable Superlattice Nanocomposites by Self-Assembly of Single-Component "Sticky" Polymer-Grafted Nanoparticles", Adv. Mater., vol. 27, No. 26, pp. 3934-3941, July 2015.] uses self-arranging nanoparticles having a surface functionalization comprising "sticky" short-chain polymers (e.g., polyamides). The composites are held together by hydrogen bonds between adjacent, surface-bonded polyamide molecules. This is also the basis for the self-healing behavior which is observed. Because of the short-chain nature of the polymers, the resultant composites are soft and therefore unsuitable for practical applications.

Polyrotaxanes

Polyrotaxanes are polymers that have a supramolecular structure. They are constructed from a polymer main chain, with ring-shaped molecules (e.g., cyclodextrins) threaded on under defined reaction conditions. In order to prevent the rings from later sliding off the polymer main chain, stopper molecules with bulky side groups are inserted at defined intervals along and/or at the end of the main chain. Between the stopper molecules, the ring-shaped molecules on the main chain are in principle freely mobile. Subsequently, the pre-formed polymers can be crosslinked using crosslinker molecules, by covalent bridges between ring-shaped molecules of adjacent polymers. This produces what are called "slide-ring gels". Systems of this kind are set out below.

The main chains of the polyrotaxanes are constructed from quite particular polymers and are generated via an elaborate multistage process. The references cited initially describe pure polymer systems which contain no further constituents, such as nanoparticles, for example.

[K. Kato and K. Ito, "Dynamic transition between rubber and sliding states attributed to slidable cross-links", Soft Matter, vol. 7, No. 19, pp. 8737-8740, September 2011.][X. Li, H. Kang, J. Shen, L. Zhang, T. Nishi, and K. Ito, "Miscibility, intramolecular specific interactions and mechanical properties of a DGEBA based epoxy resin toughened with a sliding graft copolymer", Chin J Polym Sci, vol. 33, No. 3, pp. 433-443, March 2015.]

[K. Kato, T. Yasuda, and K. Ito, "Peculiar elasticity and strain hardening attributable to counteracting entropy of chain and ring in slide-ring gels", Polymer, vol. 55, No. 10, pp. 2614-2619, May 2014.]

[K. Kato, T. Mizusawa, H. Yokoyama, and K. Ito, "Polyrotaxane Glass: Peculiar Mechanics Attributable to the Isolated Dynamics of Different Components", J. Phys. Chem. Lett., vol. 6, No. 20, pp. 4043-4048, October 2015.]

[J. Araki, T. Kataoka, and K. Ito, "Preparation of a "sliding graft copolymer", an organic solvent-soluble polyrotaxane containing mobile side chains, and its application for a crosslinked elastomeric supramolecular film", Soft Matter, vol. 4, No. 2, pp. 245-249, January 2008.]

EP 02123681 B1 [Advanced Softmaterials] claims a polyrotaxane comprising a polyrotaxane which through a suitable stimulus (e.g., heat in the range between 5° C. and 90° C.) is able to adopt a noncrosslinked or a crosslinked state. The linear part of the molecule consists of polyethylene glycol, polyisoprene, polyisobutylene or polybutadiene.

Stopper molecules are adamantane or substituted benzene groups. There are no nanoparticles in the materials.

Conversely, nanoparticles as reinforcing elements in polyrotaxanes are set out in the following references:

[K. Kato, D. Matsui, K. Mayumi, and K. Ito, "Synthesis, structure, and mechanical properties of silica nanocomposite polyrotaxane gels", Beilstein Journal of Organic Chemistry, vol. 11, No. 1, pp. 2194-2201, November 2015.]

EP 2397527 A1 [Nissan Motors and Advanced Softmaterials] describes a coating material comprising polyrotaxane and microparticles. The polyrotaxane possesses a caprolactone group. The microparticles are smaller than 380 nm and comprise silica and also alumina. The nanoparticles have no further surface modification. Self-healing behavior is not described.

EP 2787010 A1 [LG Chem] describes a polyrotaxane and a photocurable coating derived therefrom and having excellent mechanical and self-healing properties. The polyrotaxane is polyester-based. There are no nanoparticles. Similar compounds are used by EP 2857440 A1 [LG Chem] for a hardcoat coating which comprises inorganic microparticles. Another member is EP 2949709 A1 [LG Chem], which comprises a correspondingly coated plastics film comprising not only the polyrotaxane but also inorganic nanoparticles of silica, alumina, titanium dioxide or zinc oxide. The nanoparticles, however, are not surface-functionalized.

In addition, there have also been single-stage reactions, and hence less elaborate reactions, investigated in the context of heterogeneous polymerization reactions with water-insoluble monomers in aqueous phase for the preparation of polyrotaxanes. In this connection there are reactions which use two different monomers at the same time (e.g., isoprene and styrene). Water-soluble radical initiators are used which initiate the reaction in analogy to an emulsion polymerization. Small molecules such as isoprene, for example, are complexed beforehand by the cyclodextrins in the reaction mixture. The amount of the threaded cyclodextrins is therefore predetermined by the concentration of isoprene. Examples of a procedure of this kind in the context of an emulsion polymerization are WO1997009354A1 [BASF AG], WO2001038408A2 [Bayer AG], and WO2016202906A1 [Universitat des Saarlandes]. In spite of the use of monomers having vinylic groups in combination with cyclodextrins in the context of an emulsion polymerization, the formation of polyrotaxanes was not demonstrated in the first two applications. Both applications also fail to mention nanoparticles. In order to increase further the possibilities for movement of the cyclodextrins along the main chain, terpolymers have been developed. In this case, in the context of the heterogeneous radical polymerization in water, and as well as isoprene and styrene, monomers are used which cannot be complexed by cyclodextrin, such as methyl acrylate, for example [unpublished application with file reference EP16205619.6, Universitat des Saarlandes]. Both of the Saarland University applications do mention the use of nanoparticles in the dependent claims, but do not elaborate on this use in the examples.

OBJECT

It is an object of the invention to provide a material having self-healing properties that is mechanically robust and also intrinsically weathering-stable. The material in question, moreover, is preferably transparent. A further object is to specify a method for producing the material, and a use.

SUMMARY OF THE INVENTION

This object is achieved by the inventions having the features of the independent claims. Advantageous developments of the inventions are characterized in the dependent claims. The wording of all of the claims is hereby made part of the present description by reference. The inventions also embrace all rational combinations, and especially all stated combinations, of independent and/or dependent claims.

The object is achieved by means of a composition for a self-healing composite material, comprising:
a) at least one polyrotaxane comprising a copolymer and ring-shaped molecules threaded thereon, with at least one ring-shaped molecule having at least one functional group (A);
b) at least one organically modified inorganic hybrid material which comprises functional groups (B), or at least one kind of surface-modified inorganic particles which on their surface have functional groups (B);
where at least two of the threaded ring-shaped molecules can be crosslinked by linking of the functional groups (A) and (B).

In one preferred embodiment of the invention, the polyrotaxane comprises at least one ring-shaped molecule threaded onto a copolymer, the copolymer being a nonionic copolymer, and at least (a) structural units derived from a first polymerizable monomer having a stopper group, and at least (b) structural units derived from a second polymerizable monomer, where the structural units derived from the first monomer having a stopper group are disposed at least partly at the ends of the polymer chain of the copolymer, and the stopper groups prevent the ring-shaped molecule from detaching from the copolymer.

The structural units derived from the first monomer having a stopping group are preferably in an amount of 0.1 mol % to 20 mol %, based on 100 mol % of the total number of structural units of the copolymer.

The copolymer onto which the ring-shaped molecules of the polyrotaxane are threaded is a nonionic copolymer, and the first and second monomers are nonionic monomers. Preferably, in relation to polyrotaxanes, a "nonionic monomer" is a monomer which has no charged functional groups when present in aqueous solution with a pH of 2 to 11, preferably at a pH of 3 to 10. The expression "nonionic monomer" as presently used embraces, for example, monomers which contain only structural units or functional groups which are unable to form ions, such as, for example, isoprene or methyl methacrylate. Additionally, the expression "nonionic monomer" may also embrace monomers which have a functional group which in principle is capable of forming ions, such as a carboxylic acid group, for example, but which on a majority basis, i.e., >50 mol %, is in an uncharged state when present in an aqueous solution with a pH of <4, preferably <3, more particularly <2. Examples of such nonionic monomers which are present uncharged in such a pH range are acrylic acid and compounds derived therefrom with a carboxylic acid group, such as methacrylic acid, for example. The expression "nonionic copolymer" refers preferably to a copolymer which comprises substantially no structural units which are present in charged form when present in an aqueous solution with a pH of 2 to 11, preferably of 3 to 10. The expression "nonionic copolymer" as presently used embraces, for example, compounds having only structural units and/or functional groups which are not capable of forming ions, such as, for example, structural units derived from isoprene or methyl methacrylate. Additionally, the expression "nonionic copolymer" may also embrace copolymers having structural units and/or functional groups which are in principle capable of forming ions, such as a carboxylic acid group, for example, but which on a majority basis, i.e., >50 mol %, are in an uncharged state when present in an aqueous solution with a pH of <4, preferably of <3, more particularly <2. Examples of structural units which are present in uncharged form in this pH range are structural units derived from acrylic acid and derivatives thereof with a carboxylic acid group, such as methacrylic acid, for example. A nonionic copolymer having substantially no structural units with functional groups which are charged when present in aqueous solution with a pH of 2 to 11, preferably 3 to 10, and also, optionally, groups which on a majority basis are in charged form when present in an aqueous solution with a pH of less <4, preferably <3, more particularly <2, means preferably that such structural units having such functional groups are present only in a small amount. For example, those structural units having functional groups which are in charged form when present in aqueous solution with a pH of 2 to 11, preferably of 3 to 10, may originate from impurities in the monomers to be copolymerized, or from reactants which are used in the copolymerization reaction, examples being initiators, catalysts and/or chain transfer agents, or else from ionic monomers which have been added deliberately to the reaction. The fraction of structural units having functional groups which are charged when present in aqueous solution with a pH of 2 to 11, preferably 3 to 10, is preferably below 5 mol %, more preferably below 3 mol %, very preferably below 2 mol %, more particularly below 1 mol %, based in each case on 100 mol % of the structural units of the copolymer. This applies correspondingly to the groups which are present on a majority basis in charged form in an aqueous solution with a pH of <4, preferably <3, more particularly <2.

In one preferred embodiment of the invention, the copolymer of the polyrotaxane is a statistical copolymer, in which the structural units derived from the first polymerizable monomer having the stopping group are disposed randomly in the polymer chain, at least partly between the ends of the polymer chain.

In one embodiment of the invention, the content of structural units derived from the first monomer having a stopper group is in the range from 0.5 mol % to 18 mol %, preferably in the range from 1 mol % to 16 mol %, more preferably 2 mol % to 15 mol %, very preferably from 3 mol % to 12 mol %, based in each case on 100 mol % of the total number of structural units of the copolymer.

In another embodiment of the invention, the copolymer is a block copolymer comprising a block A comprising repeat units derived from the first polymerizable monomer having the stopper group, a block B comprising repeat units derived from the second polymerizable monomer, and a block C comprising repeat units derived from a third monomer having a stopper group, with these repeat units being identical to or different from the repeat units derived from the first monomer, and with block B in the block copolymer being disposed between block A and block C, and with the ring-shaped molecule being threaded onto block B.

The fraction of the structural units derived from the first and third monomers is preferably in the range from 0.1 mol % to 20 mol %, based on 100 mol % of the structural units of the copolymer. If the repeat units derived from the third monomer in block C are identical to the repeat units in block A, then block C may also be referred to as block A.

In one embodiment of the invention, the joint content of structural units derived from the first monomer and derived from the third monomer is in the range from 0.3 mol % to 18 mol %, preferably in the range from 0.5 mol % to 14 mol %, more preferably 0.7 mol % to 10 mol %, very preferably from 0.9 mol % to 5 mol %, more particularly 1 mol % to 2.5 mol %, based in each case on 100 mol % of the total number of structural units of the copolymer.

In one embodiment of the invention, the ring-shaped molecule is threaded onto the main chain of the copolymer. This means that the polyrotaxane is preferably a main-chain rotaxane.

Ring-shaped molecules of the polyrotaxanes that are used may be the ring-shaped molecules customary for polyrotaxanes. These may be, for example, crown ethers, cucurbiturils, calixarenes, cyclic amides and/or a transition metal complex. More preferably the ring-shaped molecule is selected from the group encompassing cyclodextrins or cyclodextrin derivatives, and also combinations thereof. Cyclodextrins and cyclodextrin derivatives may also be present in combination, on the same polyrotaxane, for example.

In one embodiment of the invention, the cyclodextrin or cyclodextrin derivative is selected from the group consisting of native cyclodextrin, methylated cyclodextrin, acetylated cyclodextrin, hydroxyethylated cyclodextrin, hydroxypropylated cyclodextrin, a cationic cyclodextrin derivative, an anionic cyclodextrin derivative, glycosylated cyclodextrin, or a combination of these compounds, with, where not already present, the cyclodextrins or cyclodextrin derivatives having at least one functional group (A).

In a further embodiment of the invention, the cyclodextrin or cyclodextrin derivative is selected from the group consisting of α-cyclodextrin, randomly methylated α-cyclodextrin, β-cyclodextrin, randomly methylated β-cyclodextrin (RAMEB), hydroxypropyl-β-cyclodextrin, acetyl-β-cyclodextrin, heptakis(2,6-di-β-methyl)-β-cyclodextrin, carboxymethyl-β-cyclodextrin, succinyl-β-cyclodextrin, sulfobutylated β-cyclodextrin, β-cyclodextrin sulfate, 6-monodeoxy-cyclodextrin, succinyl-ß-cyclodextrin, (2-carboxyethyl)-ß-cyclodextrin, ß-cyclodextrin, sulfobutylated ß-cyclodextrin, ß-cyclodextrin sulfate, 6-monodeoxy-6-monoamino-β-cyclodextrin hydrochloride, heptakis(6-deoxy-6-amino)-β-cyclodextrin, (2-hydroxy-3-N,N,N-trimethylamino)propyl-β-cyclodextrin, heptakis(2,6-tri-O-methyl)-β-cyclodextrin, monoamino-β-cyclodextrin, sulfobutyl-β-cyclodextrin, γ-cyclodextrin, randomly methylated γ-cyclodextrin, 2-hydroxy-3-N,N,N-trimethylaminopropyl-β-cyclodextrin halide, salts of the stated compounds, and any combination thereof, with, where not already present, the cyclodextrins or cyclodextrin derivatives having at least one functional group (A).

In a further embodiment of the invention, the cyclodextrin or cyclodextrin derivative is an ionic cyclodextrin or ionic cyclodextrin derivative selected from the group consisting of carboxylmethyl-α-cyclodextrin sodium salt, carboxylmethyl-β-cyclodextrin sodium salt, succinyl-α-cyclodextrin, succinyl-β-cyclodextrin, succinyl-γ-cyclodextrin, (2-carboxyethyl)-α-cyclodextrin, (2-carboxyethyl)-β-cyclodextrin, α-cyclodextrin phosphate sodium salt, β-cyclodextrin phosphate sodium salt, γ-cyclodextrin phosphate sodium salt, sulfobutylated α-cyclodextrin sodium salt, sulfobutylated β-cyclodextrin sodium salt, sulfobutylated γ-cyclodextrin sodium salt, α-cyclodextrin sulfate sodium salt, β-cyclodextrinsulfate sodium salt, γ-cyclodextrin sodium salt, 6-monodeoxy-6-monoamino-α-cyclodextrin hydrochloride, heptakis(6-deoxy-6-amino)-β-cyclodextrin heptahydrochloride, octakis(6-deoxy-6-amino)-γ-cyclodextrin octahydrochloride, (2-hydroxy-3-N,N,N-trimethylamino)propyl-β-cyclodextrin chloride, and any combination of these compounds, with, where not already present, the cyclodextrins or cyclodextrin derivatives having at least one functional group (A). In one particularly preferred embodiment, the cyclodextrin derivative is randomly methylated β-cyclodextrin (RAMEB).

RAMEB is also referred to as methyl-β-cyclodextrin (CAS No. 128446-36-6) and is produced industrially from β-cyclodextrin. The methyl substituents are disposed randomly on the hydroxyl groups at positions 2, 3, and 6 of the anhydroglucose units. The degree of methylation is dependent on the manufacturer and is customarily between 1.3 and 2.3, preferably between 1.6 and 2. The solubility of RAMEB in water is better than the solubility of unmodified β-cyclodextrin.

Suitability as the first monomer is possessed by numerous compounds, provided they have a stopping group which has sufficient steric hindrance to block the mobility of the ring-shaped molecule or molecules in such a way that the ring-shaped molecule or molecules cannot part from the copolymer chain. The first monomer with a stopping group is preferably a vinyl monomer. The expression "vinyl monomer" as presently used refers to a monomer having a vinyl group, this being a —CH=CH$_2$ group, in which the hydrogen atoms may also be replaced by other substituents, such as, for example, a methyl group in polyethylene glycol methacrylate. Preferably, the first monomer has a molecular weight of 70 g/mol or more, preferably of 70 g/mol to 1000 g/mol, more particularly of 100 g/mol to 500 g/mol.

In certain embodiments of the invention, the first monomer is selected from the group containing myrcene, aromatic vinyl monomer, N-isopropyl(meth)acrylamide), N-vinylcaprolactam, N-vinylcaprolactone, N-vinylimidazole, N-vinylpyrrolidone, polyethylene glycol(meth)acrylate, α,ω-bis(meth)acrylates, hydroxyethyl methacrylate, N,N-dimethyl-2-aminoethyl methacrylate, tetrahydrofurfuryl methacrylate, furfuryl methacrylate, 4-acryloylmorpholine, N-[tris(hydroxymethyl)methyl]acrylamide, maleimides, N-alkylmaleimides, and also any combination thereof. In the case of polyethylene glycol(meth)acrylate, the molecular weight of the polyethylene glycol part is below 3000 g/mol, preferably below 1000 g/mol. This also applies to polyethylene glycol parts of α,ω-bis(meth)acrylates. In one embodiment, the first monomer is polyethylene glycol methyl ether(meth)acrylate or hydroxyethyl (meth)acrylate.

In certain embodiments of the invention, the first monomer having a stopping group is an aromatic vinyl monomer selected from the group containing optionally substituted styrene, optionally substituted vinylsulfonic acid, optional substituted vinylpyridine, optionally substituted divinylbenzene, and any combination thereof. The expression "optionally substituted" here means that the monomers have one or more substituents, identical or different, selected from the group of hydrogen, C1-C10 alkyl, C1-C10 heteroalkyl, C1-C10 haloalkyl, C1-C10 alkoxy, CN, nitro, halogens (F, Cl, Br, I), or similar substituents.

The first monomer is preferably selected from styrene, N-isopropylacrylamide, N-vinylcaprolactone, N-vinylimidazole, N-vinylpyrrolidone, 2-hydroxyethyl methacrylate, N-[tris(hydroxymethyl)methyl]acrylamide, and any combination thereof. Particular preference is given to styrene and hydroxyethyl methacrylate.

In the case of α,ω-bis(meth)acrylate, preference is given to α,ω-bis(meth)acrylates of ethylene glycol, oligoethylene glycol, polyethylene glycol, bisphenol A, or mixtures thereof.

There is no particular restriction on the selection of the second monomer, provided it enables a part of the copolymer to form with substantially linear structure, onto which the ring-shaped molecule can be threaded. The second monomer is preferably a linear monomer. The expression "substantially linear structure" does not rule out the possibility that this part of the polymer cannot be branched, provided the ring-shaped molecule can be threaded onto the polymer, is rotatable, and is mobile along the polymer chain. The second monomer may therefore be branched, preferably only slightly branched, provided this branching does not prevent the rotatability and mobility of the ring-shaped molecule(s).

In certain embodiments, the second monomer is a nonionic monomer, a hydrophobic monomer, especially a nonionic hydrophobic monomer. The expression "hydrophobic monomer" here means that this monomer has a solubility in water of 20° C. of below 20 g/L, preferably below 10 g/L, more particularly below 5 g/L, very particularly below 2 g/L.

Preferably, the second monomer is a vinyl monomer. With particular preference, the first monomer having the stopping group and the second monomer are vinyl monomers. Preferably, the second monomer has a molecular weight of 120 g/mol or less, preferably 110 g/mol or less. The second monomer is preferably selected from 1,3-dienes, N-alkylacrylamides, alkenes, 1,3,5-trienes, or any combination thereof. In the case of 1,3-dienes, the 1,3-diene is preferably selected from 1,3-butadiene, 2,3-dimethyl-1,3-butadiene, isoprene, chloroprene, or combinations thereof. Thus, for example, 1,3-butadiene, isoprene, or 1,3-butadiene and isoprene in combination can be used. In the case of alkenes, ethene, propene, isobutene or any combination thereof are preferred. In the case of N-alkylacrylamides, N,N-dimethylacrylamide is preferred.

The second monomer may also be a partly hydrophilic monomer. The expression "partly hydrophilic monomer" denotes a monomer of low water-solubility, preferably a monomer having a solubility in water at 20° C. of 5 to 40 g/L, preferably of 10 g/L to 40 g/L, more preferably of 15 g/L to 40 g/L, more particularly of 20 g/L to 30 g/L. Additionally or alternatively to this, the second, partly hydrophilic monomers are selected from the group containing methacrylonitrile, vinyl esters such as vinyl acetate, vinyl ethers, (meth)acrylamides. The (meth)acrylate notation here stands for both acrylates and methacrylates.

As the second monomer it is also possible to use only a hydrophobic monomer, to give a hydrophobic copolymer. A "hydrophobic copolymer" here refers to a copolymer which has at least 60 mol %, preferably at least 70 mol %, more preferably at least 80 mol %, more particularly at least 90 mol %, 95 mol % or 100 mol %, of structural units derived from a hydrophobic monomer, based on 100 mol % of the total number of structural units of the copolymer. The expression "hydrophobic monomer" is to be understood, as defined above, as a monomer with low water-solubility, preferably of less than 20 g/L, more preferably less than 10 g/L, more particularly less than 5 g/L, preferably less than 2 g/L, in each case at 20° C. These definitions of a hydrophobic monomer may be valid for the first monomer, the second monomer, and other possible monomers. For this embodiment it is preferred for the copolymer of the polyrotaxane to be at least partly, especially entirely, a hydrophobic copolymer if the ring-shaped molecule or molecules are cyclodextrins and/or cyclodextrin derivatives. Cyclodextrins and cyclodextrin derivatives have a hydrophobic inner surface. Therefore, threading them onto a hydrophobic region of a copolymer leads only to low levels of interaction between the copolymer and the ring-shaped molecule. As a result, the mobility and rotatability of the ring-shaped molecule along this part of the copolymer chain is assured.

In a further embodiment, the copolymer may comprise structural units derived from a third hydrophilic monomer. There are no particular restrictions on the selection of the third monomer, provided it—together with the second monomer—enables a part of the copolymer to form with substantially linear structure, onto which the ring-shaped molecule or molecules can be threaded. The third monomer is preferably a linear monomer. The expression "substantially linear structure" does not rule out the possibility of this part of the polymer being branched, provided the ring-shaped molecule can be threaded onto the polymer, is rotatable, and is mobile along the polymer chain. The third monomer may therefore be branched, preferably only slightly branched, provided this branching does not prevent the rotatability and mobility of the ring-shaped molecule(s).

The second and third monomers are preferably a vinyl monomer. More preferably the first monomer having the stopping group, the second monomer, and the third monomer are vinyl monomers. Preferably, the third monomer has a molecular weight of 120 g/mol or less, preferably 100 g/mol or less.

The third monomer is a hydrophilic monomer. The expression "hydrophilic monomer" here means that this monomer has a solubility in water at 20° C. of more than 45 g/L, preferably of 45 g/L to 2500 g/L, more particularly of 50 g/L to 2100 g/L. This third hydrophilic monomer may additionally or alternatively be selected from the group consisting of methacrylates, acrylamides, methacrylamides, acrylic acid, methacrylic acid, acrylonitrile, derivatives thereof, and any combination thereof. Preference here is given to methyl acrylates.

The molar ratio of second to third monomer, or of the structural units derived therefrom, is preferably in the range from 1:5 to 5:1, more preferably 1:3 to 3:1, more particularly 1:2 to 2:1, and very particularly preferably 1:1.5 to 1.5:1.

In line with the monomers stated above, the copolymer is preferably realized by copolymerization (or terpolymerization) of the monomers in the presence of the ring-shaped molecule, with the second monomer being complexed by the ring-shaped molecule. As a result, the polyrotaxane is formed. The copolymerization may be triggered thermally and/or photochemically. The copolymerization is carried out preferably in water.

The polyrotaxane is preferably prepared in accordance with the methods disclosed in WO2016202906A1 or EP16205619.6, especially the claimed methods, which are hereby explicitly referenced, preferably in the methods for preparing the polyrotaxane without the crosslinking, i.e., the copolymerization in the presence of the ring-shaped molecule.

The molecular weight of the copolymer may be controlled by the polymerization conditions, by means of chain transfer agents, for example. A preferred molecular weight is a weight of below 500 000 g/mol (measured by gel permeation chromatography against polystyrene standards), preferably below 400 000 g/mol, more particularly below 200 000 g/mol. Independently of this, it is preferably more than 2000 g/mol, preferably more than 5000 g/mol, more particularly more than 10 000 g/mol.

In one embodiment of the invention, the copolymer comprises a region or regions whose structural units are derived from one or more second hydrophobic monomer and one or more of the third hydrophilic monomers, or a region or regions whose structural units are derived from partly hydrophilic monomers. This allows the number of ring-shaped molecules threaded onto the polymer chain to be controlled. Hence it is possible to prepare polyrotaxanes having a low fraction of 1 to 50 wt %, preferably 10 to 25 wt %, of ring-shaped molecules, based on the total weight of polyrotaxane. In the case of a high fraction of hydrophobic monomers, the fraction of threaded ring-shaped molecules, for cyclodextrins, for example, rises to more than 70 wt %. In the case of too high a fraction of hydrophilic monomer, too few ring-shaped molecules are threaded on. A polyrotaxane having the low fractions above is preferred, since higher fractions of ring-shaped molecules are detrimental to the self-healing capacity of the polymer.

The fraction of threaded ring-shaped molecule may be obtained from the total mass of polyrotaxane, the total mass of threaded ring-shaped molecule and unthreaded ring-shaped molecule, e.g., from the sum total of the masses of threaded and free ring-shaped molecule and the mass of free ring-shaped molecule. A method for determining the amount of threaded ring-shaped molecule is described in G. Kali, H. Eisenbarth, G. Wenz, "One Pot Synthesis of a Polyisoprene Polyrotaxane and Conversion to a Slide-Ring Gel", Macromol. Rapid. Commun. 2016, 37, 67-72 and the Supporting Information published for that paper.

The mass of polyrotaxane may be determined by weighing.

The total mass of threaded and free ring-shaped molecules may be measured by polarimetry, i.e., by measuring the optical rotation $\alpha$ of a sample of the polyrotaxane in a suitable solvent, with the mass of the sample having been determined prior to dissolution. The total concentration c of the ring-shaped molecule can then be obtained with the aid of the specific optical rotation $[\alpha]$ of the ring-shaped molecule, which either is known or can be determined by techniques known to the skilled person, in accordance with the following formula:

$$c=\alpha/([\alpha]*l)$$

where c is the total concentration of the threaded and free ring-shaped molecules; $\alpha$ is the measured optical rotation of the sample; $[\alpha]$ is the specific optical rotation of the ring-shaped molecule; and l is the length of the cuvette.

From the resultant total concentration it is possible, using m=c*V, to determine the total mass m of threaded and free ring-shaped molecules, with V standing for the volume of the sample in the measurement of the optical rotation.

The molar mass of the polyrotaxane, the polydispersity (PD), and the fraction of free ring-shaped molecule may be ascertained by gel permeation chromatography (GPC). The amount of threaded ring-shaped molecule is calculated using the difference between the total amount of ring-shaped molecule (determined via polarimetry) and the residual amount of free cyclodextrin (determined via GPC).

The functional groups (A) are preferably hydroxyl groups, thiol groups, carboxylic acid groups, anhydride groups, isocyanate groups, amino groups, monoalkylamino groups, isocyano groups, acrylate groups, methacrylate groups, aldehyde groups, or precursors thereof. A precursor of a functional group is a group which can be converted into the functional group. Thus, for example, an epoxy group is a precursor of a hydroxyl group, an ester is a precursor of a carboxylic acid group, and a blocked isocyanate group is a precursor of an isocyanate group. Epoxide groups or hydroxyl groups are preferred.

For each ring-shaped molecule there may be one functional group, two functional groups, or more than two function groups.

The polyrotaxanes are preferably soluble or dispersible in water or organic solvents, such as tetrahydrofuran, dichloromethane, chloroform, ethyl acetate or acetone.

The functional groups (B) are preferably hydroxyl groups, thiol groups, carboxylic acid groups, anhydride groups, isocyanate groups, amino groups, monoalkylamino groups, isocyano groups, acrylate groups, methacrylate groups, aldehyde groups, or precursors thereof. A precursor of a functional group is a group which can be converted into the functional group. Thus, for example, an epoxy group is a precursor of a hydroxyl group, an ester is a precursor of a carboxylic acid group, and a blocked isocyanate group is a precursor of an isocyanate group. Epoxide groups or hydroxyl groups are preferred.

At least two of the threaded ring-shaped molecules may be crosslinked by linking of the functional groups (A) and (B). This means that no later than on curing of the composition, corresponding covalent bonds are formed for linking. This results in the formation of a crosslinked polyrotaxane. Crosslinking in a polyrotaxane here refers to crosslinking of the ring-shaped molecules of at least one, preferably of two, polyrotaxanes. The composition preferably comprises a crosslinker which comprises at least two functional groups which are able to form a bond to the ring-shaped molecules, preferably through a covalent bond. The crosslinking preferably comprises, therefore, the formation of a covalent compound between a first ring-shaped molecule, threaded onto a first copolymer, and a second ring-shaped molecule, threaded onto a second copolymer. The crosslinking is preferably via the functional groups (A) of the ring-shaped molecules. With particular preference, the crosslinker is suitable for entering into a bond both with the functional groups (A) and with the functional groups (B) and in this way of crosslinking them with one another and to one another.

In accordance with the groups participating in the crosslinking, the crosslinking may be brought about, for example, by heating or radiation, preferably by heating. In the case of cyclodextrins or cyclodextrin derivatives, the crosslinker has at least two groups which are able to form a bond with the functional groups (A) of the cyclodextrins or cyclodextrin derivatives.

Preference, depending on the groups (A), and also optionally on the groups (B), is given to crosslinkers having functional groups selected from epoxy groups, isocyanate groups, blocked isocyanate groups, and (meth)acrylate groups.

The groups (A) and (B), and also, optionally, the functional groups of the crosslinker, may be selected in accordance with their reactivity with one another.

In one preferred embodiment, the groups (A) and (B) can be linked to one another only via the crosslinker. This is the case, for example, if the groups (A) and (B) are hydroxyl groups, amino groups or monoalkylamino groups, or precursors thereof. Under the conditions of curing, these groups are unable to enter into covalent bonding with one another, but instead only by reaction with a functional group of the crosslinker. In this case the molar ratio of the sum total of the groups (A) and (B) to the functional groups of the crosslinker is preferably 4:1 to 1:2, preferably 3:1 to 2:1. In the case of cyclodextrin and a crosslinker with isocyanate groups, this would be the ratio of OH groups to NCO groups.

In one preferred embodiment, the functional groups (A) in the case of the cyclodextrins or cyclodextrin derivatives are hydroxyl groups, more particularly unmodified hydroxyl groups of the cyclodextrins or cyclodextrin derivatives. The crosslinker is in this case selected from the group encompassing molecules having at least two isocyanate groups, diisocyanates, triisocyanates, blocked diisocyanates, diisothiocyanates, bisepoxides, cyanuric chloride, divinyl sulfones, and combinations thereof. A blocked diisocyanate may be regarded as a reaction product of a diisocyanate which is stable at room temperature but which cleaves under the influence of heat and forms a diisocyanate. Examples of blocked diisocyanates are described in D. A. Wicks, Z. W. Wicks Jr, Prog. Org. Coatings 1999, 36, 148-172. In the case of a bisepoxide, the crosslinker may be bisphenol A diglycidyl ether. There is no particular restriction on the crosslinker, provided it leads to the formation of a crosslinked polyrotaxane under the conditions. Other crosslinkers may be chosen accordingly by the skilled person.

The crosslinked polyrotaxane is preferably a gel, more preferably a slide-ring gel.

A slide-ring gel differs from a gel based on physical bonds or chemical bonds. In a slide-ring gel, the polymer chains are connected topologically. In a slide-ring gel, almost only the ring-shaped molecules are crosslinked with one another, while the copolymer chains are crosslinked to one another not at all or only to a small extent. This is shown, for example, in FIG. 16, in which the ring-shaped molecules of two polyrotaxanes are connected via a crosslinker. Since only the ring-shaped molecules are crosslinked with one another, they are able to move freely in the polymer along the polymer chains. This enables more effective compensation of stresses in the copolymer chains. Tensile stresses are distributed between the copolymer chains as well. As a result, surfaces or shaped articles comprising slide-ring gels are flexible and do not break very easily. A consequence of this property, however, is that the conventional crosslinked polyrotaxanes are not suitable for applications, for example, in the outdoor sector.

In the case of using unmodified hydrolyzates or particles carrying hydroxyl groups, for example, a reaction with the isocyanate groups would indeed be possible, but these bonds are hydrolytically and thermally unstable. Unfunctionalized silane condensates would act like a kind of silicone oil in the polyrotaxane matrix and cause phase separation. In the event of a scratch, the mechanical transfer of the forces to the mobile cyclodextrins on the polyrotaxane main chain would not be possible. The system would be simply unstable.

In the polyrotaxane of the invention, at least two of the threaded ring-shaped molecules are crosslinked by linking of the functional groups (A) and (B). This means that the crosslinking is via the organic modified inorganic hybrid material (FIG. 17) or the surface-modified particles (FIG. 18). The surface modification of the particles may also itself be an organically modified inorganic hybrid material (FIG. 19).

It is preferred here for the functional groups (A) and functional groups (B) to be connected to one another with a crosslinker. In this way it is possible for both the crosslinking of the ring-shaped molecules to take place via the crosslinker, and for the crosslinking of the ring-shaped molecules to take place with the organically modified inorganic hybrid material or the surface-modified inorganic particles.

The self-healing behavior of the purely polyrotaxane-based slide-ring gels is determined substantially by the packing possibility of the threaded cyclodextrins to form phase regions having ordered structures. The self-healing temperature in this case is influenced by the length of organic side groups on the cyclodextrins; the polymer main chain beneath, on the other hand, need only have sufficient flexibility. Through the particular structure of the organically modified inorganic hybrid material or the size of the inorganic particles, it is possible to prevent the formation of ordered packing structures of the ring-shaped molecules even at low levels of the aforesaid components. Where, additionally, inorganic particles are introduced which on their surface carry functional groups which are able to intervene in the crosslinking reaction (FIGS. 18 and 19), there is the additional possibility—beyond the possibility of introducing ceramic properties such as hardness and UV absorption behavior, for example—of, in particular, likewise exerting further influence on the relaxation behavior and hence the self-healing behavior of the materials. This is true in particular of the case whereby the surface-modified particles are modified with an organically modified inorganic hybrid material (FIG. 19), since the surface modification which envelops the particles represents a more extended independent phase with its own mechanical and relaxation properties. Furthermore, by virtue of the relative size of the particles in comparison to the ring-shaped molecules and of the associated space filling of the particles, apparently dense packing structures between the ring-shaped molecules are likewise made more difficult. This is manifested, for example, in the profile of the storage modulus of the shaped articles obtained. Accordingly, the intrinsic flexibility and deformability of this interfacial phase makes it possible to obtain the particular relaxation properties of the slide-ring gels, and the resultant nanostructured composite materials additionally exhibit a self-healing behavior which is relevant for technical applications.

The composition comprises at least one organically modified inorganic hybrid material which comprises functional groups (B), or at least one kind of surface-modified inorganic particles which have functional groups (B) on their surface.

An organically modified inorganic hybrid material comprising functional groups (B) comprises a (poly)condensate of at least one glass-forming or ceramic-forming element M, more particularly an element M from groups 3 to 5 and/or 12 to 15 of the Periodic Table of the Elements, preferably of Si, Al, B, Ge, Pb, Sn, Ti, Zr, V and Zn, more particularly of Si and Al, most preferably Si, or mixtures thereof. Proportionally there may also be elements of groups 1 and 2 of the periodic system (e.g., Na, K, Ca, and Mg) and of groups 5 to 10 of the periodic system (e.g., Mn, Cr, Fe, and Ni) or lanthanoids (e.g., Ce) in the (poly)condensate. A preferred organically modified inorganic hybrid material are polyorganosiloxanes. Particularly preferred for this purpose is the use of hydrolyzates of glass-forming or ceramic-forming elements, more particularly of silicon.

The organically modified hybrid materials are preferably obtained by the sol-gel method. With the sol-gel method, hydrolyzable compounds are commonly hydrolyzed with water, with or without acidic or basic catalysis, and are optionally at least partly condensed. The hydrolysis and/or condensation reactions lead to the formation of compounds or condensates having hydroxyl groups, oxo groups and/or oxo bridges, which serve as precursors. It is possible to use stoichiometric amounts of water, or else smaller or larger amounts. The sol which forms may be adjusted to the desired viscosity or the desired condensate size by means of suitable parameters, examples being degree of condensation, solvent, or pH. Further details of the sol-gel method are described for example in C. J. Brinker, G. W. Scherer: "Sol-Gel Science—The Physics and Chemistry of Sol-Gel-Processing", Academic Press, Boston, San Diego, New York, Sydney (1990).

According to the preferred sol-gel method, the hydrolyzates or (poly)condensates are obtained by hydrolysis and/or condensation from hydrolyzable compounds of the aforementioned glass-forming or ceramic-forming elements, which for producing the organically modified inorganic hybrid material additionally carry nonhydrolyzable organic substituents comprising at least partly a functional groups (B) or precursors thereof. Inorganic sols are formed here by the sol-gel method in particular from hydrolyzable compounds of the general formula $MX_n$, in which M is the above-defined glass-forming or ceramic-forming element, X is defined as in formula (I) below, where two groups X may be replaced by an oxo group, and n corresponds to the valence of the element and is usually 3 or 4. The compounds in question are preferably hydrolyzable Si compounds, more particularly of the formula (I) below.

Examples of hydrolyzable compounds of elements M other than Si that can be used are $Al(OCH_3)_3$, $Al(OC_2H_5)_3$, $Al(O\text{-}n\text{-}C_3H_7)_3$, $Al(O\text{-}i\text{-}C_3H_7)_3$, $Al(O\text{-}n\text{-}C_4H_9)_3$, $Al(O\text{-sec-}C_4H_9)_3$, $AlCl_3$, $AlCl(OH)_2$, $Al(OC_2H_4OC_4H_9)_3$, $TiCl_4$, $Ti(OC_2H_5)_4$, $Ti(O\text{-}n\text{-}C_3H_7)_4$, $Ti(O\text{-}i\text{-}C_3H_7)_4$, $Ti(OC_4H_9)4$, $Ti(2\text{-ethylhexoxy})$, $ZrCl_4$, $Zr(OC_2H_5)$, $Zr(O\text{-}n\text{-}C_3H_7)$, $Zr(O\text{-}i\text{-}C_3H_7)_4$, $Zr(OC_4H_9)_4$, $ZrOCl_2$, $Zr(2\text{-ethylhexoxy})_4$, and also Zr compounds which have complexing radicals, such as, for example, β-diketone and (meth)acryloyl radicals, sodium methoxide, potassium acetate, boric acid, $BCl_3$, $B(OCH_3)_3$, $B(OC_2H_5)_3$, $SnCl_4$, $Sn(OCH_3)_4$, $Sn(OC_2H_5)_4$, $VOCl_3$, and $VO(OCH_3)_3$.

The observations below regarding the preferred silicon are also valid mutatis mutandis for the other elements M. With particular preference, the sol or the organically modified inorganic hybrid material is obtained from one or more hydrolyzable and condensable silanes, with at least one silane having a nonhydrolyzable organic radical comprising a functional group (B) or precursors thereof. Particular preference is given to using one or more silanes having the following general formulae (I) and/or (II):

$$R_aSiX_{(4-a)} \qquad (I)$$

in which R is identical or different and represents a nonhydrolyzable radical, which optionally has a functional group, X is identical or different in each case and denotes hydrolyzable groups or hydroxyl groups, and a has the value of 1, 2 or 3, preferably 2 or 3, more particularly 3.

Optionally it is also possible to use as well a silane of the formula (II):

$$SiX_4 \qquad (II)$$

where X has the definition above.

In the formulae above, the hydrolyzable groups X are, for example, hydrogen or halogen (F, Cl, Br or I), alkoxy (preferably $C_{1-6}$ alkoxy, e.g., methoxy, ethoxy, n-propoxy, isopropoxy, and butoxy), aryloxy (preferably $C_{6-10}$ aryloxy, e.g., phenoxy), acyloxy (preferably $C_{1-6}$ acyloxy, e.g., acetoxy or propionyloxy), alkylcarbonyl (preferably $C_{2-7}$ alkylcarbonyl, e.g., acetyl), amino, monoalkylamino or dialkylamino having preferably 1 to 12, more particularly 1 to 6, carbon atoms in the alkyl group or groups. Preferred hydrolyzable radicals are $C_{1-4}$ alkoxy groups, more particularly methoxy and ethoxy.

The nonhydrolyzable radical R is, for example, alkyl (preferably $C_{1-6}$ alkyl, e.g., methyl, ethyl, n-propyl, isopropyl, n-butyl, s-butyl and t-butyl, pentyl, hexyl or cyclohexyl), alkenyl (preferably $C_{2-6}$ alkenyl, e.g., vinyl, 1-propenyl, 2-propenyl, and butenyl), alkynyl (preferably $C_{2-6}$-alkynyl, e.g., acetylenyl and propargyl), and aryl (preferably $C_{6-10}$ aryl, e.g., phenyl and naphthyl).

The stated radicals R and X may optionally have one or more customary substituents, such as halogen, ether, phosphoric acid, sulfonic acid, cyano, amide, mercapto, thioether or alkoxy groups, for example, as functional groups.

The radical R may contain a functional group via which crosslinking is possible. Specific examples of the functional groups of the radical R are epoxy, hydroxyl, amino, monoalkylamino, dialkylamino, carboxyl, allyl, vinyl, acryloyl, acryloyloxy, methacryloyl, methacryloyloxy, cyano, isocyano, thiol, aldehyde and alkylcarbonyl groups, or precursors thereof. These groups are bonded to the silicon atom preferably via alkylene, alkenylene or arylene bridge groups, which may be interrupted by oxygen or sulfer atoms or by —NH— groups. The stated bridging groups derive, for example, from the abovementioned alkyl, alkenyl or aryl radicals. The bridging groups of radicals R contain preferably 1 to 18, more particularly 1 to 8, carbon atoms.

At least one radical R of at least one of the silanes used comprises at least one functional group (B). Preferably this is a group via which crosslinking is possible; preferably these are hydroxyl groups, thiol groups, carboxylic acid groups, anhydride groups, isocyanate groups, amino groups, monoalkylamino groups, isocyano groups, acrylate groups, methacrylate groups, aldehyde groups, or precursors thereof.

In one embodiment of the invention, the composition comprises at least one kind of surface-modified inorganic particles which on their surface have functional groups (B).

Suitable for the particles are virtually all ceramic and glass systems, but also, optionally, metals, semiconductors, and customary fillers. Preferred are ceramic particles. Frequently used are oxides, nitrides, carbides, carbonitrides, silicides or borides. Mixtures of different particles can also be used.

The particles are modified on the surface. The particles are, for example, particles of metal, including metal alloys, semi-metal (e.g., B, Si and Ge) compounds or metal compounds, more particularly metal chalcogenides, more preferably the oxides and sulfides, nitrides, carbides, silicides, and borides. It is possible to use one kind of particles or a mixture.

Preference is given to oxides, carbides, nitrides, chalcogenides of the elements B, Si, Al, Ti, Zr, Y, V, Cr, Cd, Mn, Fe, Cu, Zn, In, Nb, Ce, Ta, Mo or W.

Examples are (optionally hydrated) oxides such as ZnO, CdO, $SiO_2$, $GeO_2$, $TiO_2$, $ZrO_2$, $CeO_2$, $SnO_2$, $Al_2O_3$ (e.g., amperite, boehmite, AlO(OH), also as aluminum hydroxide), $B_2O_3$, $In_2O_3$, $La_2O_3$, $Fe_2O_3$ (e.g., hematite), $Fe_3O_4$, $Cu_2O$, CuO, $Ta_2O_5$, $Nb_2O_5$, $V_2O_5$, $MoO_3$ or $WO_3$; further chalcogenides, such as sulfides (e.g. CdS, ZnS, PbS, and $Ag_2S$), selenides (e.g., GaSe, CdSe, and ZnSe) and tellurides (e.g., ZnTe or CdTe); halides, such as AgCl, AgBr, AgI, CuCl, CuBr, $CdI_2$, and $PbI_2$; carbides such as $CdC_2$ or SiC; arsenides, such as AlAs, GaAs, and GeAs; antimonides such as InSb; nitrides, such as BN, AlN, $Si_3N_4$, and $Ti_3N_4$; phosphides such as GaP, InP, $Zn_3P_2$, and $Cd_3P_2$; phosphates, silicates, including relatively complex silicates, such as phyllosilicates, talc, zirconates, aluminates, stannates, and the corresponding mixed oxides (e.g., indium tin oxide (ITO), antimony tin oxide (ATO), fluorine-doped tin oxide (FTO), spinels, ferrites, or mixed oxides with perovskite structure such as $BaTiO_3$ and $PbTiO_3$). Additionally suitable—provided they have corresponding surface modification—are customary pigments and fillers, such as, for example, graphite, sulfates, such as baryte and gypsum, carbonates, such as calcites, dolomites, and chalks, sulfides, such as zinc sulfide or lithopone, glass, and also oxides and silicates, such as silicas, cristobalite, talc, kaolin, and mica.

There is no particular restriction on the size of particles. Particles having a primary particle size of between 1 nm and 1000 nm are usefully used (determined by TEM on a random sample of at least 100 particles). Preferred is a primary particle size below 500 nm, preferably below 300 nm. Particularly preferred is a primary particle size between 1 nm and 150 nm, preferably between 5 nm and 50 nm. Preferably these values apply to at least 80%, preferably at least 90%, of the particles (determined by TEM on a random sample of at least 100 particles).

The particles used are preferably fully redispersible, meaning that they do not form aggregates.

The particles are surface-modified. The modification of particle surfaces is a known method, as has been described by the applicant in WO 93/21127 or WO 96/31572, for example, for nanoscale particulate solids. There are in principle two different ways in which the surface-modified particles can be produced: first, by modification of particles already produced, and secondly by production of the particles using one or more compounds possessing corresponding functional moieties.

Via the modifying agent it is possible to attach functional groups on the surface of the particles. Examples are the functional groups stated above for the hybrid systems, such as (meth)acryloyl, or epoxide, thiol, carboxyl, carboxylic anhydride, or amino groups.

As well as organic or inorganic acids, suitable modifying agents include organic compounds of low molecular mass or hydrolyzable silanes of low molecular mass which have at least one nonhydrolyzable group, which are able to react and/or (at least) interact with groups present on the surface of the particles. Located on particles, for example, as surface groups in the form of residual valences, are reactive groups, such as hydroxyl groups and oxy groups, in the case of metal oxides, for example; or thiol groups and thio groups, in the case of metal sulfides, for example; or amino, amide, and imide groups, in the case of nitrides, for example.

The particles may be modified, for example, by mixing the particles with modifying agents elucidated below, optionally in a solvent and optionally in the presence of a catalyst. Of course, useful conditions, such as temperature, proportions, reaction time, and so on, are dependent on the respective specific reactants and on the desired degree of coverage.

The modifying agents may, for example, develop both covalent and ionic (saltlike) or coordinate bonds to the surface of the particles, while the pure interactions include, by way of example, dipole-dipole interactions, hydrogen bonds, and van der Waals interactions. Preferred is the development of covalent, ionic and/or coordinate bonds, preferably of covalent bonds. A coordinate bond is understood to be the formation of a complex. Between the surface modifying agent and the particles there may be, for example, an acid/base reaction of Brønsted or Lewis type, complex formation, or esterification.

Examples of suitable functional groups of the surface modifying agents for attachment to the particles are carboxylic acid groups, anhydride groups, acid amide groups (primary, secondary, tertiary, and quaternary) amino groups, SiOH groups, hydrolyzable radicals of silanes, and C—H-acidic moieties, e.g., β-dicarbonyl compounds. It is also possible for two or more of these groups to be present simultaneously in one molecule (betaines, amino acids, EDTA, etc.).

Examples of compounds which are used for the surface modification are optionally substituted (e.g., by hydroxyl), saturated or unsaturated monocarboxylic and polycarboxylic acids having 1 to 24 carbon atoms, which may also contain ether bonds (such as trioxadecanoic acid), and also their anhydrides, esters (preferably C1-C4 alkyl esters) and amides, e.g., methyl methacrylate.

Examples of other suitable surface modifiers are quaternary ammonium salts of the formula $NR^1R^2R^3R^{4+}X^-$, in which $R^1$ to $R^4$ are optionally different from one another and are aliphatic, aromatic or cycloaliphatic groups having preferably 1 to 12, more particularly 1 to 8, carbon atoms, such as, for example, alkyl groups having 1 to 12, more particularly 1 to 8, and very preferably 1 to 6 carbon atoms (e.g., methyl, ethyl, n- and 1-propyl, butyl or hexyl), and X is an organic or inorganic anion, e.g., acetate, $OH^-$, $Cl^-$, $Br^-$ or $I^-$; monoamines and polyamines, more particularly those of the general formula $R_{3-n}NH_n$, in which n=0, 1 or 2 and the radicals R independently of one another are alkyl groups having 1 to 12, more particularly 1 to 8, and very preferably 1 to 6 carbon atoms (e.g. methyl, ethyl, n- and isopropyl, butyl or hexyl), and ethylenepolyamines (e.g., ethylenediamine, diethylenetriamine, etc.); amino acids; imines; β-dicarbonyl compounds having 4 to 12, more particularly 5 to 8, carbon atoms, such as, for example, acetylacetone, 2,4-hexanedione, 3,5-heptanedione, acetoacetic acid and C1-C4 alkyl esters of acetoacetic acid, such as ethyl acetoacetate; and silanes.

Modification takes place preferably using hydrolyzable silanes, where the silane has a nonhydrolyzable group. This surface modification with hydrolyzable silanes is especially useful for oxidic particles such as $SiO_2$ or $CeO_2$. Examples are silanes of the general formula (I).

For the preparation in situ of nanoscale inorganic particulate solids having polymerizable/polycondensable surface groups, reference may be made to WO 98/51747 (DE 19746885).

It is also possible for the particles stated above to be modified with an organically modified inorganic hybrid material of the invention.

The fraction of component b) is preferably up to 50 wt %, preferably from 1 wt % to 40 wt %, preferably 2 wt % to 30 wt %, based on the amount of components a), b), and c) in each case without solvent—that is, based on the solids content of the composition. Any further additives present besides solvent, such as pigments, are in this case included in the solids content.

In one preferred embodiment, the fraction of organically modified inorganic hybrid material is 1 to 20 wt %, more preferably 3 to 10 wt %, more particularly 5 wt %, based in each case on the solids content of the composition.

In another preferred embodiment, the fraction of modified particles is 1 to 30 wt %, preferably 1 to 20 wt %, more preferably 5 to 15 wt %, more particularly 10 wt %.

It is also possible for both fractions to be combined with one another.

The fraction of polyrotaxane is preferably more than 45 wt %, preferably more than 50 wt %, more particularly more than 60 wt %, based on the solids content of the composition.

The composition preferably takes the form of a dispersion in one or more solvents. The total solids content in this case is preferably 5 to 50 wt %, preferably 10 to 30 wt %.

In one preferred embodiment, the crosslinker content is 0.001 to 1 wt %.

Solvents which can be used are all suitable solvents, preferably organic solvents. Examples are esters, such as butyl acetate ethyl acetate or 1-methoxy-2-propyl acetate, ketones, such as acetone, methyl isobutyl ketone or methyl ethyl ketone, alcohols, such as isopropanol, ethers, such as butyl glycol, methoxypropanol, tetrahydrofuran, (alkyl)aromatics, such as, for example xylene, mono-, di- or triethylbenzene, propyl- or isopropylbenzene, ethylmethylbenzene, aliphatic hydrocarbons, such as, for example, white spirit, terpene hydrocarbons, such as, for example dipentenes, and halogenated hydrocarbons such as dichloromethane or chloroform.

The composition may also additionally comprise further hydrophobic compounds, suitable for entering into a bond with the functional groups (A) and/or (B). As a result, it is possible on the one hand to influence the hydrophobic properties of the resulting material, such as the contact angle. On the other hand, it is also possible to control the degree of crosslinking, since these functional groups (A) and/or (B) are not longer available for the crosslinking. Preference is given to hydrophilic compounds comprising at least one functional group which is able to react with at least one functional group (A) and/or (B).

Such compounds comprise preferably a functional group selected from hydroxyl groups, thiol groups, carboxylic acid groups, anhydride groups, isocyanate groups, amino groups, monoalkylamino groups, isocyano groups, acrylate groups, methacrylate groups, aldehyde groups, or precursors thereof, depending on the functional groups (A) and/or (B) present, and also a C1-C10 alkyl radical, which may also be cyclic and/or branched. Examples of such compounds are butyl isocyanate, hexyl isocyanate, acetic anhydride, and acetyl chloride.

The invention further relates to a self-healing composite material obtained by curing the composition of the invention. The curing is accomplished preferably by heating and/or radiation, preferably by heating.

The invention further relates to a method for producing a self-healing composite material, which comprises providing a composition of the invention and curing the composition of the invention.

Preference is given to curing in the absence of additional crosslinkers, unless indicated above, at a temperature between 80° C. and 150° C., preferably 100° C. and 130° C., more preferably 120° C. The curing is carried out preferably for 5 minutes to 24 hours, preferably 1 hour to 10 hours.

The invention further relates to a surface coated with a self-healing composite material. For this, the composition of the invention is applied to a surface and cured. The surface is not limited and may for example be metal, glass, ceramic, wood, coatings, plastic. The composition may be applied by dipping, spraying, spin coating, knife coating, or spreading. For this the composition is typically used as a dispersion or solution in water or an organic solvent.

The composition may also be applied by powder coating, as a constituent, for example, of powder coating materials.

It is also possible for the composition or products obtained from it to be used as constituents of electrodeposition coating materials for electrocoating.

For this purpose it may be necessary to adapt the composition in relation to additives and/or solvents. It may also be necessary for corresponding functional groups such as amino groups or carboxylic acid groups to be present on one or more of the components.

The invention further relates to a shaped article made from the self-healing composite material of the invention. For this purpose, the material of the invention may be introduced into a mold and cured. Alternatively, in a multistage operation, it is also possible for a plurality of layers of the composition to be applied and dried, and only cured later.

"Self-healing" refers to the capacity of the material to repair damage through mechanical exposures without human agency. This is of great interest, for example, for paints and adhesives. Such paints and adhesives may be used for example in the automobile sector in finishes, in order for example to eliminate minor damage due to vehicle washers or weather. It may be necessary, for the self-healing, to heat the composite material to a particular temperature for a particular time, preferably to a temperature below the temperature for curing; a temperature of 60° C. to 100° C. is preferable.

Further applications are films, adhesive bonds, shaped articles produced for example by 3D printing, film coatings, finishes, as protective coating against rust, etc.

In accordance with the application, the composition may comprise further substances, such as solvents, wetting aids, pigments, effect pigments, flakes, matrix materials.

Further details and features emerge from the following description of preferred working examples in conjunction with the dependent claims. In this description, the respective features may be actualized alone or in multiple combination with one another. The possibilities for achieving the object are not confined to the working examples.

The working examples are represented schematically in the figures. Identical reference numerals in the individual figures denote identical or functionally identical elements or elements which correspond to one another in terms of their functions.

BRIEF DESCRIPTION OF THE DRAWINGS

The figures specifically show the following:

FIG. 1B: 2000-400 $cm^{-1}$);

FIG. 2B: 2000-400 $cm^{-1}$);

FIG. 3B: 2000-400 $cm^{-1}$);

FIG. 4B: nonreversing heat flow);

FIG. 5B: nonreversing heat flow);

FIG. 6B: nonreversing heat flow);

FIG. 8B: loss modulus Eps");

FIG. 9B: loss modulus Eps");

FIG. 10B: loss modulus Eps");

FIG. 11B: loss modulus Eps")

FIG. 12 results of the Sun test for transparency and weathering stability (amounts in wt %, film thickness: 1 mm);

DETAILED DESCRIPTION OF INVENTION

Figure 1A:
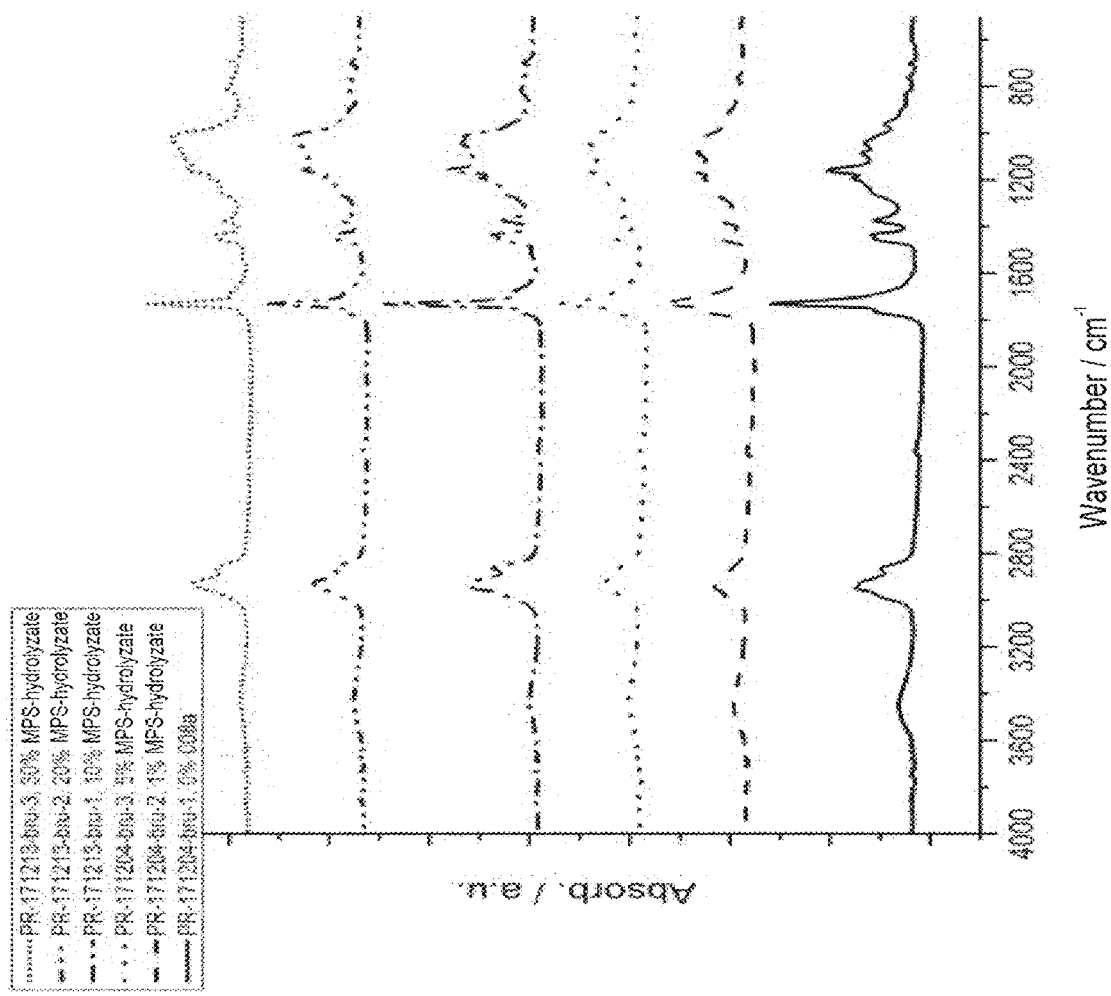
FIGS. 1A-1B infrared spectra (FT-IR) of the samples with MPS hydrolyzate (MPS: mercaptopropyltrimethoxysilane) (FIG. 1A: 4000-600 $cm^{-1}$.

Table 9 reports the fraction of component b) as a fraction of the solids content of the composition. This corresponds to the amount in the cured composition. For the designation of the samples and in the figures, the target solids content of component b) has been used.

The sample designations with "PR-" refer to coatings, those without "S-" to the associated paints. In the figures "PR-S-" refer to the cured coatings, the designations "PR-" without "S-" to the associated paints.

Example 1: Preparation of a Binary Base Polyrotaxane 94.43 g of a RAMEB solution (RAMEB: partly methylated β-cyclodextrin, Wacker Chemie) in water (50 wt %, 36 mmol) are admixed with 1.35 ml (1.12 g, 10.8 mmol) of styrene (distilled) and 5 ml of methanol (synthetic grade). Then nitrogen is introduced over 1 h. 0.140 g, 0.43 mmol of radical initiator VA044 (2,2'-azobis[2-imidazolin-2-yl)propane) is dissolved with 1 ml of distilled water and likewise degassed for 5 min with nitrogen. After 1 h the system is closed. The reaction mixture is admixed with 8.2 ml (4.9 g, 72 mmol) of 2,3-dimethyl-1,3-butadiene, 0.042 ml of carbon tetrachloride chain transfer agent (0.1 mol % on the polymer chain, degassed for 5 min) and the initiator VA044. Subsequently the temperature was adjusted to 38° C. and the reaction mixture was stirred further for 48 h.

After the end of the reaction, the polyrotaxane-water mixture is added to cold water containing 10 vol % EtOH and flushed with nitrogen for 20 min. After the filtration, the procedure is repeated twice more. The precipitated polyrotaxane is subsequently dried for 3 d in a vacuum drying cabinet at 80° C. and dissolved in chloroform; following concentration of the chloroform, THF was added and the product was subsequently dried under reduced pressure. Analysis by gel permeation chromatography gives an average molecular weight of M=80 000 g/mol.

Example 2: Preparation of a Ternary Base Polyrotaxane (PR-bru008a*/PR-bru008b*)

94.43 g of a RAMEB solution (RAMEB: partly methylated β-cyclodextrin, Wacker Chemie) in water (50 wt %, 36 mmol) are admixed with 0.34 ml (0.375 g, 3.6 mmol) of styrene (distilled) and 5 ml of methanol (synthetic grade). Then nitrogen is introduced over 1 h. 0.140 g, 0.43 mmol of radical initiator VA044 (2,2'-azobis[2-imidazolin-2-yl)propane) is dissolved with 1 ml of distilled water and likewise degassed for 5 min with nitrogen. After 1 h the system is closed. The reaction mixture is admixed with 8.2 ml (4.9 g, 72 mmol) of 2,3-dimethyl-1,3-butadiene, 6.52 ml (6.20 g, 72 mmol) of methyl acrylate, 0.036 ml of dodecanethiol chain transfer agent (0.1 mol % on the polymer chain, degassed for 5 min) and the initiator VA044. Subsequently the temperature was adjusted to 38° C. and the reaction mixture was stirred further for 48 h. After the end of the reaction, the polyrotaxane-water mixture is added to cold water containing 10 vol % EtOH and flushed with nitrogen for 20 min. After the filtration, the procedure is repeated twice more. The precipitated polyrotaxane is subsequently dried for 3 d in a vacuum drying cabinet at 80° C. and dissolved in chloroform; following concentration of the chloroform, THF was added and the product was subsequently dried under reduced pressure. Analysis by gel permeation chromatography gives an average molecular weight of M=26 000 g/mol (mole fraction 0.012 styrene, 0.004 cyclodextrin, 0.514 isoprene, 0.469 methacrylate).

Base polyrotaxane PR-bru008*: analogous to PR-bru008a*/PR-bru008b* but with 0.012 ml of dodecanethiol chain transfer agent (0.033 mol % on the polymer chain). Analysis by gel permeation chromatography gives an average molecular weight of M=57 000 g/mol.

The molar mass and dispersities of the polymers were measured by gel permeation chromatography (GPC) at room temperature. Separation took place with two columns from PSS (Polymer Standards Service, Mainz, Germany (PSS)) SDV $10^3$ Å and $10^5$ Å. The recording was made using a refractive index detector (Shodex RI-101). The mobile phase was tetrahydrofuran (THF) and the flow rate was kept at 1 ml/min with a Viscotek VE1121 GPC pump. The GPC calibration curve was determined using a number of polystyrene standards (from 1 090 000 to 682 g/mol) from PSS.

The threading rates determined for the samples obtained were as follows:
PR_bru008*: 1.57%
PR_bru008a*: 3.42%
PR_bru008b*: 3.73%

Example 3: Preparation of the Epoxysilane-Modified $SiO_2$ Particles ($SiO_2$/GPTES)

2.5 ml (3.085 g $SiO_2$) of MIBK-ST (Nissan, Organosilicasol™) were admixed with 1.61 ml of GPTES and stirred at 40° C. for 4 d. The dispersion obtained was used, without further workup, for producing the composites. The solids content of the dispersion is 33.5 wt %. The $SiO_2$ particles used have a size distribution of $d_{90}$<15 nm. The majority of the particles have a diameter of 10-15 nm.

Example 4: Preparation of the Mercaptosilane Hydrolyzate (MPS-Hydrolyzate)

5.8911 g of 3-mercaptopropyltrimethoxysilane (MPS) are admixed with 0.3375 g of distilled water. The initially two-phase emulsion was stirred under inert gas at 60° C. for 23 h and became a transparent mixture. The solids content of the resulting mixture, after removal of the solvent at 100° C. in a vacuum drying cabinet, was determined gravimetrically as being 25 wt %.

Example 5: Preparation of the Mercaptosilane-Modified $CeO_2$ Particles ($CeO_2$/MPS)

0.3398 g of a 20 wt % $CeO_2$ dispersion in water (Sigma-Aldrich) were admixed with 1.974 g of 3-mercaptopropyltrimethoxysilane (MPS). The initially two-phase emulsion, after stirring under inert gas at 60° C. for 17 h, became a transparent dispersion. The solids content of the resulting dispersion, after removal of the solvent at 100° C. in a vacuum drying cabinet, was determined gravimetrically as being 81.3 wt %. The $CeO_2$ particles used have a particle size of 30-50 nm.

Coating Materials

Example 6: Unfilled, Crosslinked Polymer: PR-S-171214-Bru-1 (PR-bru008*; Coating)/PR-S-171204-bru-1 (PR-bru008a*)/PR-S-180111-bru-1 (PR-bru008b*)/PR-171115-ali-1 (PR-bru008*; Film)

1.3 g of polyrotaxane paint base (30 wt % PR-bru008*/PR-bru008a*/PR-bru008b* in MPA) are diluted with 0.613 g of MPA (1-methoxy-2-propyl acetate). After 5 min of stirring, 0.075 g of Desmodur N 3900 stock solution crosslinker (10 wt % Desmodur N 3900 in MPA) are added and mixed in for a further 5 min. The resulting mixture has a solids content of 20 wt % and a total mass of 1.99 g. 0.8 ml of the paint in each case is subsequently applied by spin coating to a black-painted stainless steel panel or to a stainless steel substrate cleaned with ethanol, and the paint is cured in an oven at 120° C. for 3 h. A well-adhering, transparent coating is formed.

Example 7: PR-S-171121-bru-1 PR with 1% $SiO_2$/GPTES 5 g of polyrotaxane paint base (30 wt % PR-bru008* in MPA) are diluted with 2.382 g of MPA. After 5 min of stirring, 0.051 g of functionalized $SiO_2$ particles from example 3 is added and the mixture is stirred for 30 min. Following addition of 0.2871 g of Desmodur N 3900 stock solution crosslinker (10 wt % Desmodur N 3900 in MPA), the resulting mixture has a solids content of 20 wt % and a total mass of 7.72 g. 0.8 ml of the paint in each case is subsequently applied by spin coating to a black-painted stainless steel panel or to a stainless steel substrate cleaned with ethanol, and the paint is cured in an oven at 120° C. for 3 h. A well-adhering, transparent coating is formed.

Example 8: PR-S-171121-bru-2 5% $SiO_2$/GPTES 5 g of polyrotaxane paint base (30 wt % PR-bru008* in MPA) are diluted with 2.484 g of MPA. After 5 min of stirring, 0.255 g of functionalized $SiO_2$ particles from example 3 is added and the mixture is stirred for 30 min. Following addition of 0.2871 g of Desmodur N 3900 stock solution crosslinker (10 wt % Desmodur N 3900 in MPA), the resulting mixture has a solids content of 20 wt % and a total mass of 8.03 g. 0.8 ml of the paint in each case is subsequently applied by spin coating to a black-painted stainless steel panel or to a stainless steel substrate cleaned with ethanol, and the paint is cured in an oven at 120° C. for 3 h. A well-adhering, transparent coating is formed.

Example 9: PR-S-171127-bru-1 10% $SiO_2$/GPTES 5 g of polyrotaxane paint base (30 wt % PR-bru008* in MPA) are diluted with 2.611 g of MPA. After 5 min of stirring, 0.510 g of functionalized $SiO_2$ particles from example 3 is added and the mixture is stirred for 30 min. Following addition of 0.2871 g of Desmodur N 3900 stock solution crosslinker (10 wt % Desmodur N 3900 in MPA), the resulting mixture has a solids content of 20 wt % and a total mass of 8.41 g. 0.8 ml of the paint in each case is subsequently applied by spin coating to a black-painted stainless steel panel or to a stainless steel substrate cleaned with ethanol, and the paint is cured in an oven at 120° C. for 3 h. A well-adhering, transparent coating is formed.

Example 10: PR-S-171127-bru-2 20% $SiO_2$/GPTES 5 g of polyrotaxane paint base (30 wt % PR-bru008* in MPA) are diluted with 2.866 g of MPA. After 5 min of stirring, 1.019 g of functionalized $SiO_2$ particles from example 3 are added and the mixture is stirred for 30 min. Following addition of 0.2871 g of Desmodur N 3900 stock solution crosslinker (10 wt % Desmodur N 3900 in MPA), the resulting mixture has a solids content of 20 wt % and a total mass of 9.17 g. 0.8 ml of the paint in each case is subsequently applied by spin coating to a black-painted stainless steel panel or to a stainless steel substrate cleaned with ethanol, and the paint is cured in an oven at 120° C. for 3 h. A well-adhering, transparent coating is formed.

Example 11: PR-S-171127-bru-3 30% $SiO_2$/GPTES 5 g of polyrotaxane paint base (30 wt % PR-bru008* in MPA) are diluted with 3.121 g of MPA. After 5 min of stirring, 1.529 g of functionalized $SiO_2$ particles from example 3 are added and the mixture is stirred for 30 min. Following addition of 0.2871 g of Desmodur N 3900 stock solution crosslinker (10 wt % Desmodur N 3900 in MPA), the resulting mixture has a solids content of 20 wt % and a total mass of 9.94 g. 0.8 ml of the paint in each case is subsequently applied by spin coating to a black-painted stainless steel panel or to a stainless steel substrate cleaned with ethanol, and the paint is cured in an oven at 120° C. for 3 h. A well-adhering, transparent coating is formed.

Figure 3A:
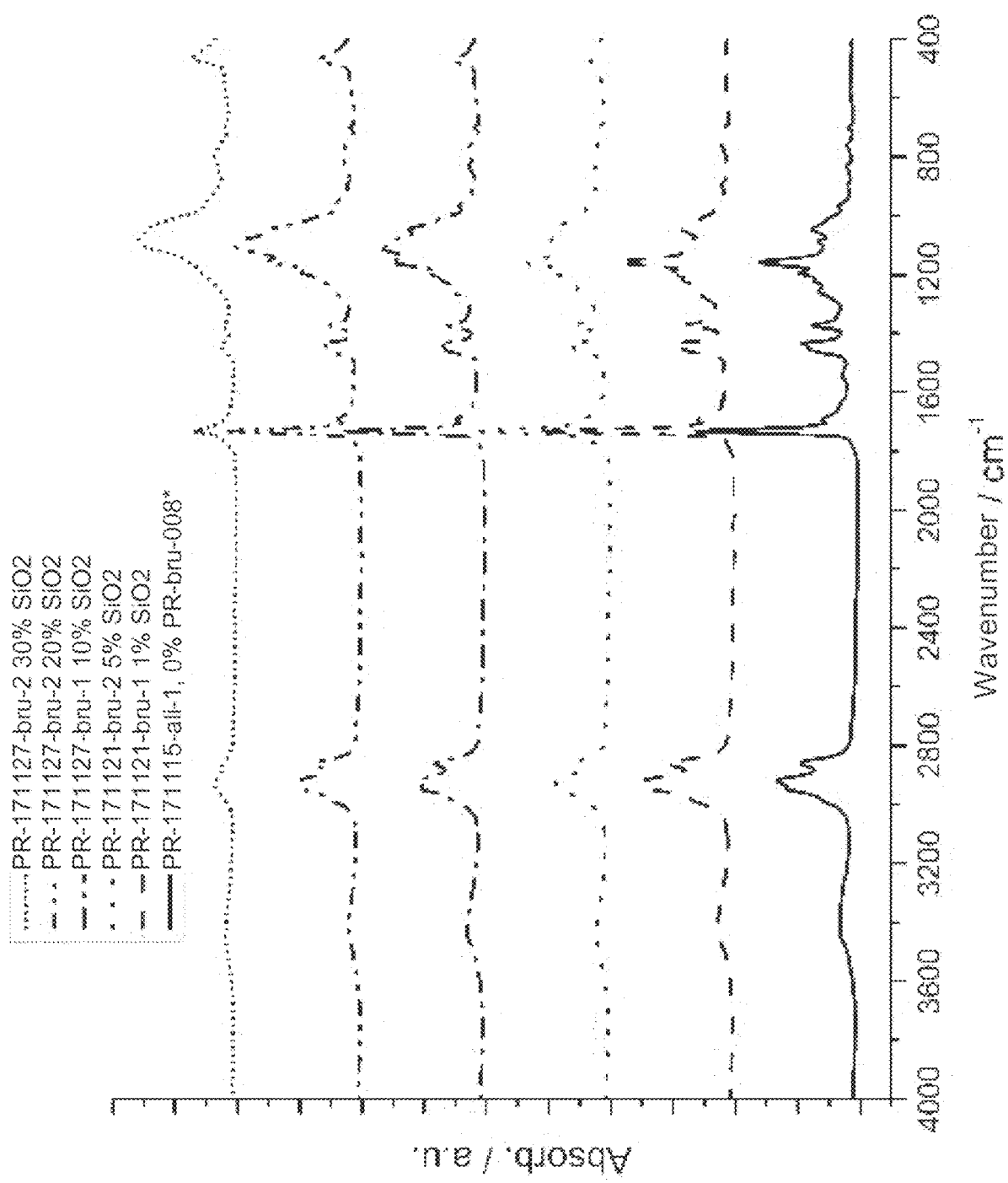
FIGS. 3A-3B infrared spectra (FT-IR) of the samples with $SiO_2$/GPTES modification (FIG. 3A: 4000-400 $cm^{-1}$.
Figure 3B:
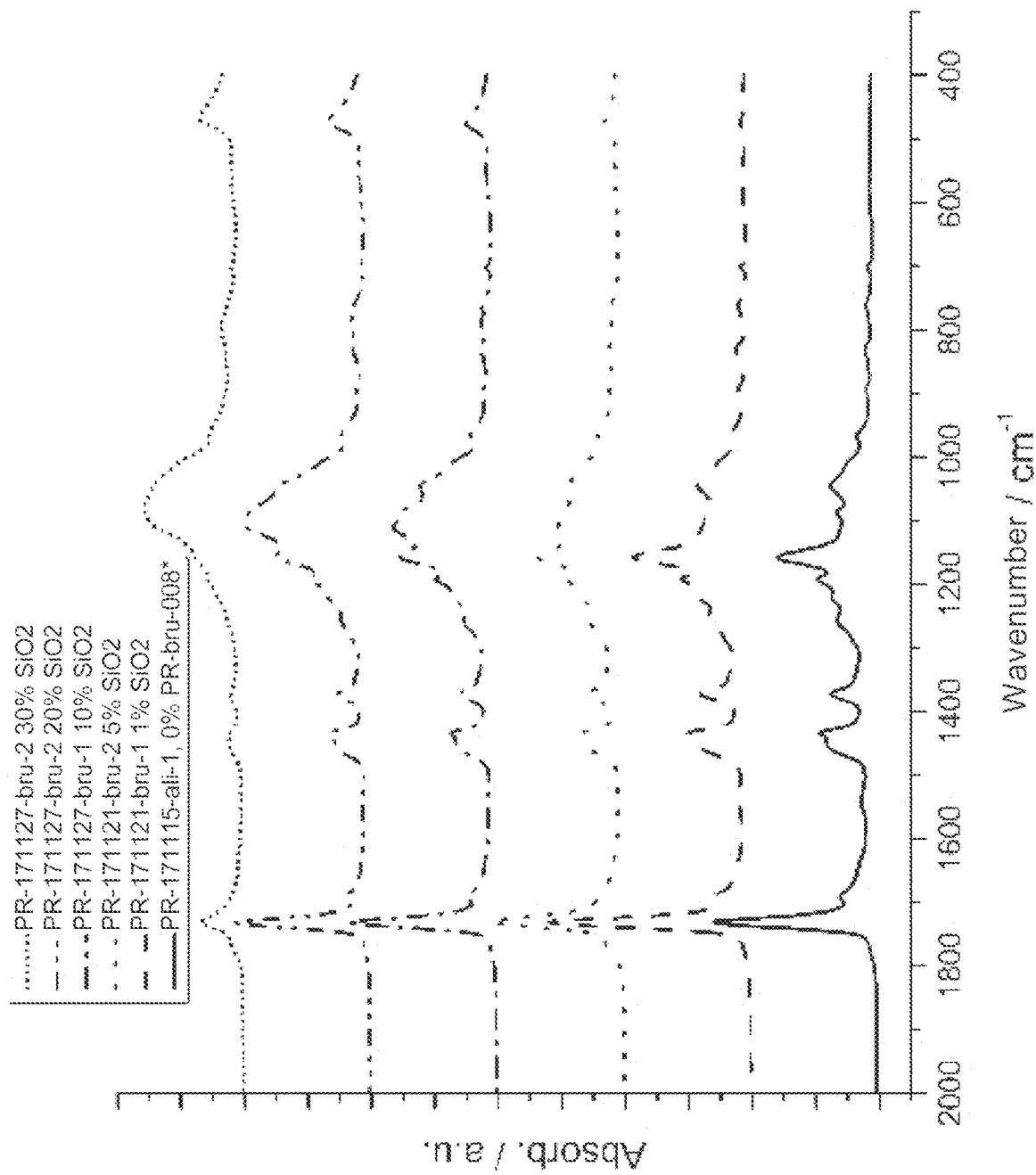

FIGS. 3A-3B show the IR spectra of the paints of examples 6, 7, 9, 10, and 11. At around 1050 $cm^{-1}$ the increase in the Si—O—Si absorption with increasing level of MPS hydrolyzate is apparent.

Figure 6A:
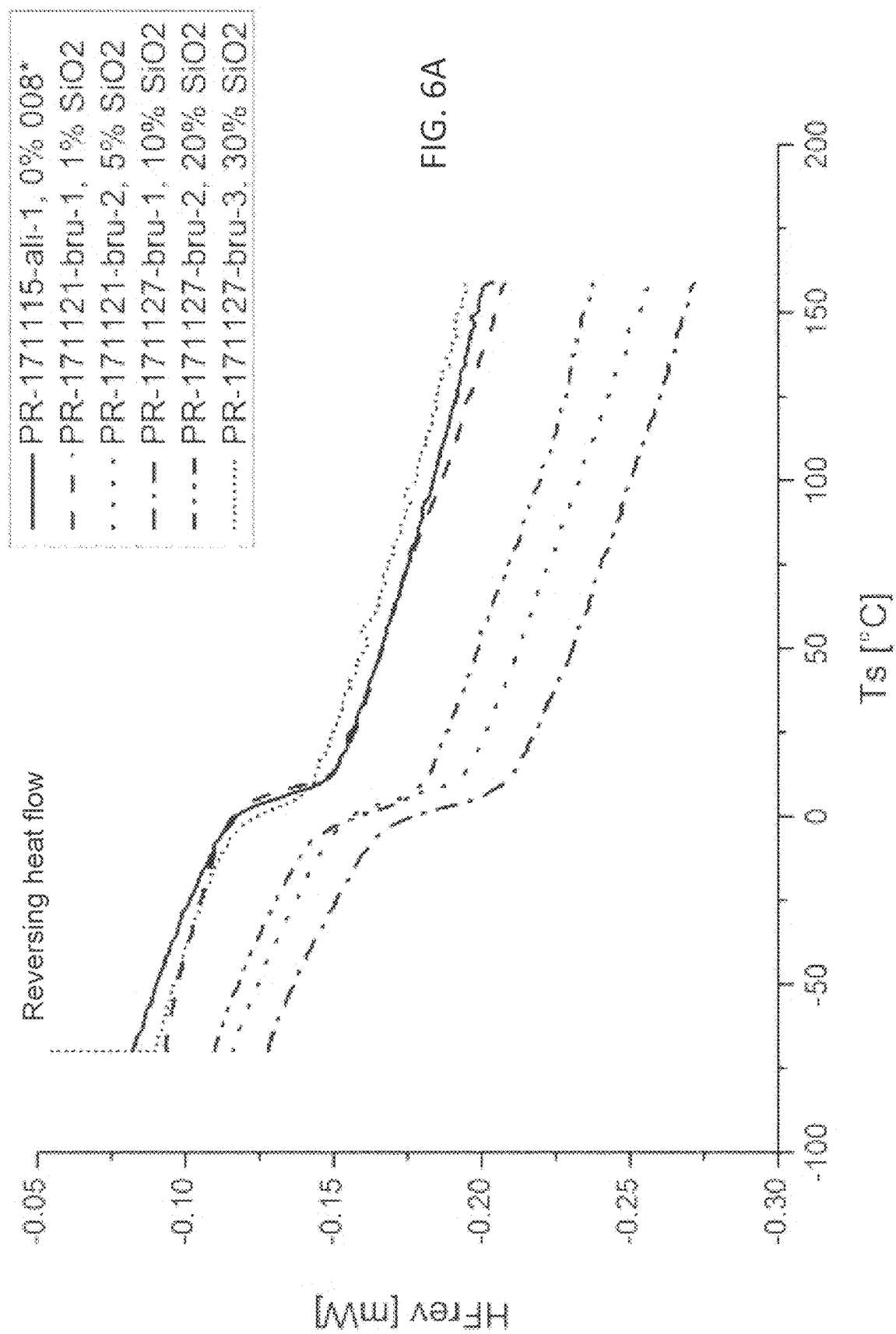
FIGS. 6A-6B differential scanning calorimetry (DSC) of the samples with $SiO_2$/GPTES modification (FIG. 6A: reversing heat flow.
Figure 6B:
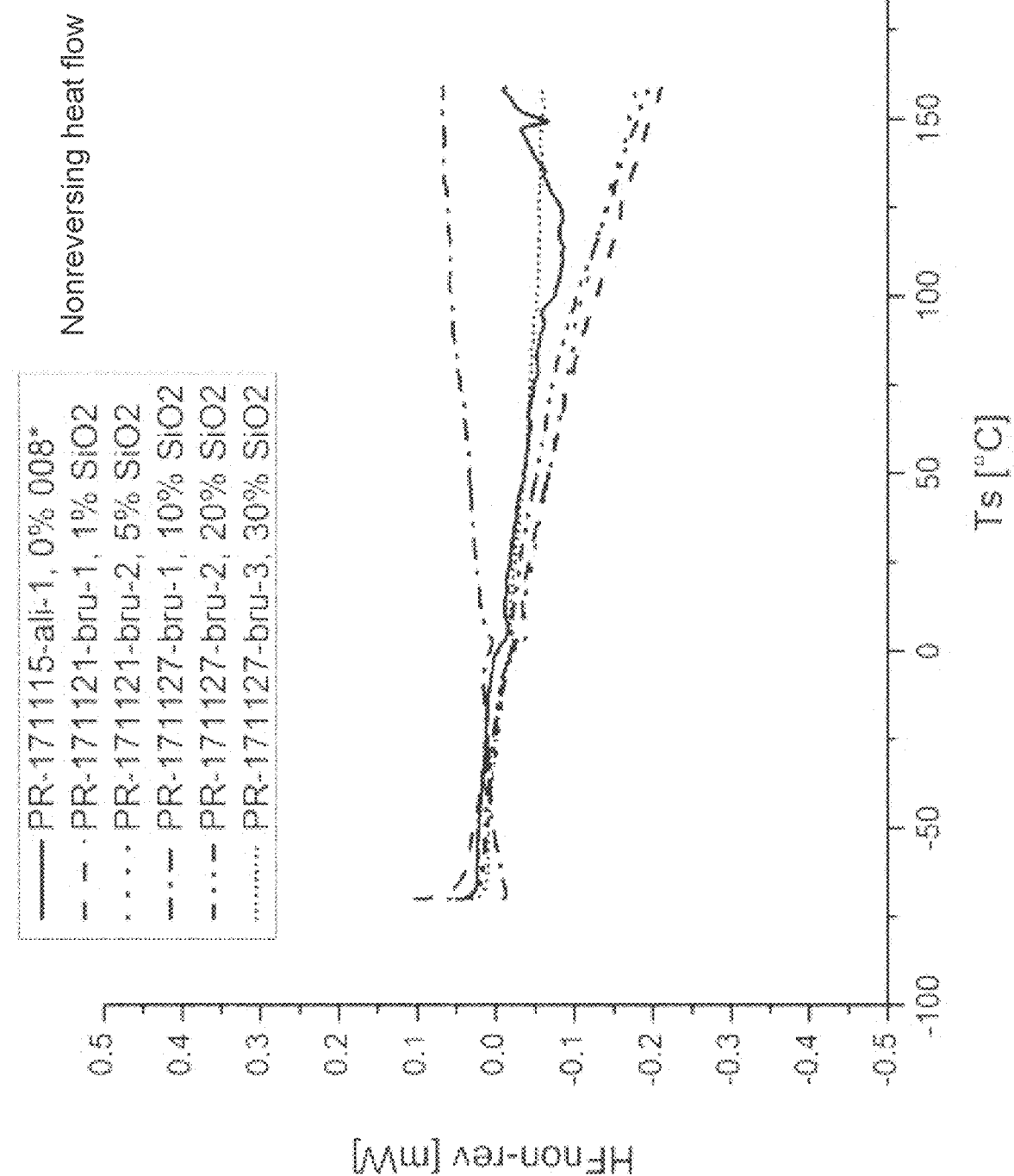

FIGS. 6A-6B show the results of the DSC measurements of the samples of examples 6, 7, 9, 10, and 11.

Example 12: PR-S-171204-bru-2 1% MPS Hydrolyzate 5 g of polyrotaxane paint base (30 wt % PR-bru008a* in MPA) are diluted with 2.282 g of MPA. After 5 min of stirring, 0.062 g of MPS hydrolyzate from example 4 is added and the mixture is stirred for 30 min. Following addition of 0.467 g of Desmodur N 3900 stock solution crosslinker (10 wt % Desmodur N 3900 in MPA), the resulting mixture has a solids content of 20 wt % and a total mass of 7.81 g. 0.8 ml of the paint in each case is subsequently applied by spin coating to a black-painted stainless steel panel or to a stainless steel substrate cleaned with ethanol, and the paint is cured in an oven at 120° C. for 3 h. A well-adhering, transparent coating is formed.

Example 13: PR-S-171204-bru-3 5% MPS Hydrolyzate 5 g of polyrotaxane paint base (30 wt % PR-bru008a* in MPA) are diluted with 2.344 g of MPA. After 5 min of stirring, 0.309 g of MPS hydrolyzate from example 4 is added and the mixture is stirred for 30 min. Following addition of 0.467 g of Desmodur N 3900 stock solution crosslinker (10 wt % Desmodur N 3900 in MPA), the resulting mixture has a solids content of 20 wt % and a total mass of 8.12 g. 0.8 ml of the paint in each case is subsequently applied by spin coating to a black-painted stainless steel panel or to a stainless steel substrate cleaned with ethanol, and the paint is cured in an oven at 120° C. for 3 h. A well-adhering, transparent coating is formed.

Example 14: PR-S-171213-bru-1 10% MPS Hydrolyzate 5 g of polyrotaxane paint base (30 wt % PR-bru008a* in MPA) are diluted with 2.421 g of MPA. After 5 min of stirring, 0.619 g of MPS hydrolyzate from example 4 is added and the mixture is stirred for 30 min. Following addition of 0.467 g of Desmodur N 3900 stock solution crosslinker (10 wt % Desmodur N 3900 in MPA), the resulting mixture has a solids content of 20 wt % and a total mass of 8.51 g. 0.8 ml of the paint in each case is subsequently applied by spin coating to a black-painted stainless steel panel or to a stainless steel substrate cleaned with ethanol, and the paint is cured in an oven at 120° C. for 3 h. A well-adhering, transparent coating is formed.

Example 15: PR-S-171213-bru-2 20% MPS Hydrolyzate 5 g of polyrotaxane paint base (30 wt % PR-bru008a* in MPA) are diluted with 2.576 g of MPA. After 5 min of stirring, 1.237 g of MPS hydrolyzate from example 4 are added and the mixture is stirred for 30 min. Following addition of 0.467 g of Desmodur N 3900 stock solution crosslinker (10 wt % Desmodur N 3900 in MPA), the resulting mixture has a solids content of 20 wt % and a total mass of 9.28 g. 0.8 ml of the paint in each case is subsequently applied by spin coating to a black-painted stainless steel panel or to a stainless steel substrate cleaned with ethanol, and the paint is cured in an oven at 120° C. for 3 h. A well-adhering, transparent coating is formed.

Example 16: PR-S-171213-bru-3 30% MPS Hydrolyzate 5 g of polyrotaxane paint base (30 wt % PR-bru008a* in MPA) are diluted with 2.731 g of MPA. After 5 min of stirring, 1.856 g of MPS hydrolyzate from example 4 are added and the mixture is stirred for 30 min. Following addition of 0.467 g of Desmodur N 3900 stock solution crosslinker (10 wt % Desmodur N 3900 in MPA), the resulting mixture has a solids content of 20 wt % and a total mass of 10.05 g. 0.8 ml of the paint in each case is subsequently applied by spin coating to a black-painted stainless steel panel or to a stainless steel substrate cleaned with ethanol, and the paint is cured in an oven at 120° C. for 3 h. A well-adhering, transparent coating is formed.

Figure 1B:
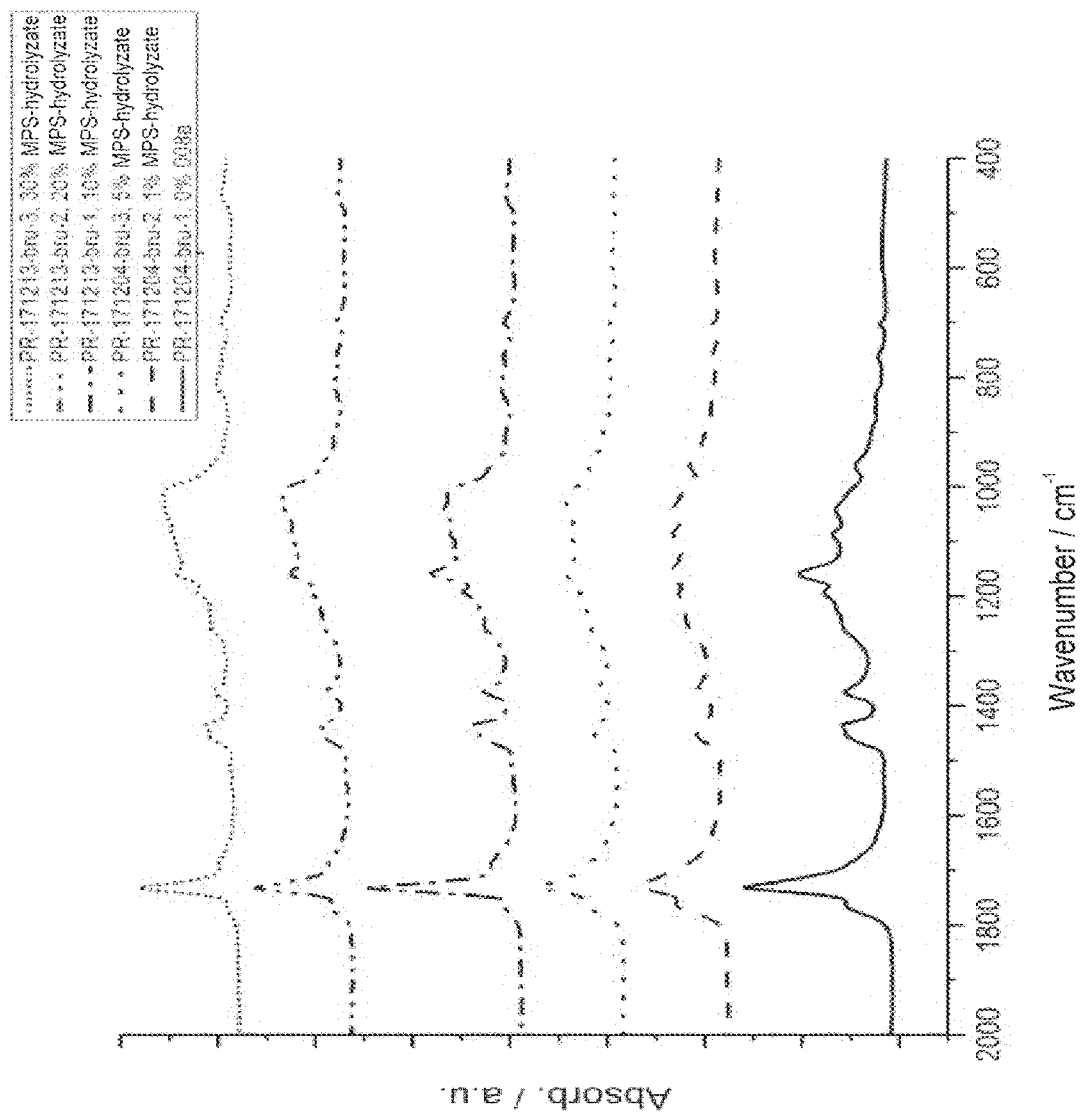

FIGS. 1A-1B shows the IR spectra of the paints of examples 6, 12, 13, 14, 15, and 16. At around 1050 $cm^{-1}$ the increase in the Si-0-Si absorption with increasing level of MPS hydrolyzate is apparent.

Figure 4A:
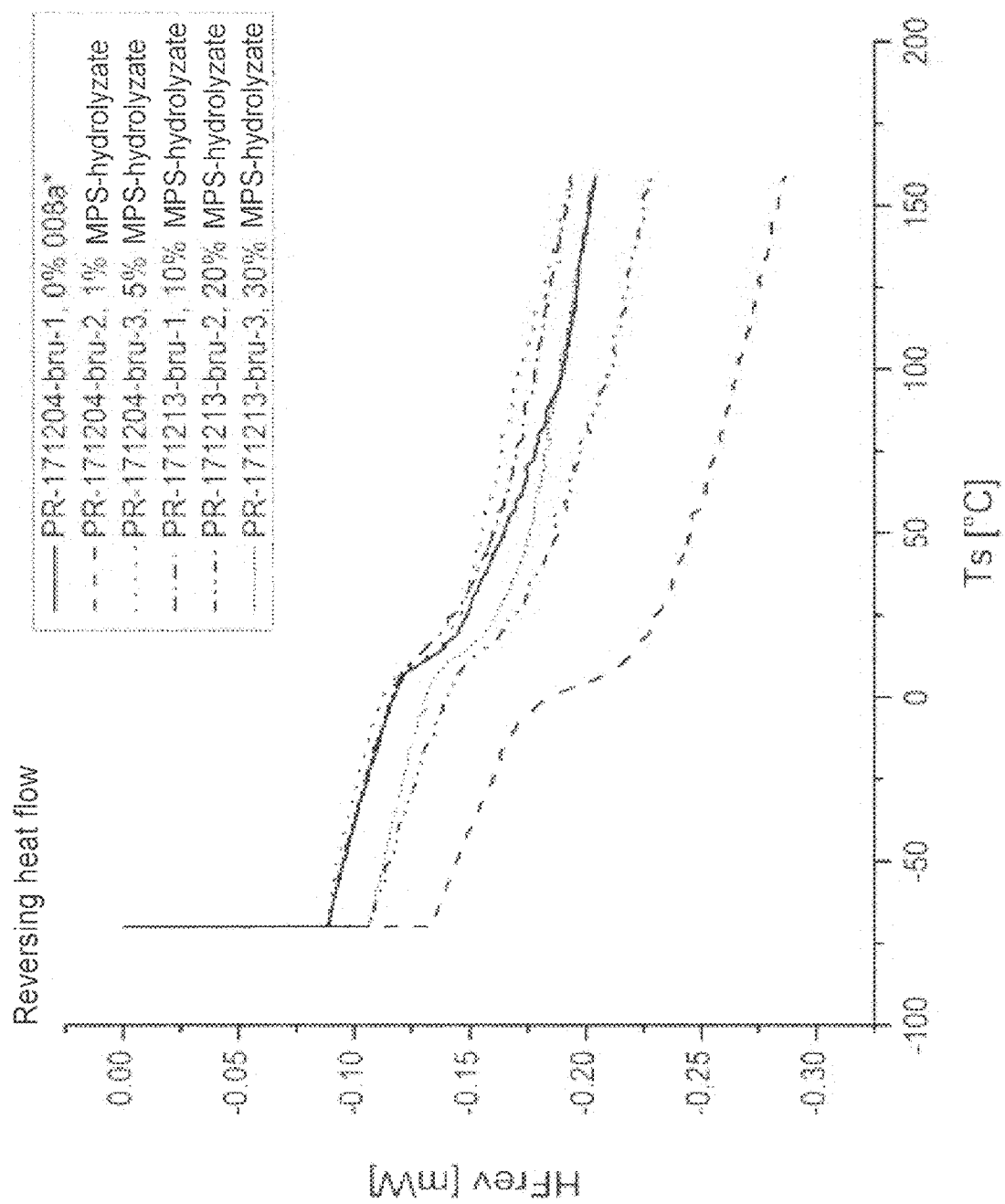
FIGS. 4A-4B differential scanning calorimetry (DSC, TOPEM mode) of the samples with MPS hydrolyzate (FIG. 4A: reversing heat flow.
Figure 4B:
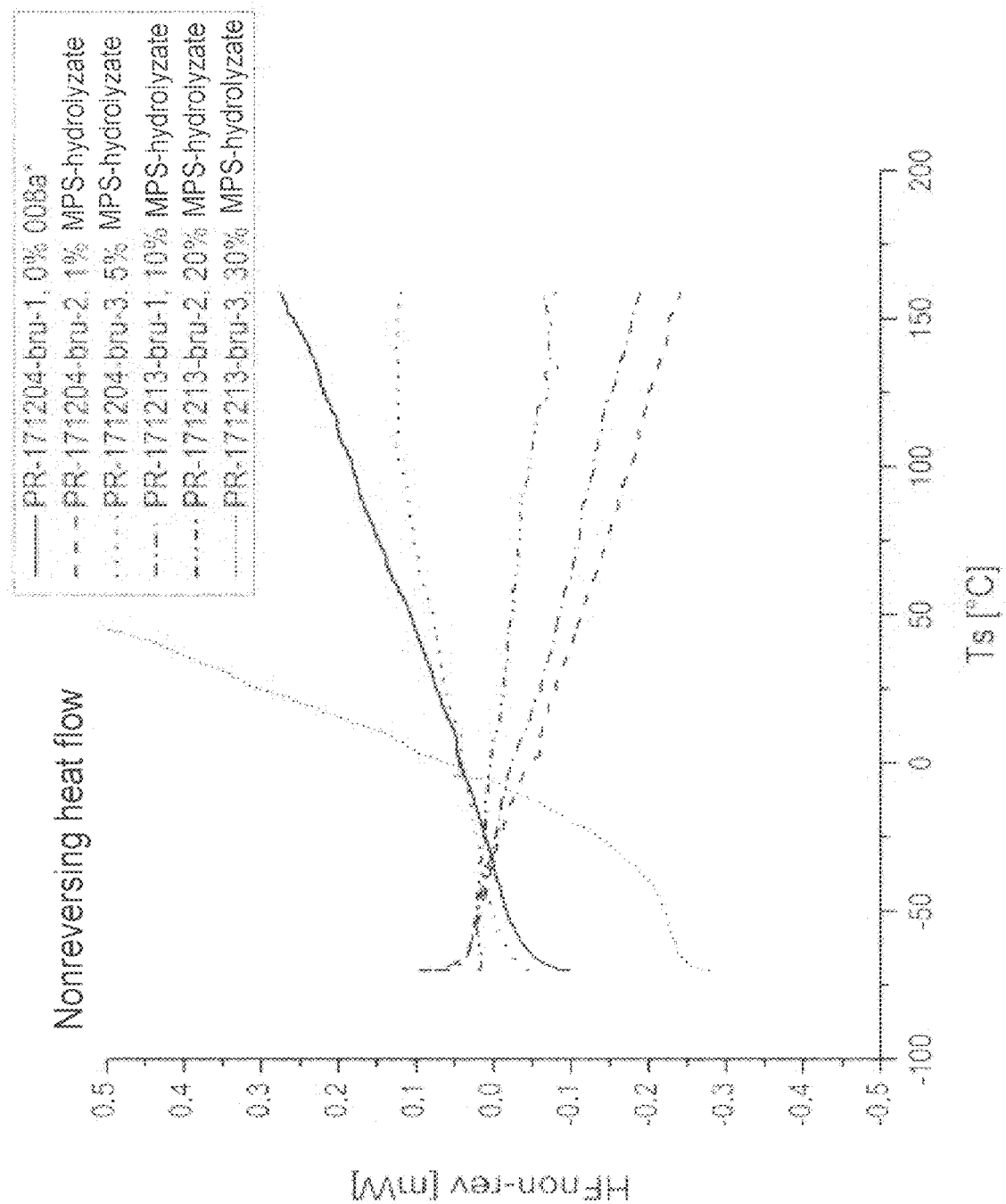

FIGS. 4A-4B show the results of the DSC measurements of the samples of examples 6, 12, 13, 14, 15, and 16.

Example 17: PR-S-180111-bru-2 1% $CeO_2$/MPS 5.003 g of polyrotaxane paint base (30 wt % PR-bru008b* in MPA) are diluted with 2.269 g of MPA. After 5 min of stirring, 0.0196 g of functionalized $CeO_2$ particles from example 5 is added and the mixture is stirred for 30 min. Following addition of 0.574 g of Desmodur N 3900 stock solution crosslinker (10 wt % Desmodur N 3900 in MPA), the resulting mixture has a solids content of 20 wt % and a total mass of 7.87 g. 0.8 ml of the paint in each case is subsequently applied by spin coating to a black-painted stainless steel panel or to a stainless steel substrate cleaned with ethanol, and the paint is cured in an oven at 120° C. for 3 h. A well-adhering, transparent coating is formed.

Example 18: PR-S-180111-bru-3 5% $CeO_2$/MPS 5.000 g of polyrotaxane paint base (30 wt % PR-bru008b* in MPA) are diluted with 2.504 g of MPA. After 5 min of stirring, 0.0998 g of functionalized $CeO_2$ particles from example 5 is added and the mixture is stirred for 30 min. Following addition of 0.575 g of Desmodur N 3900 stock solution crosslinker (10 wt % Desmodur N 3900 in MPA), the resulting mixture has a solids content of 20 wt % and a total mass of 8.18 g. 0.8 ml of the paint in each case is subsequently applied by spin coating to a black-painted stainless steel panel or to a stainless steel substrate cleaned with ethanol, and the paint is cured in an oven at 120° C. for 3 h. A well-adhering, transparent coating is formed.

Example 19: PR-S-180118-bru-1 10% $CeO_2$/MPS 4.808 g of polyrotaxane paint base (30 wt % PR-bru008b* in MPA) are diluted with 2.678 g of MPA. After 5 min of stirring, 0.182 g of functionalized $CeO_2$ particles from example 5 is added and the mixture is stirred for 30 min. Following addition of 0.549 g of Desmodur N 3900 stock solution crosslinker (10 wt % Desmodur N 3900 in MPA), the resulting mixture has a solids content of 20 wt % and a total mass of 8.22 g. 0.8 ml of the paint in each case is subsequently applied by spin coating to a black-painted stainless steel panel or to a stainless steel substrate cleaned with ethanol, and the paint is cured in an oven at 120° C. for 3 h. A well-adhering, transparent coating is formed.

Example 20: PR-S-180118-bru-2 20% $CeO_2$/MPS 4.397 g of polyrotaxane paint base (30 wt % PR-bru008b* in MPA) are diluted with 2.982 g of MPA. After 5 min of stirring, 0.338 g of functionalized $CeO_2$ particles from example 5 is added and the mixture is stirred for 30 min. Following addition of 0.505 g of Desmodur N 3900 stock solution crosslinker (10 wt % Desmodur N 3900 in MPA), the resulting mixture has a solids content of 20 wt % and a total mass of 8.22 g. 0.8 ml of the paint in each case is subsequently applied by spin coating to a black-painted stainless steel panel or to a stainless steel substrate cleaned with ethanol, and the paint is cured in an oven at 120° C. for 3 h. A well-adhering, transparent coating is formed.

Example 21: PR-S-180118-bru-3 30% $CeO_2$/MPS 4.004 g of polyrotaxane paint base (30 wt % PR-bru008b* in MPA) are diluted with 3.179 g of MPA. After 5 min of stirring, 0.461 g of functionalized $CeO_2$ particles from example 5 is added and the mixture is stirred for 30 min. Following addition of 0.458 g of Desmodur N 3900 stock solution crosslinker (10 wt % Desmodur N 3900 in MPA), the resulting mixture has a solids content of 20 wt % and a total mass of 8.10 g. 0.8 ml of the paint in each case is subsequently applied by spin coating to a black-painted stainless steel panel or to a stainless steel substrate cleaned with ethanol, and the paint is cured in an oven at 120° C. for 3 h. A well-adhering, transparent coating is formed.

Figure 2A:
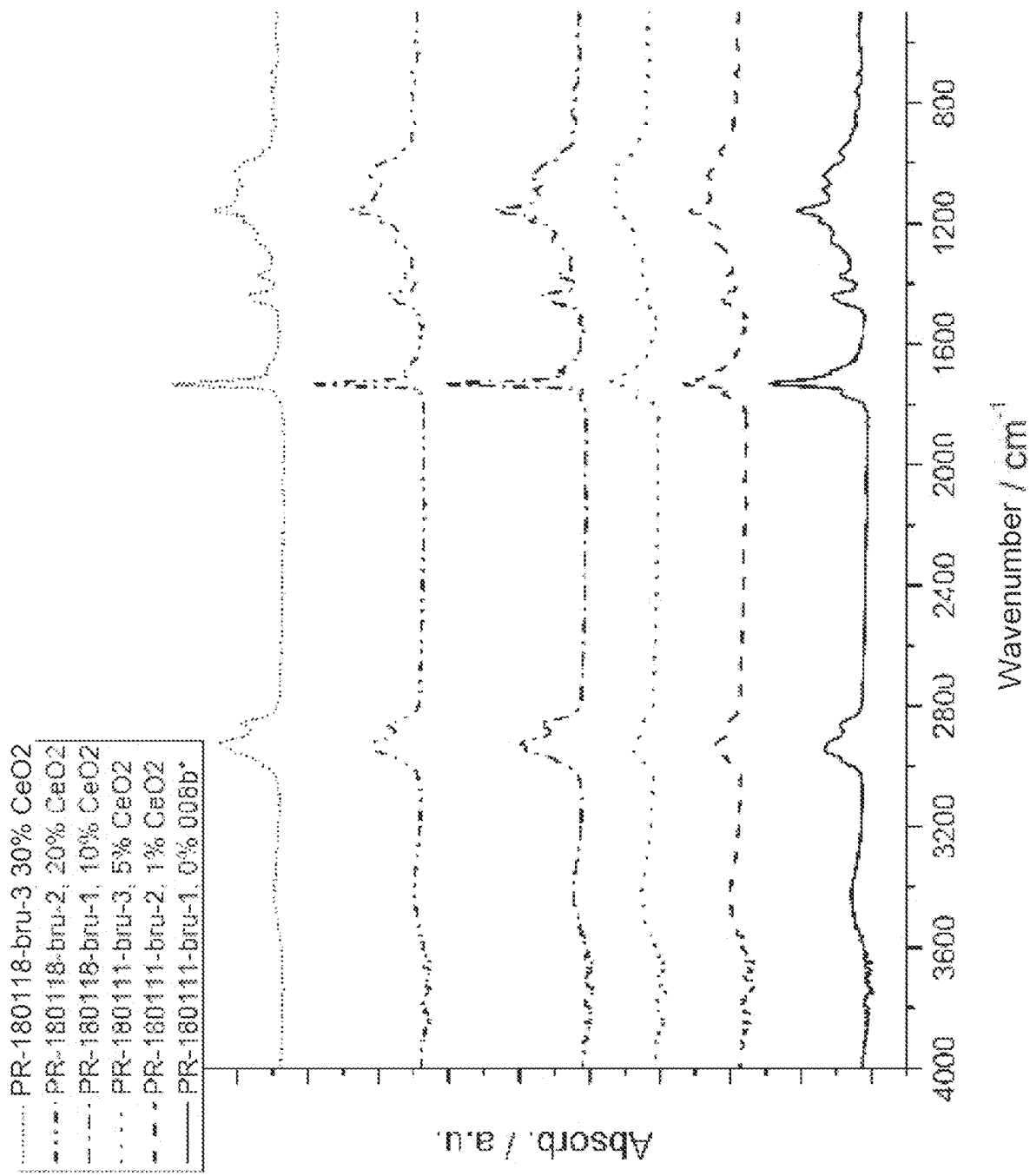
FIGS. 2A-2B infrared spectra (FT-IR) of the samples with $CeO_2$/MPS modification (FIG. 2A: 4000-600 $cm^{-1}$.
Figure 2B:
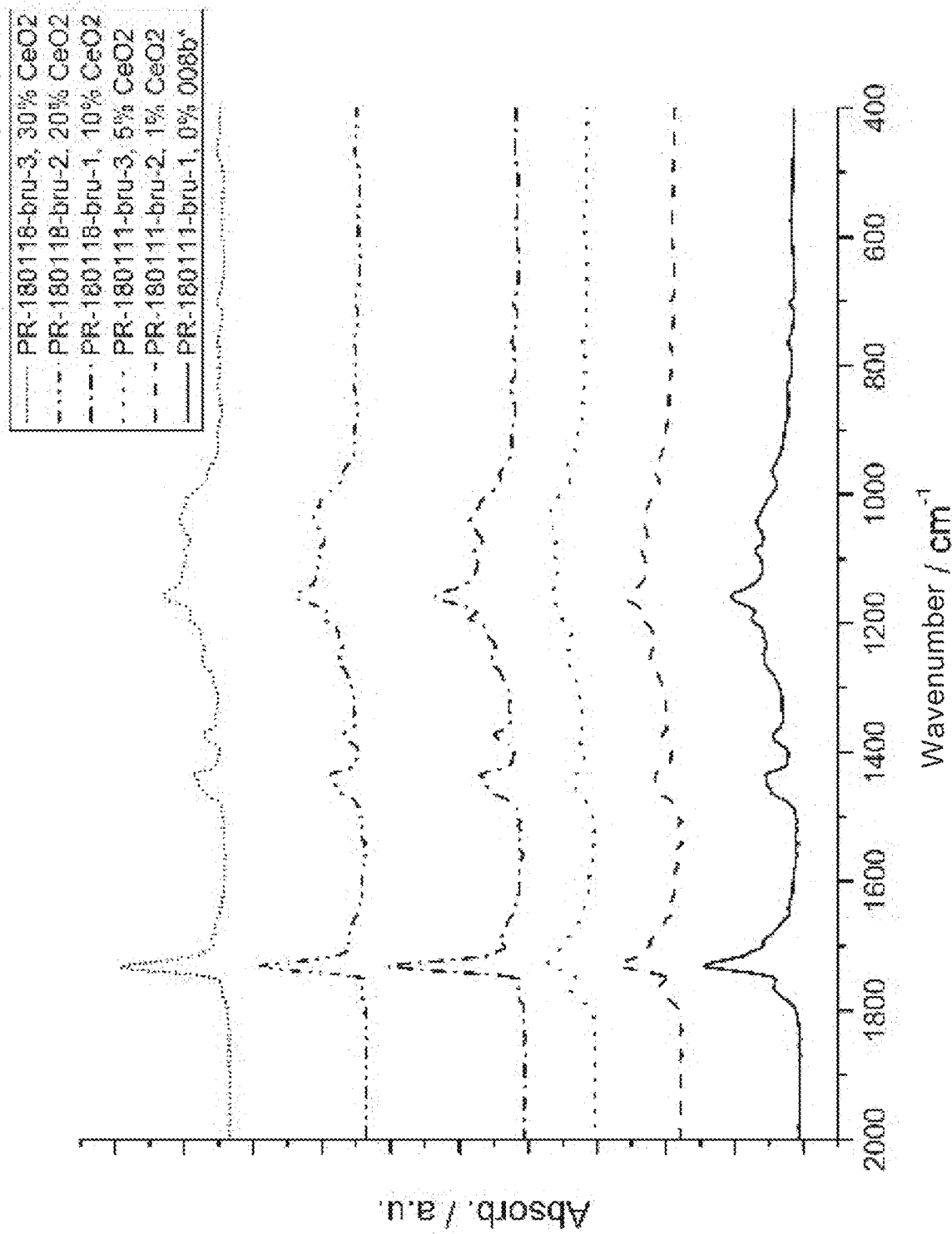

FIGS. 2A-2B show the IR spectra of the paints of examples 6, 17, 18, 19, 20, and 21. At around 1050 $cm^{-1}$ the increase in the Si-0-Si absorption with increasing level of MPS hydrolyzate is apparent.

Figure 5A:
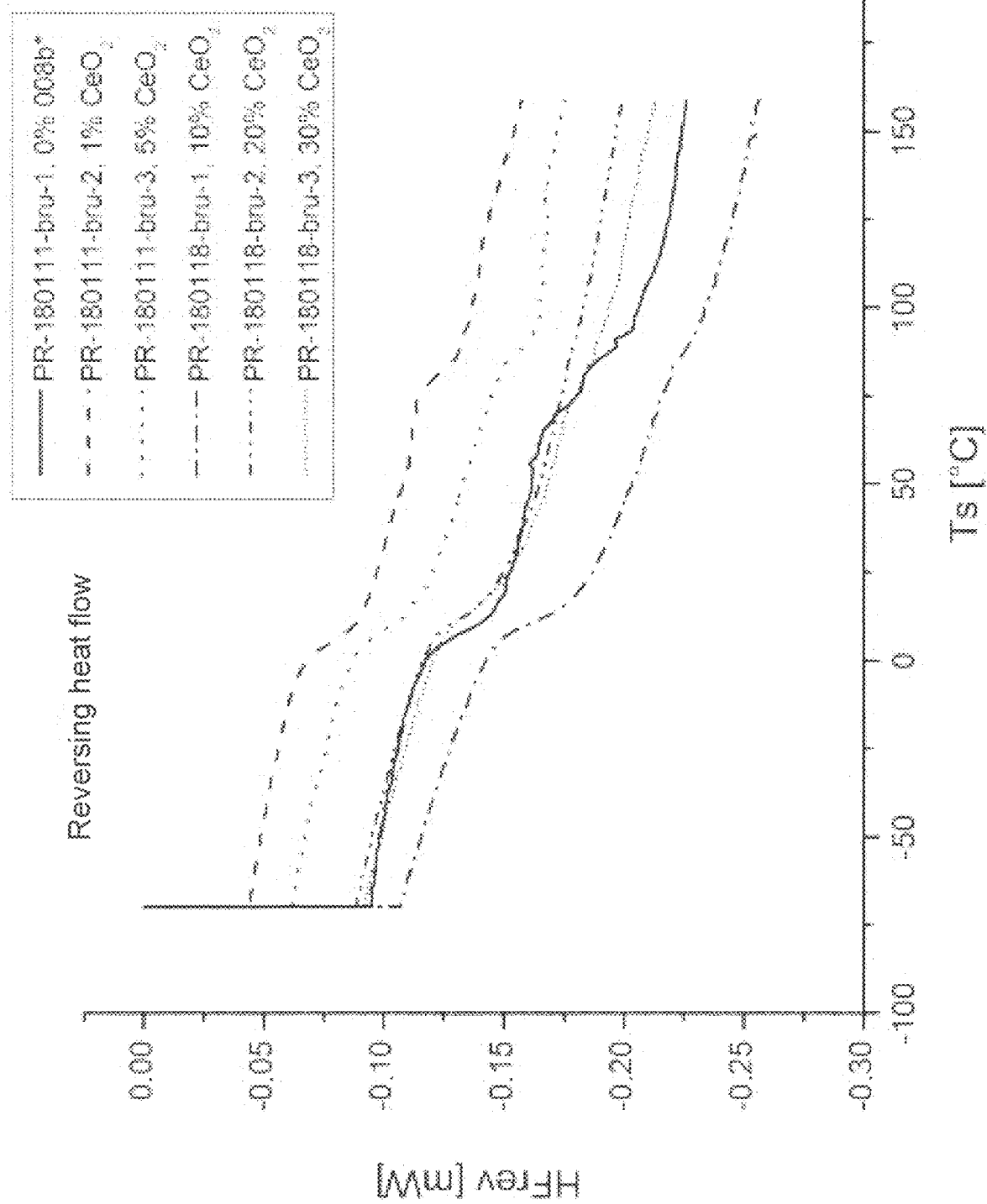
FIGS. 5A-5B differential scanning calorimetry (DSC) of the samples with $CeO_2$/MPS modification (FIG. 5A: reversing heat flow.
Figure 5B:
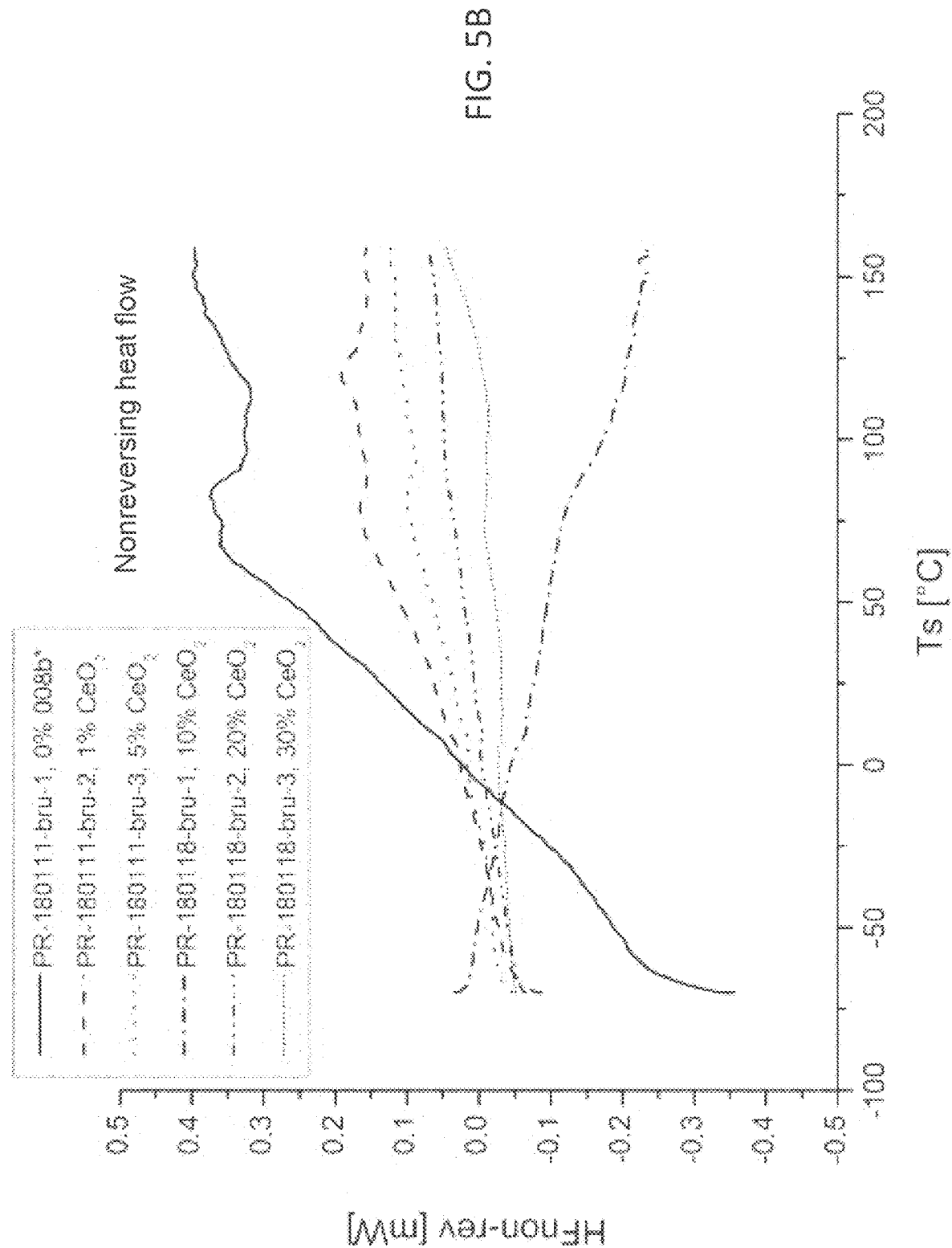

FIGS. 5A-5B show the results of the DSC measurements of the samples of examples 6, 17, 18, 19, 20, and 21.

Example 22: PR-S-180102-bru-1 with Hydrophobizing on the CD 1.1 g of polyrotaxane paint base (30 wt % PR_bru008* in MPA) are admixed with 0.024 g of hexyl isocyanate stock solution (10 wt % in MPA), stirred under nitrogen at 60° C. for 22 h, and then diluted with 0.52 g of MPA. After 5 min of stirring, 0.032 g of Desmodur N 3900 stock solution crosslinker (10 wt % Desmodur N 3900 in MPA) is added and mixed for a further 5 min. The resulting mixture has a solids content of 20 wt % and a total mass of 1.67 g. 0.7 ml of the paint in each case is subsequently applied by spin coating to a black-painted stainless steel panel or to a stainless steel substrate cleaned with ethanol, and the paint is cured in an oven at 120° C. for 3 h. A well-adhering, transparent coating is formed.

Example 23: PR-S-180106-bru-1 with Hydrophobizing on the CD+10% $SiO_2$/GPTES 1.01 g of polyrotaxane paint base (30 wt % PR-bru008* in MPA) are admixed with 0.0026 g of hexyl isocyanate stock solution (10 wt % in MPA), stirred under nitrogen at 60° C. for 22 h, and then diluted with 0.52 g of MPA. After 5 min of stirring, 0.104 g of functionalized $SiO_2$ particles from example 3 are added and the mixture is stirred for 30 min. After addition of 0.029 g of Desmodur N 3900 stock solution crosslinker (10 wt % Desmodur N 3900 in MPA), the resulting mixture has a solids content of 20 wt % and a total mass of 1.69 g. 0.7 ml of the paint in each case is subsequently applied by spin coating to a black-painted stainless steel panel or to a stainless steel substrate cleaned with ethanol, and the paint is cured in an oven at 120° C. for 3 h. A well-adhering, transparent coating is formed.

Shaped Articles

Example 24: Production of Shaped Articles of PR-171127-/PR-171121—x % $SiO_2$/GPTES Shaped articles with a size of 25 mm×25 mm×1 mm (for DE spectroscopy) and 20 mm×10 mm×1 mm (for DMTA measurements; FIGS. 8A-8B, 9A-9B, and 10A-10B) are produced in PTFE casting molds. The casting molds are each cautiously filled, without air bubbles, with the mixtures from examples 6-11, and the solvent is removed in a vacuum drying cabinet at 60° C. for 1 h under 300 mbar, without starting the crosslinking reaction. This procedure is repeated a total of ten times, until the solvent-free shaped article has reached a thickness of around 1 mm. Thereafter the entire layer construction is dried in a vacuum drying cabinet at 60° C. for 12 h at 100 mbar to remove residual solvent. The final curing of the mixtures in the casting mold takes place subsequently over 30 h at 120° C. The resulting shaped article is transparent and slightly yellowish.

Figure 11A:
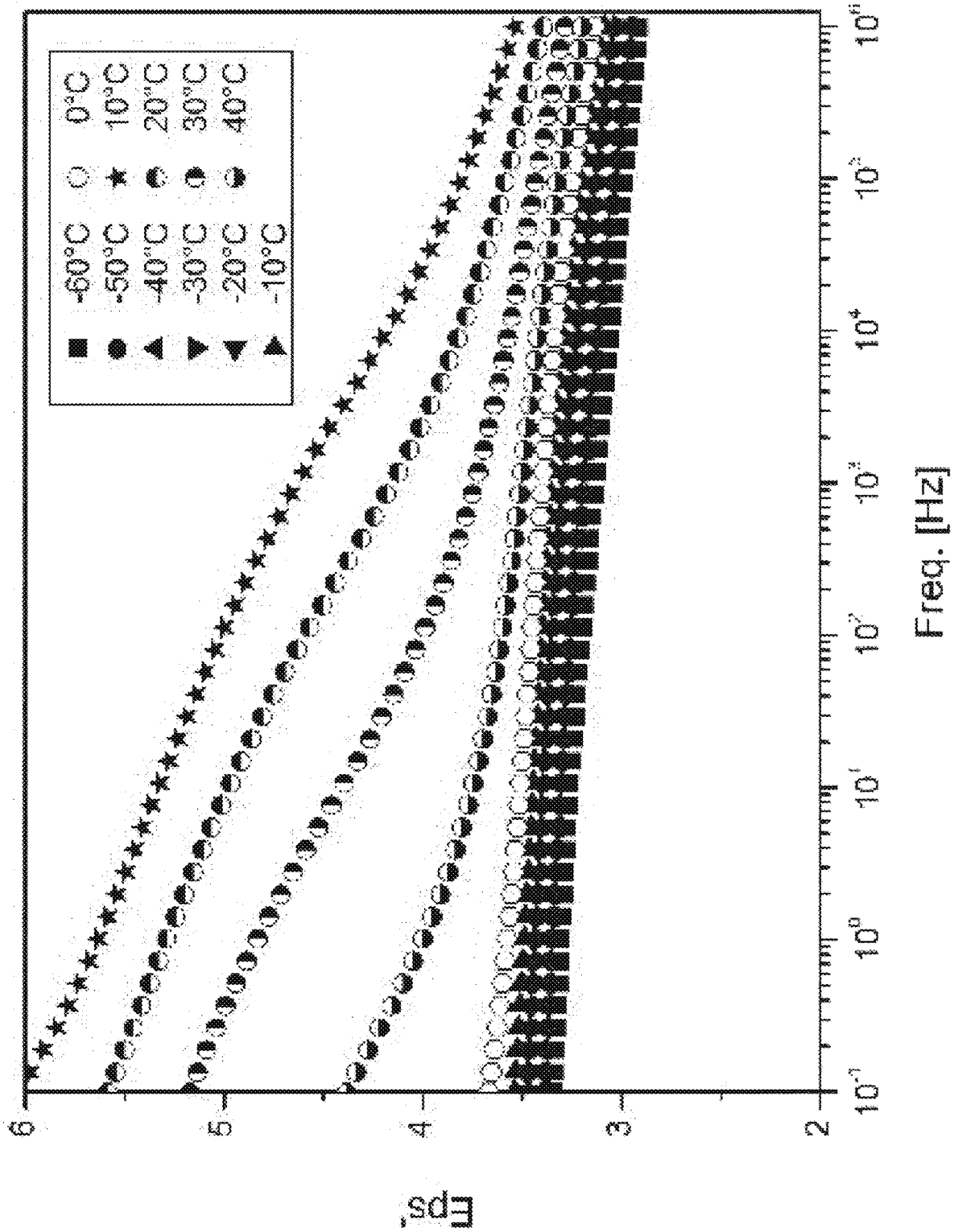
FIGS. 11A-11B DE spectroscopy for samples with a 5% MPS hydrolyzate (FIG. 11A: storage modulus Eps'.
Figure 11B:
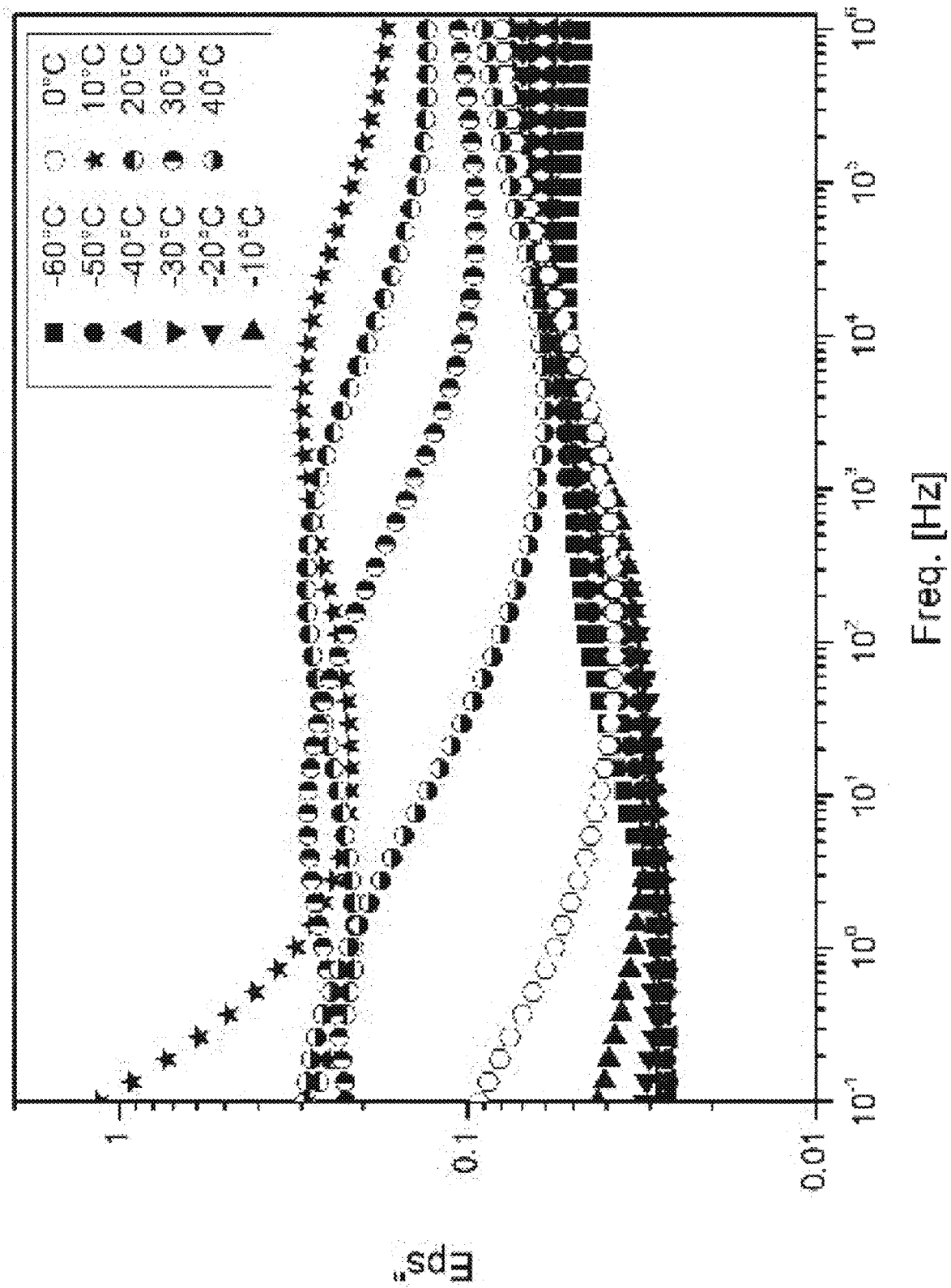

Example 25: Production of Shaped Articles of PR-171204-/PR-171213—x % MPS Hydrolyzate Shaped articles with a size of 25 mm×25 mm×1 mm (for DE spectroscopy) and 20 mm×10 mm×1 mm (for DMTA measurements; FIGS. 11A-11B) are produced in PTFE casting molds. The casting molds are each cautiously filled, without air bubbles, with the mixtures from examples 12-16, and the solvent is removed in a vacuum drying cabinet at 60° C. for 1 h under 300 mbar, without starting the crosslinking reaction. This procedure is repeated a total of ten times, until the solvent-free shaped article has reached a thickness of around 1 mm. Thereafter the entire layer construction is dried in a vacuum drying cabinet at 60° C. for 12 h at 100 mbar to remove residual solvent. The final curing of the mixtures in the casting mold takes place subsequently over 30 h at 120° C. The resulting shaped article is transparent and slightly yellowish.

Example 26: Production of Shaped Articles of PR-180111-/PR-180118—x % CeO$_2$/MPS Shaped articles with a size of 25 mm×25 mm×1 mm (for DE spectroscopy) and 20 mm×10 mm×1 mm (for DMTA measurements) are produced in PTFE casting molds. The casting molds are each cautiously filled, without air bubbles, with the mixtures from examples 17-21, and the solvent is removed in a vacuum drying cabinet at 60° C. for 1 h under 300 mbar, without starting the crosslinking reaction. This procedure is repeated a total of ten times, until the solvent-free shaped article has reached a thickness of around 1 mm. Thereafter the entire layer construction is dried in a vacuum drying cabinet at 60° C. for 12 h at 100 mbar to remove residual solvent. The final curing of the mixtures in the casting mold takes place subsequently over 30 h at 120° C. The resulting shaped article is transparent and slightly yellowish.

Example 27: PR-S-180124-bru-1 with Hydrophobizing on the CD, Binary System 0.104 g of PR_bru010* was dissolved in 0.412 g of MPA and 0.821 g of chlorobenzene and the solution was admixed with 0.308 g of hexyl isocyanate stock solution (10 wt % in MPA) and stirred under nitrogen at 120° C. for 22 h. The solvents were removed under a high vacuum. The residue was dissolved in 0.329 g of MPA and the solution was stirred for 5 min. Following addition of 0.142 g of Desmodur N 3900 stock solution crosslinker (10 wt % Desmodur N 3900 in MPA), mixing took place again for 5 min. The resulting mixture has a solids content of 20 wt % and a total mass of 0.57 g. Subsequently 0.25 ml of the paint in each case is applied by spin coating to a black-painted stainless steel panel or to a stainless steel substrate cleaned with ethanol, and cured in an oven at 120° C. for 3 h. A well-adhering, transparent coating is formed.

Example 28: PR-S-180206_bru-1 with Hydrophobizing on the CD with Methyl Acrylate, Ternary System 0.1 g of PR_bru008b* was dissolved in 2.45 g of pyridine (abs.), admixed with 0.0032 g of methacrylic anhydride, and stirred under inert gas at 60° C. for 24 h. The solvents were removed via distillation. The residue was dissolved with 0.394 g of MPA. After 5 min of stirring, 0.177 g of camphorquinone and 0.206 g of ethyl 4-dimethylaminobenzoate for crosslinking are added (50 mol % relative to the methacrylic acid used), and mixing continues for 5 min. The resulting mixture has a solids content of 20 wt % and a total mass of 0.51 g. Subsequently 0.20 ml of the paint in each case is applied by spin coating to a black-painted stainless steel panel or to a stainless steel substrate cleaned with ethanol, and cured for 2 min with a mercury vapor lamp. A well-adhering, transparent coating is formed.

Time-Temperature Dependence of the Self-Healing

For this, at different temperatures, the time (t) up to the disappearance of scratches (scratch depth around 0.8 μm-1.2 μm (after scratch test with 50 g) was measured.

Table 1 shows the results for PR modified with MPS hydrolyzate (measurement on black paint).

Table 2 shows the results for PR modified with CeO$_2$/MPS hydrolyzate (measurement on black paint).

Table 3 shows the results for PR modified with SiO$_2$/GPTES hydrolyzate (measurement on black paint).

Table 4 shows the results for the hydrophobized systems.

It emerges that the addition of component b) does not restrict the capacity of the material to self-heal, and in part in fact improves it. This is also apparent from the values measured in FIGS. 7A-7B.

Table 5 shows the results of the measurement of the contact angle (measurement on stainless steel) against H$_2$O for PR modified with SiO$_2$/GPTES with and without hydrophobizing on the polymer matrix.

Figure 13:
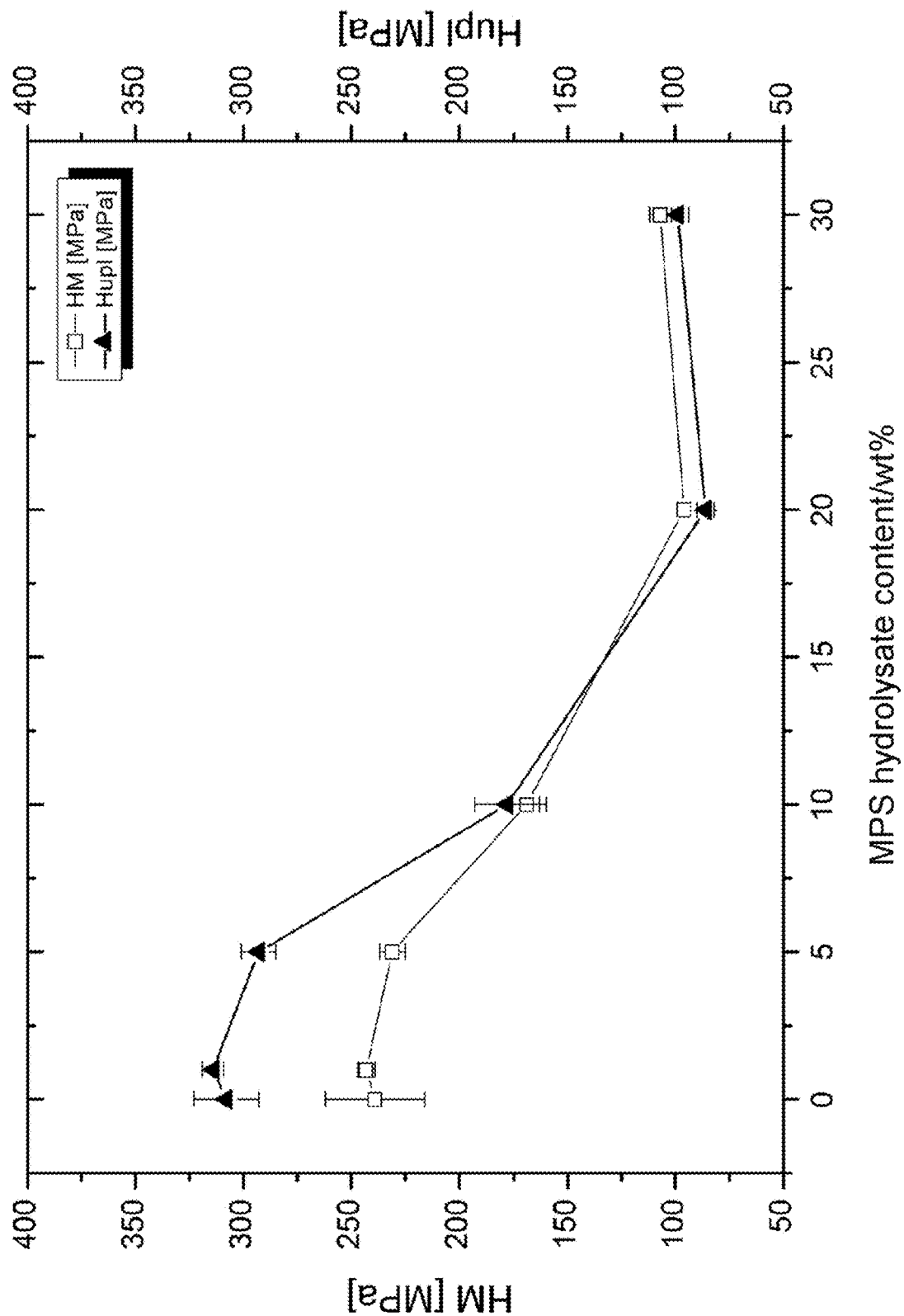
FIG. 13 results of the measurement of micro hardness for PR modified with MPS hydrolyzate (HM: Martens hardness; HUpl: resistance to plastic deformation)
Figure 14:
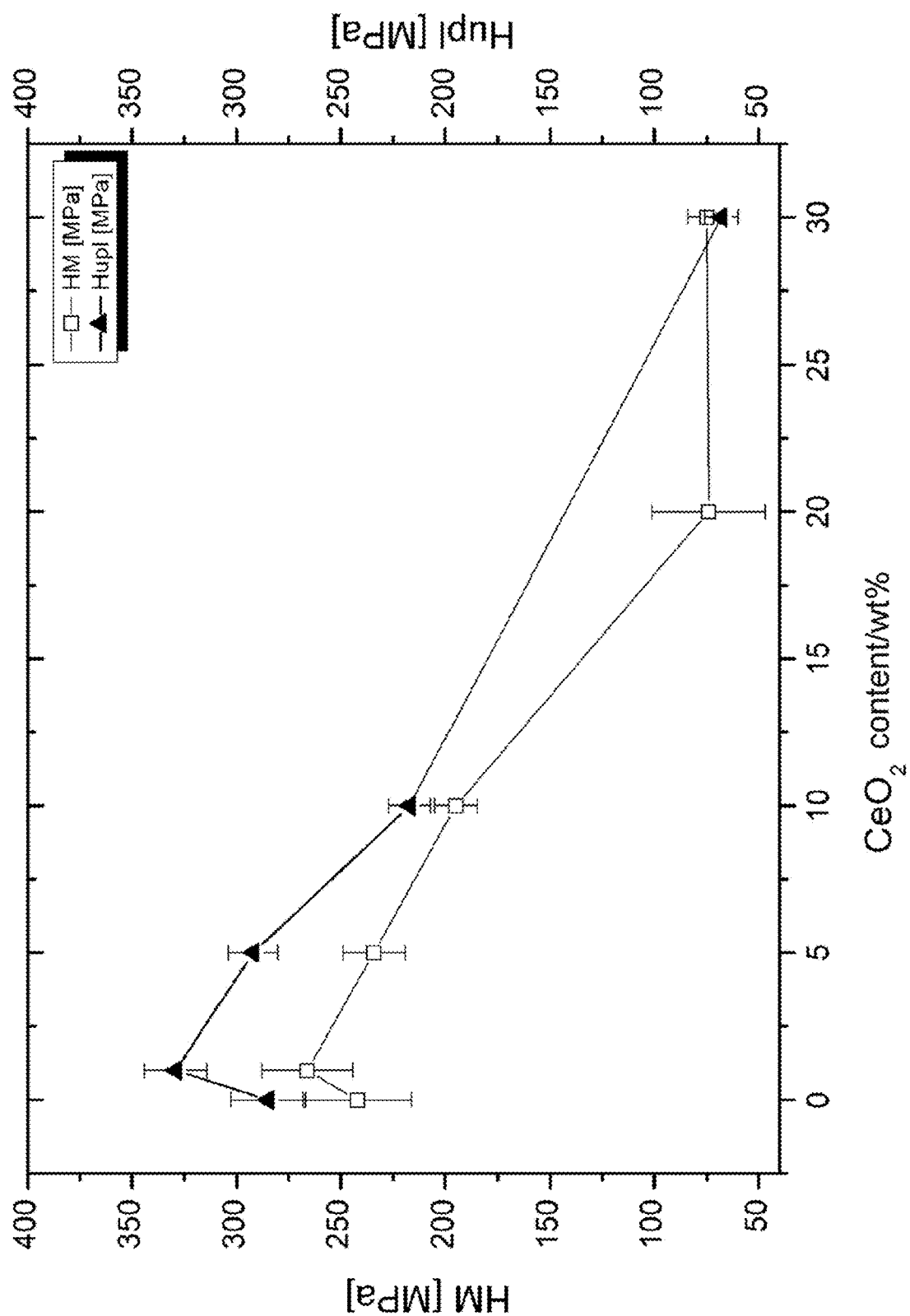
FIG. 14 results of the measurement of micro hardness for PR modified with $CeO_2$/MPS hydrolyzate.
Figure 15:
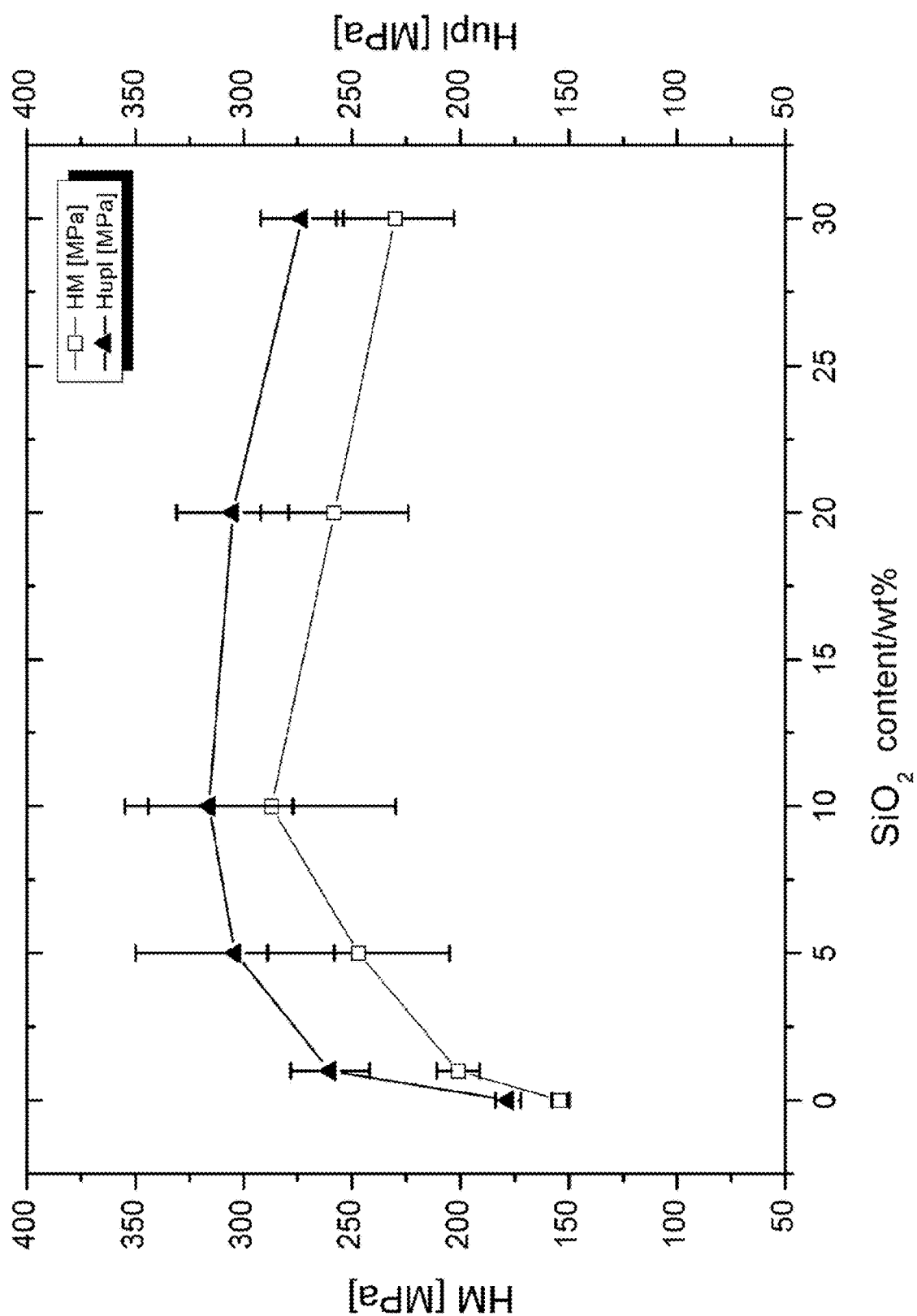
FIG. 15 results of the measurement of micro hardness for PR modified with $SiO_2$/GPTES.
Figure 16:
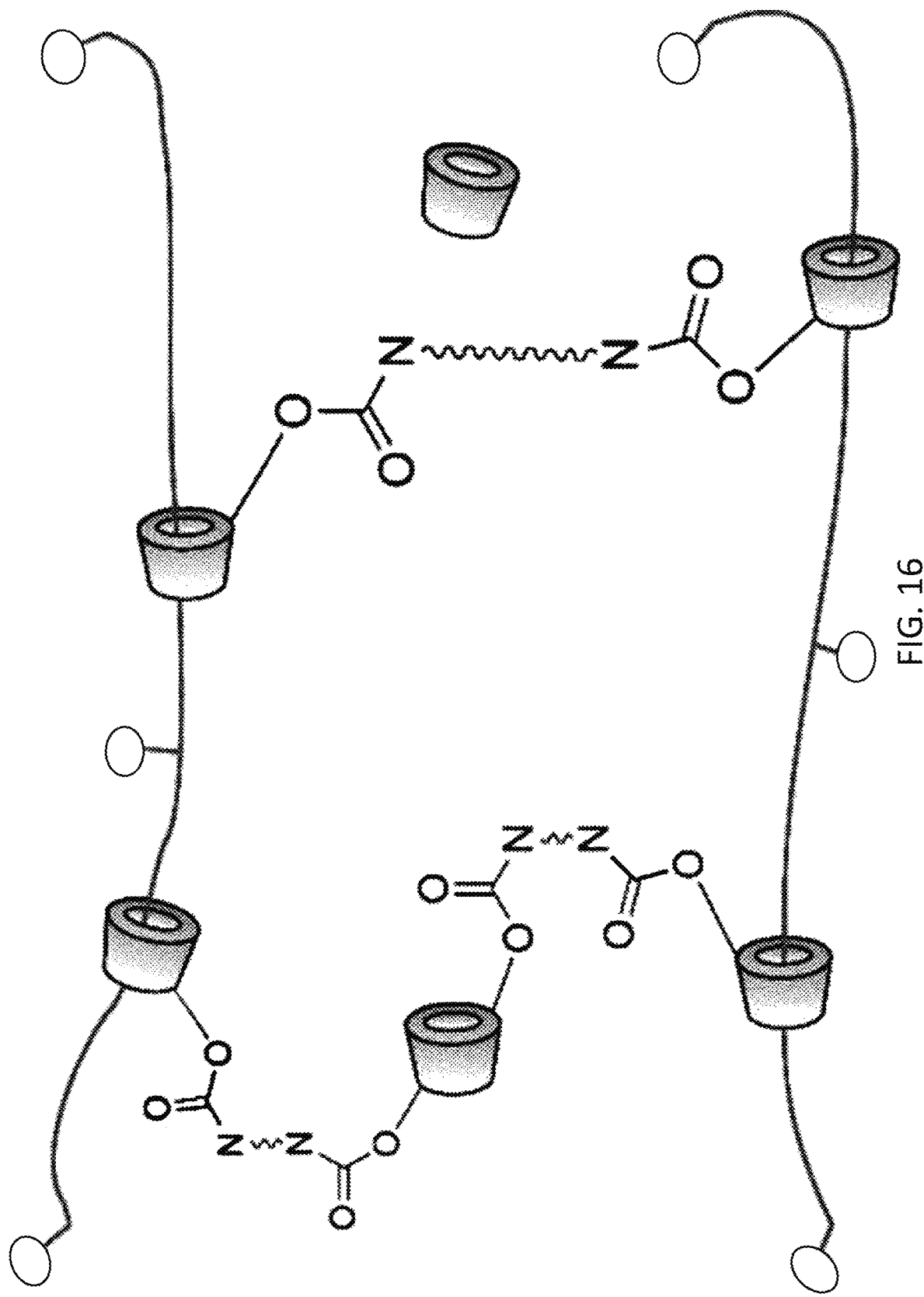
FIG. 16 schematic representation of a slide-ring gel on purely polymeric basis.
Figure 17:
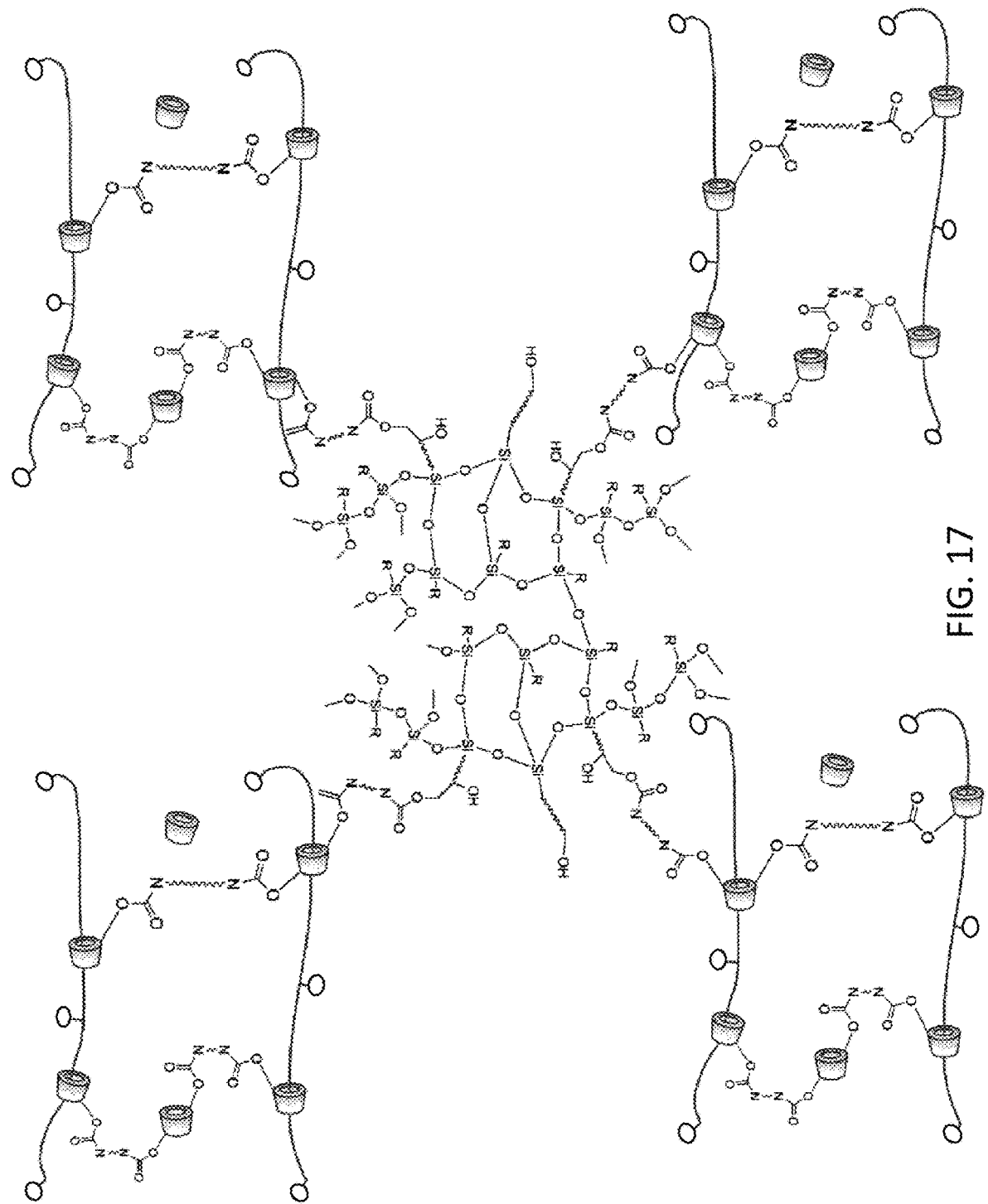
FIG. 17 schematic representation of a slide-ring gel of the invention as copolymer from polymer and (hetero)polysiloxane.
Figure 18:
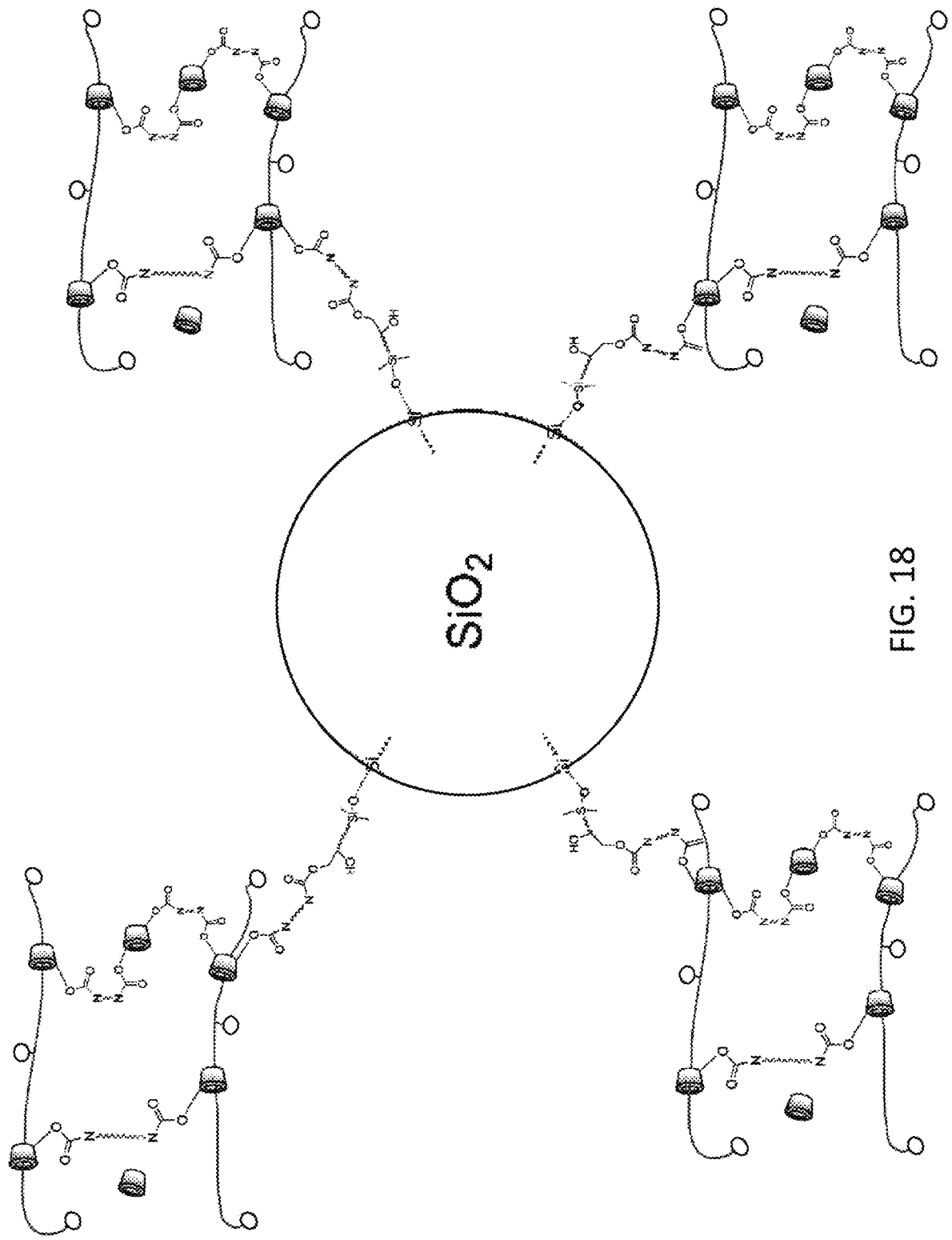
FIG. 18 schematic representation of a composite material of the invention obtained by linking slide-ring gels to ceramic particles.
Figure 19:
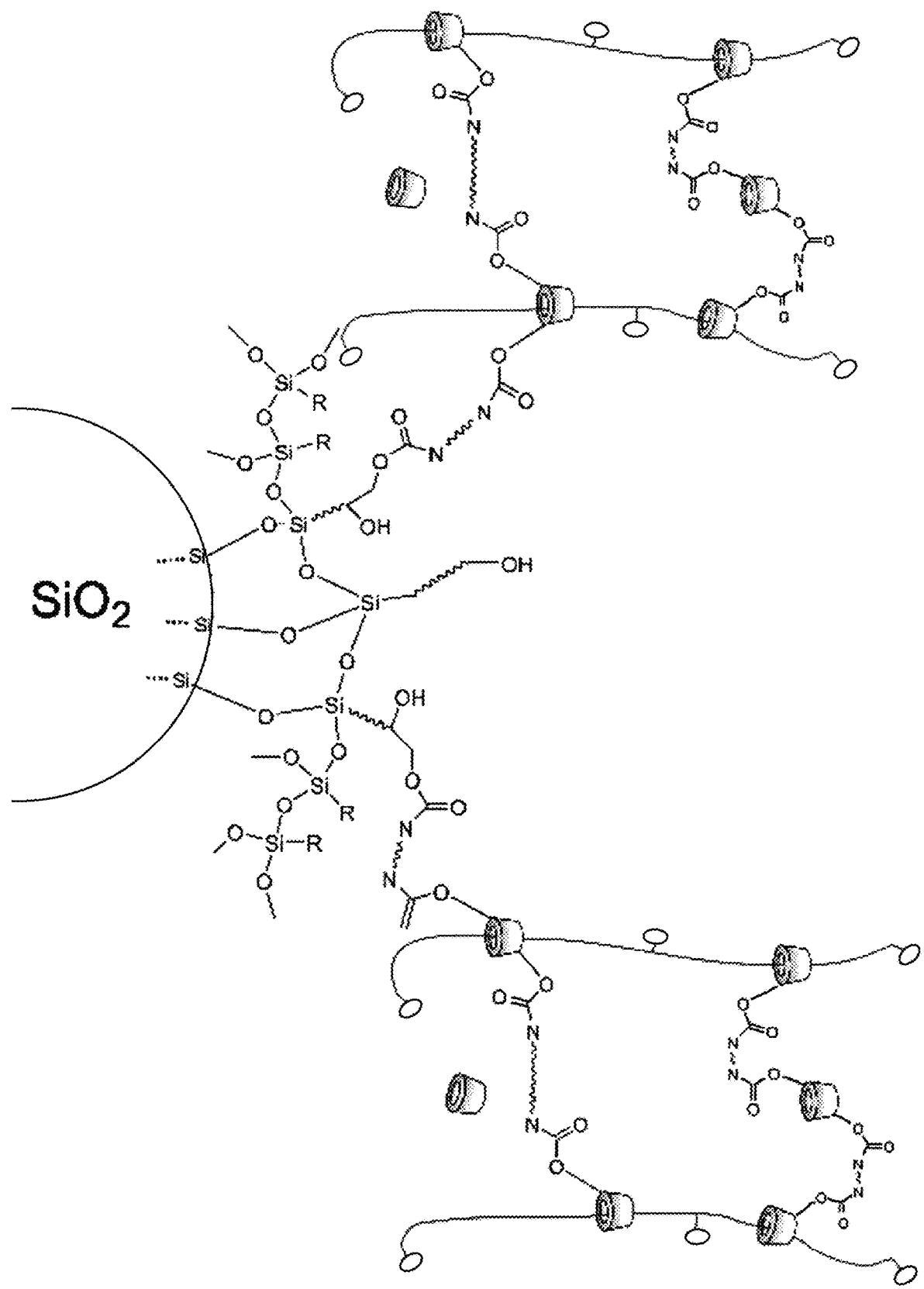
FIG. 19 schematic representation of a composite material of the invention obtained by linking slide-ring gels to ceramic particles surface-modified with polyorganosiloxanes.

The microhardness of the samples was measured at 20° C. (penetration depth: 1 μm, HM: Martens hardness, E$_{red}$: reduced elastic modulus, HU$_{pl}$: plastic hardness (=resistance to plastic deformation)). Tables 6, 7, and 8 show the results of a PR modified with MPS hydrolyzate (measurement on stainless steel, table 6, FIG. 13), PR modified with CeO$_2$/MPS hydrolyzate (measurement on stainless steel, table 7, FIG. 14), and PR modified with SiO$_2$/GPTES (measurement on stainless steel, table 8, FIG. 15).

Figure 7A:
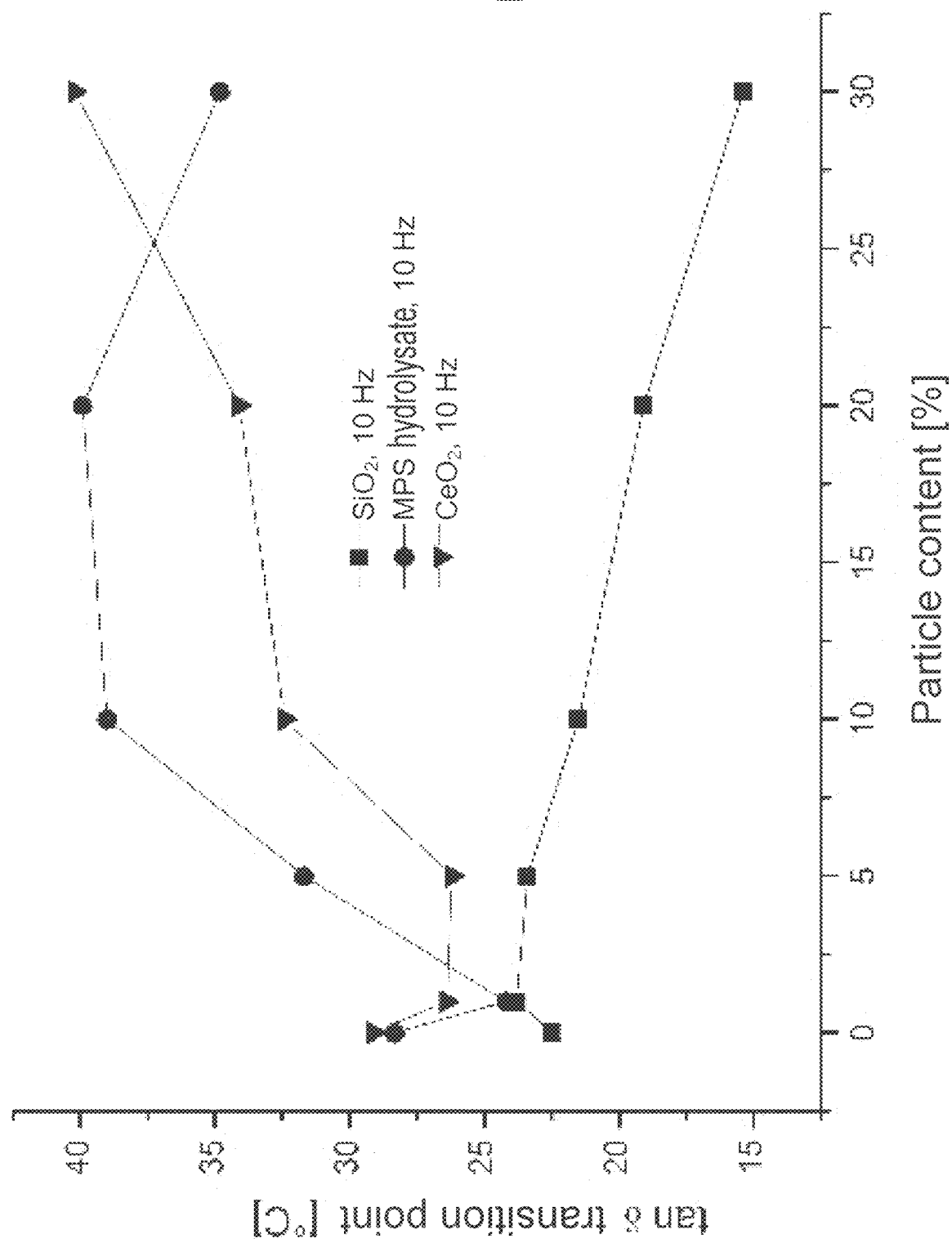
FIGS. 7A-7B $T_g$ (maximum tan δ signal, FIG. 7A) and maximum value of attenuation at $T_g$ (tan δ max, FIG. 7B) for PR coatings with different levels of $SiO_2$/GPTES and $CeO_2$/MPS.
Figure 7B:
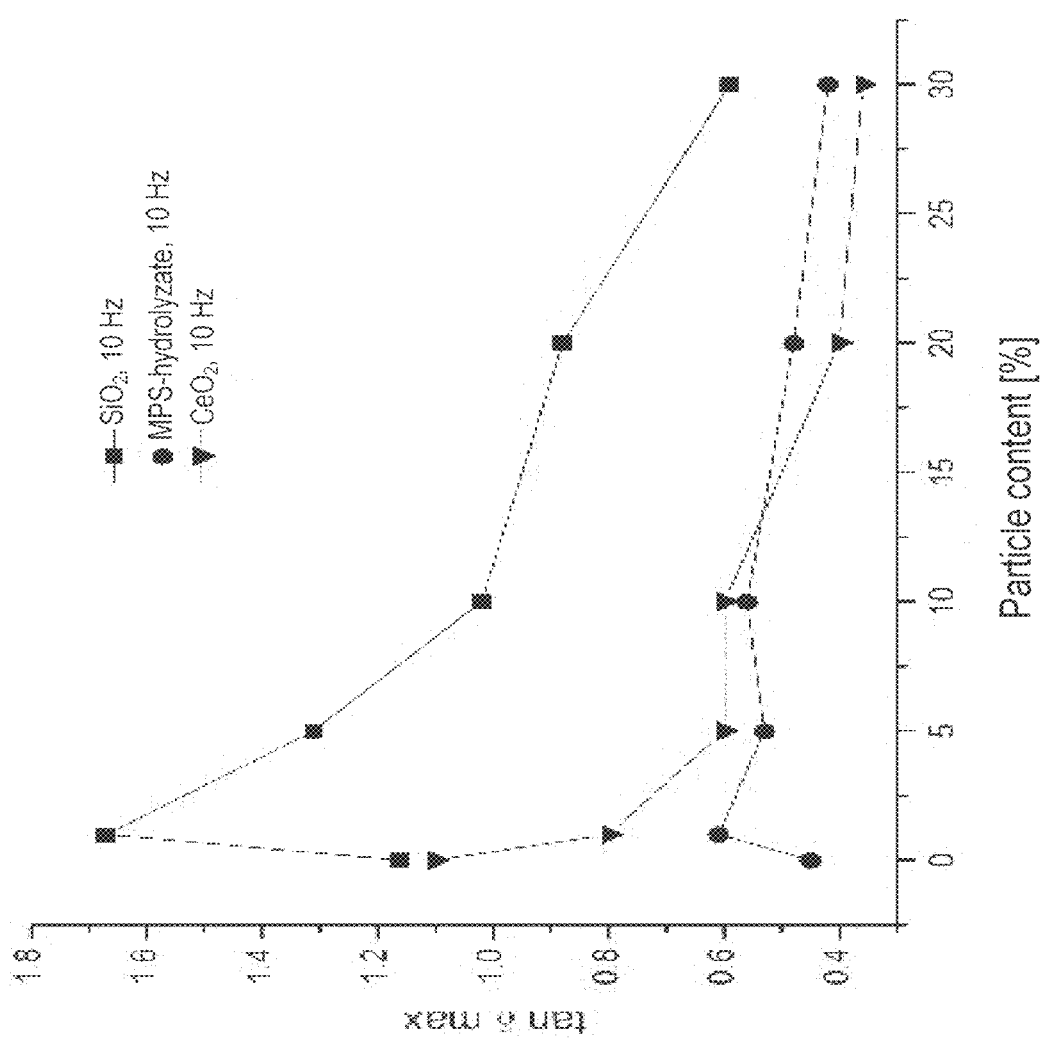
Figure 8A:
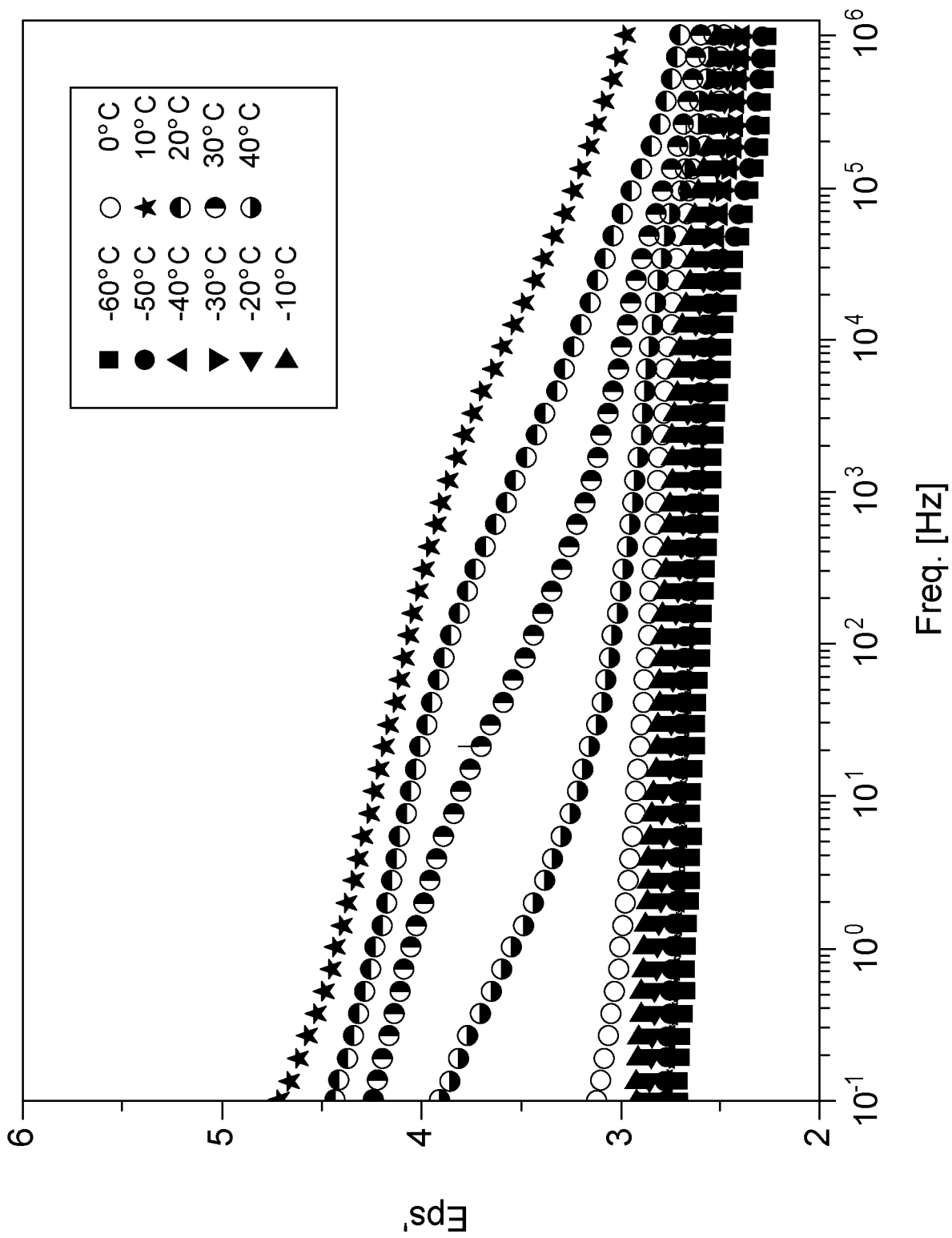
FIGS. 8A-8B DE spectroscopy for samples with 0% $SiO_2$ (FIG. 8A: storage modulus Eps'.
Figure 8B:
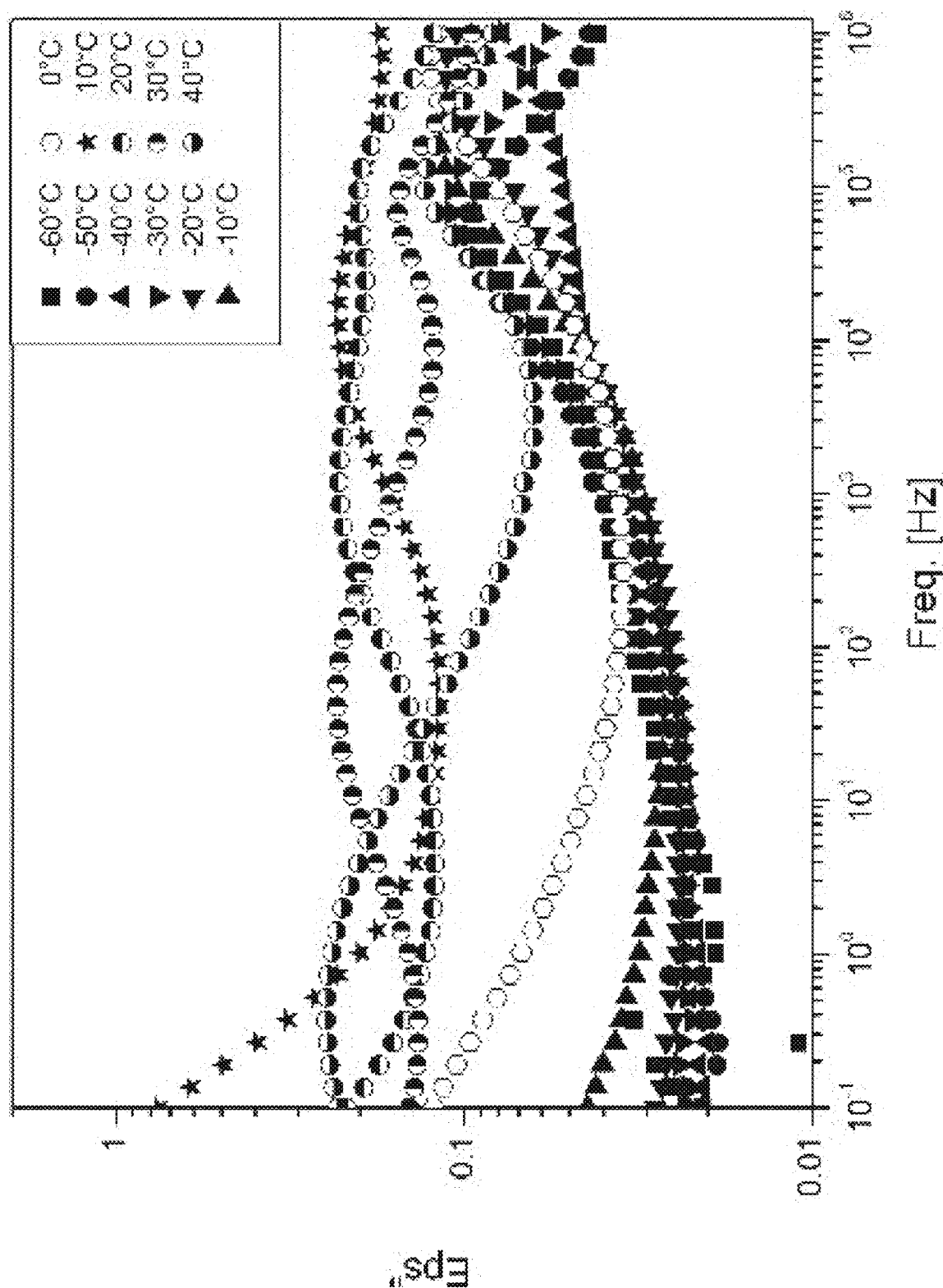
Figure 9A:
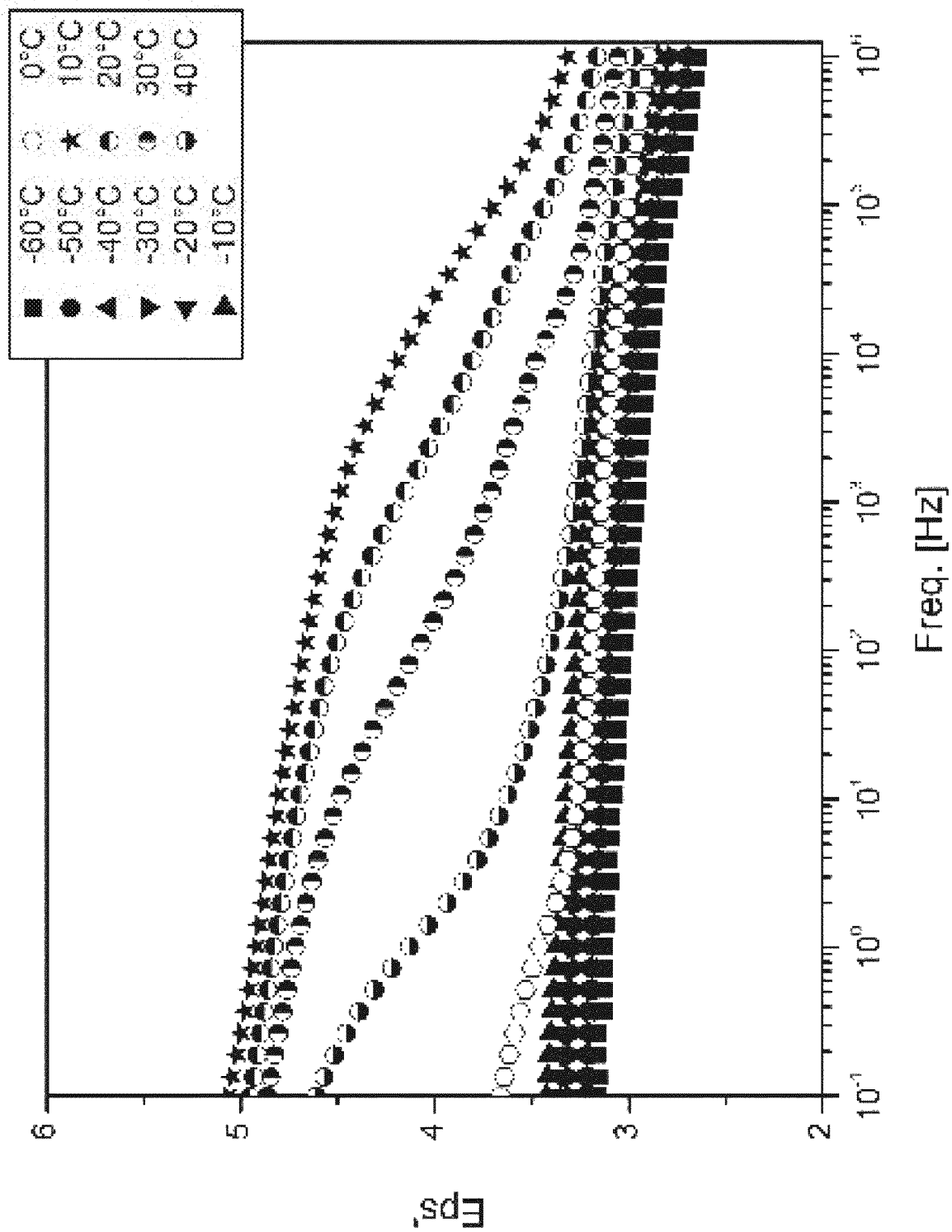
FIGS. 9A-9B DE spectroscopy for samples with 5% $SiO_2$/GPTESmodification (FIG. 9A: storage modulus Eps'.
Figure 9B:
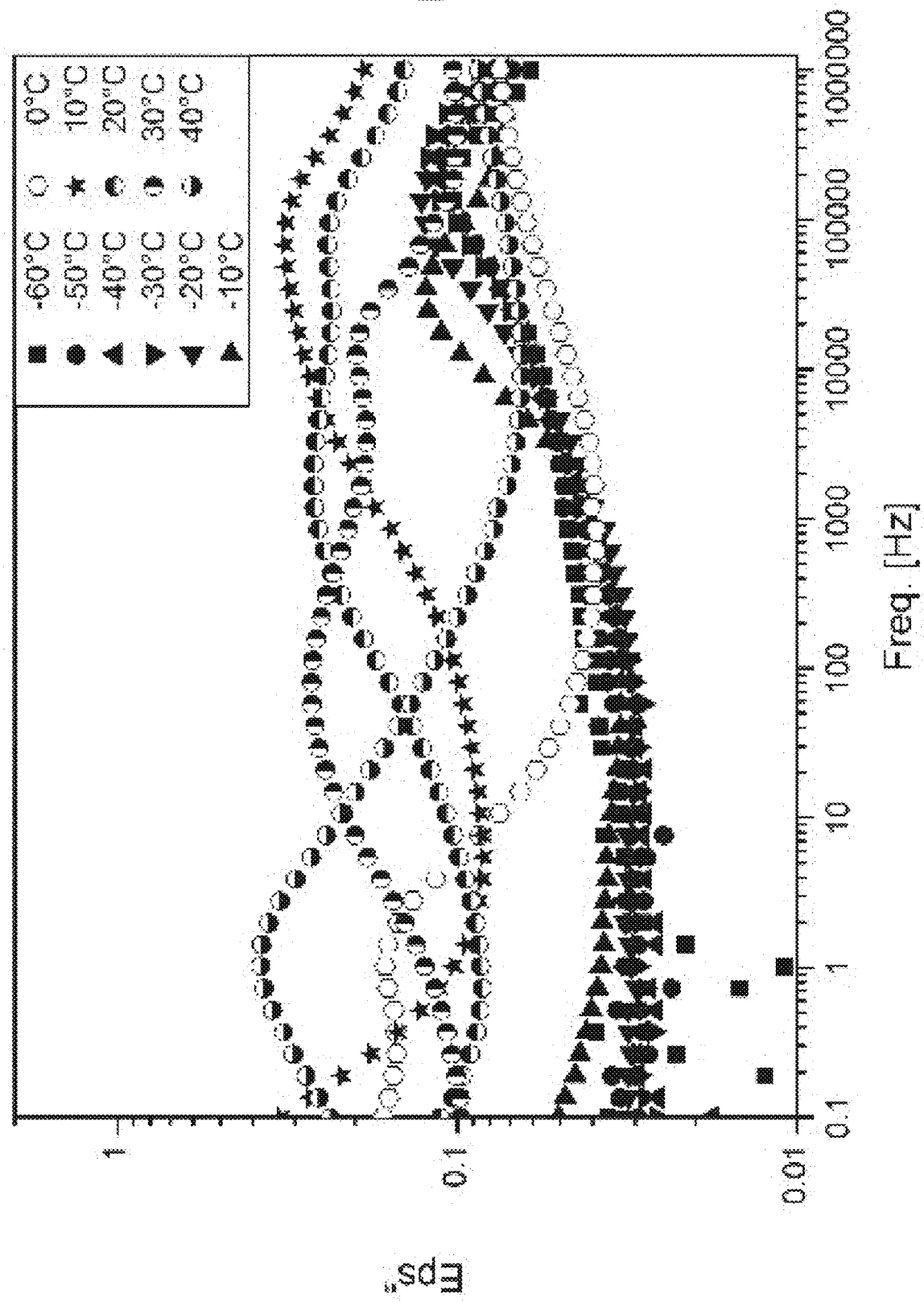
Figure 10A:
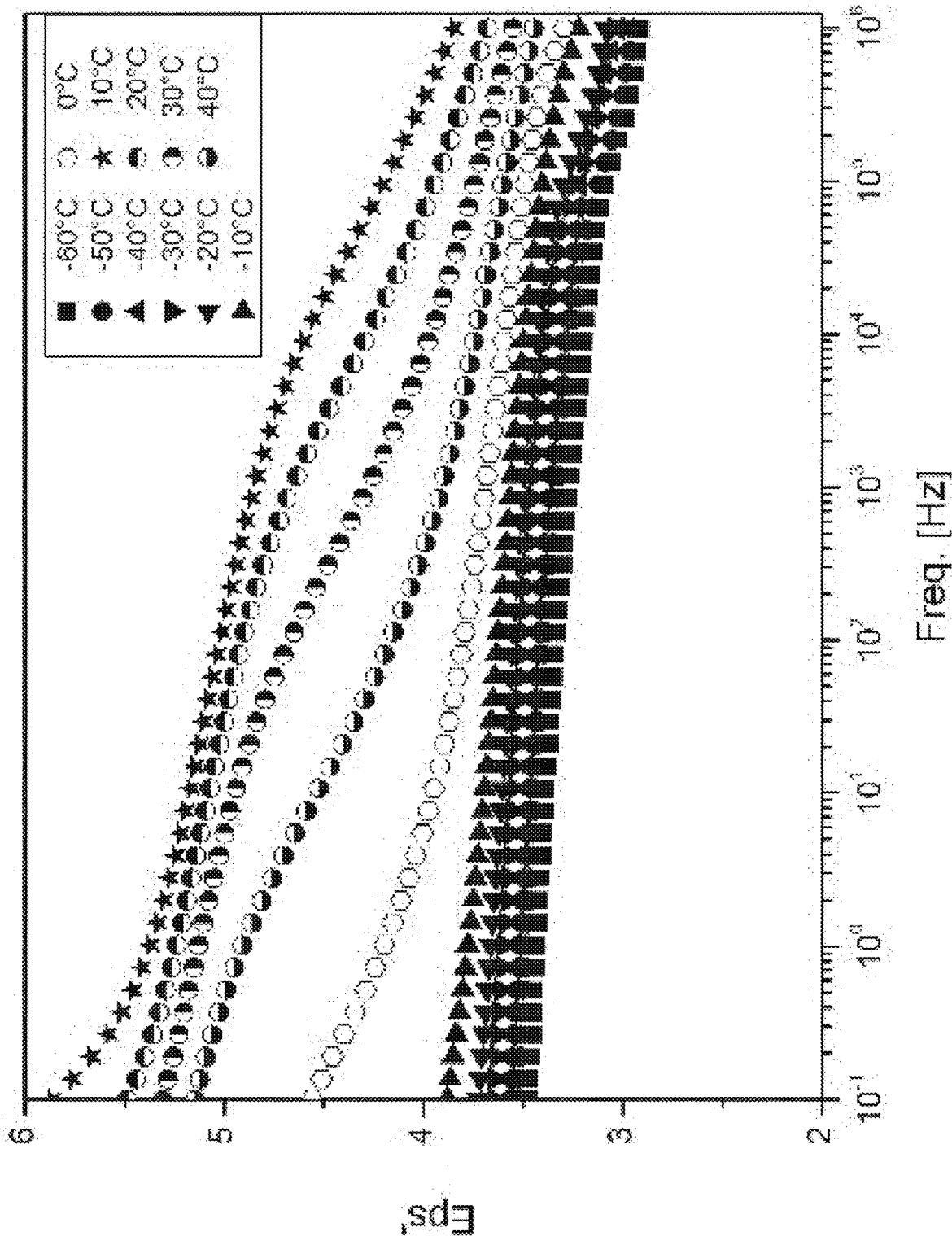
FIGS. 10A-10B DE spectroscopy for samples with a 30% $SiO_2$/GPTES modification (FIG. 10A: storage modulus Eps'.
Figure 10B:
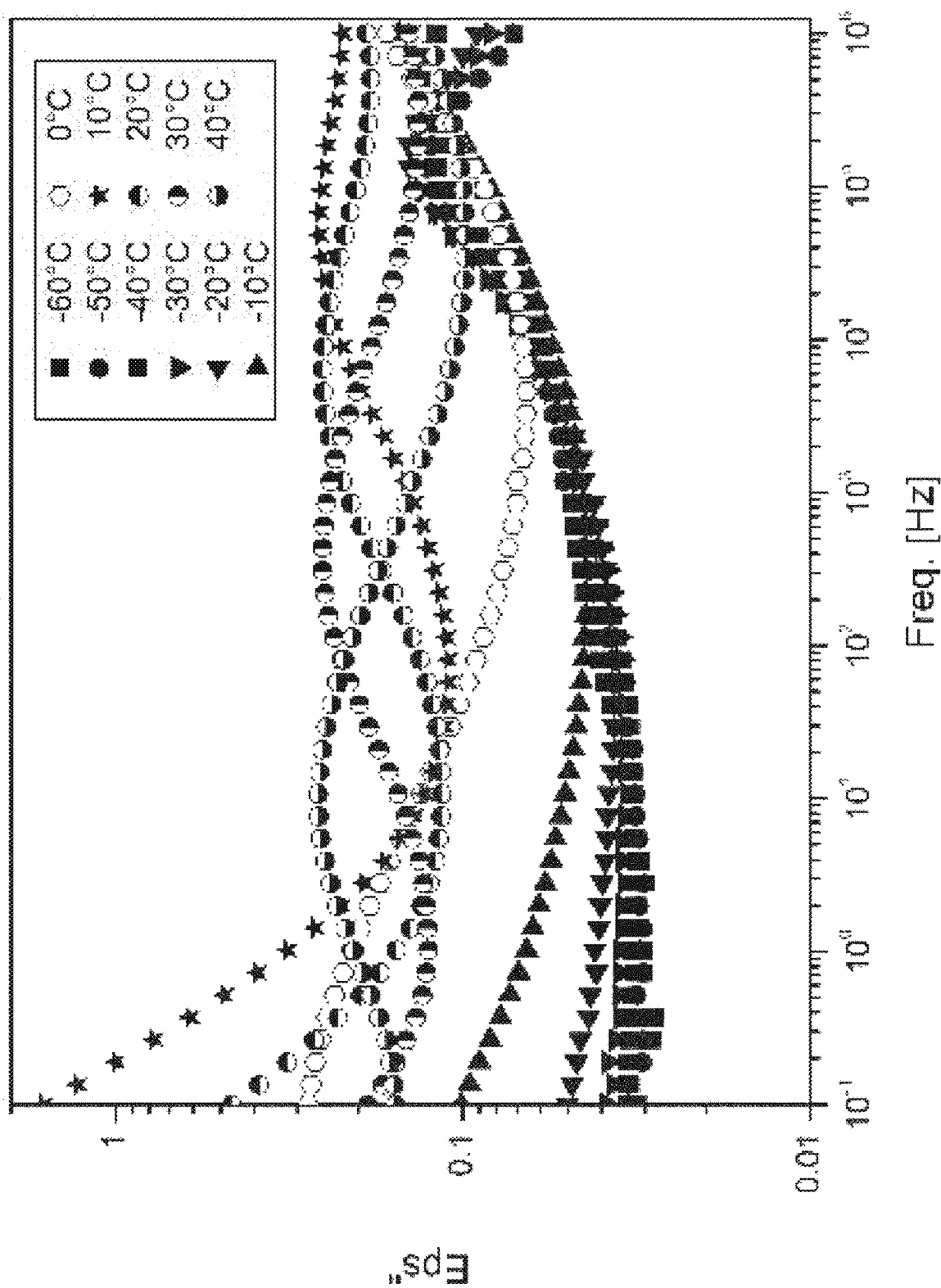

FIGS. 7A-7B show T$_g$ measurements (maximum tan δ-Signal, top) and maximum value of attenuation at T$_g$ (tan δ max, bottom) for coatings with different levels of SiO$_2$/GPTES and CeO$_2$/MPS.

FIGS. 8A-8B, 9A-9B, 10A-10B, and 11A-11B show DE spectroscopy for samples with increasing content of 0% SiO$_2$ (FIGS. 8A-8B, 9A-9B, and 10A-10B) and also 5% MPS hydrolyzate (FIGS. 11A-11B).

FIG. 12 shows the results of the UV weathering. The samples with component b) showed very good stability. Here, MOx stands for the fraction of component b).

TABLE 1

| System | MPS/wt % | t/s at 80° C. | t/s at 90° C. | t/s at 100° C. |
|---|---|---|---|---|
| PR-S-171204-bru-1 | 0 | | 480 | 160 |
| PR-S-171204-bru-2 | 1 | | 1200 | 480 |
| PR-S-171204-bru-3 | 5 | | 180 | 60 |
| PR-S-171213-bru-1 | 10 | | 120 | 90 |
| PR-S-171213-bru-2 | 20 | | | 360 |
| PR-S-171213-bru-3 | 30 | | | 480 |

TABLE 2

| System | CeO$_2$/wt % | t/s at 80° C. | t/s at 90° C. | t/s at 100° C. |
|---|---|---|---|---|
| PR-S-180111-bru-1 | 0 | | 840 | 100 |
| PR-S-180111-bru-2 | 1 | | 420 | 240 |
| PR-S-180111-bru-3 | 5 | | 300 | 60 |
| PR-S-180118-bru-1 | 10 | | 480 | 150 |
| PR-S-180118-bru-2 | 20 | | 720 | 180 |
| PR-S-180118-bru-3 | 30 | | >1800 | 180 |

TABLE 3

| System | SiO$_2$/wt % | t/s at 80° C. | t/s at 90° C. | t/s at 100° C. |
|---|---|---|---|---|
| PR-S-171214-bru-1 | 0 | 840 | 70 | 40 |
| PR-S-171121-bru-1 | 1 | 840 | 80 | 70 |
| PR-S-171121-bru-2 | 5 | 1200 | 180 | 100 |
| PR-S-171127-bru-1 | 10 | | 720 | 160 |
| PR-S-171127-bru-2 | 20 | | | 300 |
| PR-S-171127-bru-3 | 30 | | | >1800 |

TABLE 4

| System | SiO$_2$/wt % | t/s at 80° C. | t/s at 90° C. | t/s at 100° C. |
|---|---|---|---|---|
| PR-S-171214-bru-1 | 0 | 840 | 70 | 40 |
| PR-S-171127-bru-1 | 10 | | 720 | 160 |
| PR-S-180102-bru-1 Hex | 0 | | | |
| PR-S-180106-bru-1 Hex | 10 | | 300 | 240 |

TABLE 5

| System | Hydrophobizing | SiO$_2$/wt % | CA (H$_2$O)/° |
|---|---|---|---|
| PR-S-171214-bru-1 | — | 0 | 61 ± 3 |
| PR-S-180102-bru-1 | Hexyl isocyanate | 0 | 86 ± 1 |
| PR-S-180106-bru-1 | Hexyl isocyanate | 10 | 94 ± 2 |

TABLE 6

| System | MPS/wt % | HM/MPa | E$_{red}$/MPa | HU$_{pl}$/MPa |
|---|---|---|---|---|
| PR-S-171204-bru-1 | 0 | 239 ± 22 | 8340 ± 2300 | 308 ± 15 |
| PR-S-171204-bru-2 | 1 | 243 ± 4 | 8180 ± 210 | 314 ± 5 |
| PR-S-171204-bru-3 | 5 | 237 ± 21 | 8700 ± 1870 | 297 ± 14 |
| PR-S-171213-bru-1 | 10 | 169 ± 9 | 9200 ± 410 | 178 ± 15 |
| PR-S-171213-bru-2 | 20 | 96 ± 3 | 18 800 ± 3500 | 86 ± 4 |
| PR-S-171213-bru-3 | 30 | 107 ± 5 | 11 850 ± 1300 | 99 ± 5 |

TABLE 7

| System | CeO$_2$/wt % | HM/MPa | E$_{red}$/MPa | HU$_{pl}$/MPa |
|---|---|---|---|---|
| PR-S-180111-bru-1 | 0 | 242 ± 26 | 9980 ± 2550 | 285 ± 18 |
| PR-S-180111-bru-2 | 1 | 266 ± 22 | 9930 ± 2120 | 329 ± 15 |
| PR-S-180111-bru-3 | 5 | 234 ± 15 | 8490 ± 1030 | 292 ± 12 |
| PR-S-180118-bru-1 | 10 | 195 ± 10 | 9010 ± 1010 | 217 ± 10 |
| PR-S-180118-bru-2 | 20 | 74 ± 27 | n.d. | n.d. |
| PR-S-180118-bru-3 | 30 | 75 ± 9 | 18 500 ± 3160 | 68 ± 8 |

TABLE 8

| System | SiO$_2$/wt % | HM/MPa | E$_{red}$/MPa | HU$_{pl}$/MPa |
|---|---|---|---|---|
| PR-S-171214-bru-1 | 0 | 154 ± 4 | 5750 ± 153 | 178 ± 6 |
| PR-S-171121-bru-1 | 1 | 201 ± 10 | 6500 ± 370 | 260 ± 18 |
| PR-S-171121-bru-2 | 5 | 246 ± 42 | 9910 ± 4250 | 304 ± 47 |
| PR-S-171127-bru-1 | 10 | 287 ± 57 | 15 630 ± 7280 | 316 ± 39 |
| PR-S-171127-bru-2 | 20 | 258 ± 34 | 10 540 ± 2650 | 306 ± 26 |
| PR-S-171127-bru-3 | 30 | 230 ± 27 | 9166 ± 2890 | 273 ± 19 |

TABLE 9

| Example No. | Component b) | Target solids content of component b) [wt %] | Solids content of component b) [wt %] |
|---|---|---|---|
| 7 | SiO$_2$/GPTES | 1 | 1.11 |
| 8 | SiO$_2$/GPTES | 5 | 5.29 |
| 9 | SiO$_2$/GPTES | 10 | 10.05 |
| 10 | SiO$_2$/GPTES | 20 | 18.25 |
| 11 | SiO$_2$/GPTES | 30 | 25.1 |
| 12 | MPS hydrolyzate | 1 | 0.99 |
| 13 | MPS hydrolyzate | 5 | 4.76 |
| 14 | MPS hydrolyzate | 10 | 9.1 |
| 15 | MPS hydrolyzate | 20 | 16.66 |
| 16 | MPS hydrolyzate | 30 | 23.08 |
| 17 | CeO$_2$/MPS | 1 | 1.01 |
| 18 | CeO$_2$/MPS | 5 | 4.95 |
| 19 | CeO$_2$/MPS | 10 | 8.99 |
| 20 | CeO$_2$/MPS | 20 | 16.71 |
| 21 | CeO$_2$/MPS | 30 | 23.11 |

LITERATURE CITED

A. Rekondo, R. Martin, A. R. de Luzuriaga, G. Cabanero, H. J. Grande, and I. Odriozola, "Catalyst-free room-temperature self-healing elastomers based on aromatic disulfide metathesis", Mater. Horiz., vol. 1, No. 2, pp. 237-240, February 2014.

R. Martin, A. Rekondo, A. R. de Luzuriaga, G. Cabanero, H. J. Grande, and I. Odriozola, "The processability of a poly(urea-urethane) elastomer reversibly crosslinked with aromatic disulfide bridges", J. Mater. Chem. A, vol. 2, No. 16, pp. 5710-5715, March 2014.

A. Susa, R. K. Bose, A. M. Grande, S. van der Zwaag, and S. J. Garcia, "Effect of the Dianhydride/Branched Diamine Ratio on the Architecture and Room Temperature Healing Behavior of Polyetherimides", ACS Appl. Mater. Interfaces, vol. 8, No. 49, pp. 34068-34079, December 2016.

Y. Amamoto, J. Kamada, H. Otsuka, A. Takahara, and K. Matyjaszewski, "Repeatable Photoinduced Self-Healing of Covalently Cross-Linked Polymers through Reshuffling of Trithiocarbonate Units", Angew. Chem. Int. Ed., vol. 50, No. 7, pp. 1660-1663, February 2011.

G. A. Williams, R. Ishige, O. R. Cromwell, J. Chung, A. Takahara, and Z. Guan, "Mechanically Robust and Self-Healable Superlattice Nanocomposites by Self-Assembly of Single-Component "Sticky" Polymer-Grafted Nanoparticles", Adv. Mater., vol. 27, No. 26, pp. 3934-3941, July 2015.

K. Kato and K. Ito, "Dynamic transition between rubber and sliding states attributed to slidable cross-links", Soft Matter, vol. 7, No. 19, pp. 8737-8740, September 2011.

X. Li, H. Kang, J. Shen, L. Zhang, T. Nishi, and K. Ito, "Miscibility, intramolecular specific interactions and mechanical properties of a DGEBA based epoxy resin toughened with a sliding graft copolymer", Chin J Polym Sci, vol. 33, No. 3, pp. 433-443, March 2015.

K. Kato, T. Yasuda, and K. Ito, "Peculiar elasticity and strain hardening attributable to counteracting entropy of chain and ring in slide-ring gels", Polymer, vol. 55, No. 10, pp. 2614-2619, May 2014.

K. Kato, T. Mizusawa, H. Yokoyama, and K. Ito, "Polyrotaxane Glass: Peculiar Mechanics Attributable to the Isolated Dynamics of Different Components", J. Phys. Chem. Lett., vol. 6, No. 20, pp. 4043-4048, October 2015.

J. Araki, T. Kataoka, and K. Ito, "Preparation of a "sliding graft copolymer", an organic solvent-soluble polyrotaxane containing mobile side chains, and its application for a crosslinked elastomeric supramolecular film", Soft Matter, vol. 4, No. 2, pp. 245-249, January 2008.

EP02123681B1

K. Kato, D. Matsui, K. Mayumi, and K. Ito, "Synthesis, structure, and mechanical properties of silica nanocomposite poly-rotaxane gels", Beilstein Journal of Organic Chemistry, vol. 11, No. 1, pp. 2194-2201, November 2015.

EP2397527A1
EP2787010A1
EP2857440A1
EP2949709A1
WO1997009354A1
WO2001038408A2
WO2016202906A1

The invention claimed is:

1. A composition for a self-healing composite material, comprising:
   at least one polyrotaxane comprising a copolymer and ring-shaped molecules threaded thereon, with at least one ring-shaped molecule having at least one functional group (A);
   at least one organically modified inorganic hybrid material which comprises a polyorganosiloxane having functional groups (B), or at least one kind of surface-modified inorganic particles which on their surface have functional groups (B), wherein the inorganic particles comprise $ZnO$, $CdO$, $GeO_2$, $TiO_2$, $ZrO_2$, $CeO_2$, $SnO_2$, $Al_2O_3$, $B_2O_3$, $In_2O_3$, $La_2O_3$, $Fe_2O_3$, $Fe_3O_4$, $Cu_2O$, $CuO$, $Ta_2O_5$, $Nb_2O_5$, $V_2O_5$, $MoO_3$ or $WO_3$;
   a crosslinker comprising at least two functional groups which form a covalent bond to ring-shaped molecules of the at least one polyrotaxane,
   wherein at least two of the threaded ring-shaped molecules are crosslinked by linking of the functional groups (A) and (B).

2. The composition as claimed in claim 1, wherein the ring-shaped molecule is cyclodextrin or a cyclodextrin derivative.

3. The composition as claimed in claim 1, wherein the crosslinker forms a bond both with the at least one functional group (A) and with the functional groups (B) and crosslinks them with one another and to one another.

4. The composition as claimed in claim 1, wherein the at least one functional group (A) comprises hydroxyl groups, thiol groups carboxylic acid groups, anhydride groups, isocyanate groups, amino groups, monoalkylamino groups, isocyano groups, acrylate groups, methacrylate groups, aldehyde groups, or precursors thereof.

5. The composition as claimed in claim 1, wherein the functional groups (B) are hydroxyl groups, thiol groups, carboxylic acid groups, anhydride groups, isocyanate groups, amino groups, monoalkylamino groups, isocyano groups, acrylate groups, methacrylate groups, aldehyde groups, or precursors thereof.

6. A method for producing the composite material, wherein a composition as claimed in claim 1 is provided and cured.

7. A composite material obtained by curing a composition as claimed in claim 1.

8. A self-healing surface comprising a composite material as claimed in claim 7.

9. A shaped article comprising a composite material as claimed in claim 7.

10. The composition as claimed in claim 1, wherein the crosslinker crosslinks ring-shaped molecules of two polyrotaxanes.

11. The composition as claimed in claim 1, wherein the crosslinker forms a covalent compound between a first ring-shaped molecule, threaded onto a first copolymer, and a second ring-shaped molecule, threaded onto a second copolymer.

12. The composition as claimed in claim 1, wherein the crosslinker is via functional groups (A).

13. The composition as claimed in claim 1, wherein the inorganic particles comprise $CeO_2$.

14. The composition as claimed in claim 1, wherein the functional groups (B) are thiol groups.

15. The composition as claimed in claim 5, wherein the functional groups (B) are precursor epoxy groups.

* * * * *